United States Patent
Sento et al.

(10) Patent No.: US 12,212,879 B2
(45) Date of Patent: Jan. 28, 2025

(54) IMAGE PROCESSING DEVICE AND IMAGE PROCESSING METHOD

(71) Applicant: SONY GROUP CORPORATION, Tokyo (JP)

(72) Inventors: Kazuya Sento, Tokyo (JP); Hiroki Takahara, Tokyo (JP); Norihiko Akamatsu, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 262 days.

(21) Appl. No.: 17/757,585

(22) PCT Filed: Oct. 30, 2020

(86) PCT No.: PCT/JP2020/040892
§ 371 (c)(1),
(2) Date: Jun. 17, 2022

(87) PCT Pub. No.: WO2021/131325
PCT Pub. Date: Jul. 1, 2021

(65) Prior Publication Data
US 2023/0018868 A1    Jan. 19, 2023

(30) Foreign Application Priority Data
Dec. 27, 2019   (JP) ................. 2019-238572

(51) Int. Cl.
*H04N 5/265* (2006.01)
*G06T 7/11* (2017.01)
*G06T 7/70* (2017.01)
*H04N 5/272* (2006.01)

(52) U.S. Cl.
CPC ............... *H04N 5/265* (2013.01); *G06T 7/11* (2017.01); *G06T 7/70* (2017.01); *H04N 5/272* (2013.01); *G06T 2207/30244* (2013.01)

(58) Field of Classification Search
CPC .......... H04N 5/265; H04N 5/272; G06T 7/11; G06T 7/70; G06T 2207/30244
USPC .......................................................... 348/239
See application file for complete search history.

(56) References Cited

U.S. PATENT DOCUMENTS

| | | | |
|---|---|---|---|
| 2009/0251482 A1* | 10/2009 | Kondo | H04N 5/2624 345/589 |
| 2012/0268641 A1 | 10/2012 | Kazama | |
| 2019/0335115 A1* | 10/2019 | Kumai | H04N 5/45 |

FOREIGN PATENT DOCUMENTS

| | | | |
|---|---|---|---|
| CN | 109983532 A | | 7/2019 |
| JP | 2006-281830 A | | 10/2006 |
| JP | 2012-227839 A | | 11/2012 |
| JP | 2013-247543 | * | 12/2013 |
| JP | 2013-247543 A | | 12/2013 |

(Continued)

OTHER PUBLICATIONS

International Search Report and Written Opinion of PCT Application No. PCT/JP2020/040892, issued on Jan. 26, 2021, 10 pages of ISRWO.

*Primary Examiner* — Joel W Fosselman
(74) *Attorney, Agent, or Firm* — CHIP LAW GROUP

(57) ABSTRACT

An image processing device performs a combining process of disposing a second image in a first image captured by a first imaging device, the second image being an image of the imaging field of view of a second imaging device capable of imaging a partial field of view in the imaging field of view of the first imaging device.

19 Claims, 32 Drawing Sheets

(56) References Cited

FOREIGN PATENT DOCUMENTS

JP      2013-251783 A    12/2013
WO    2018/101227 A1    6/2018

\* cited by examiner

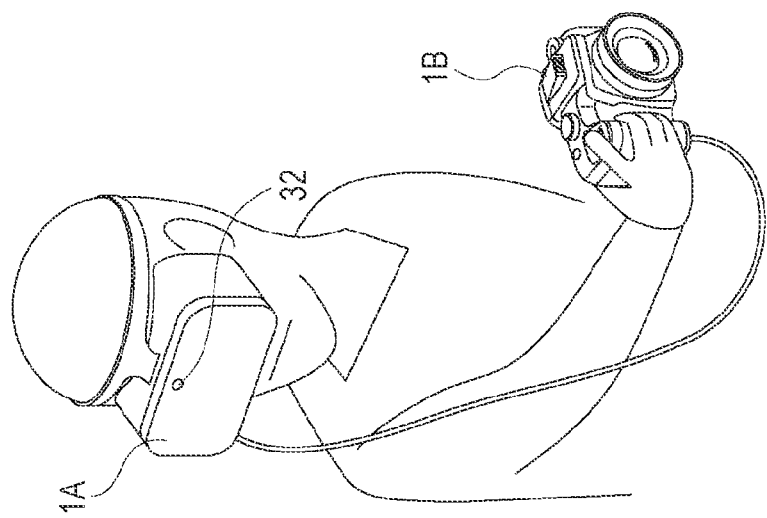
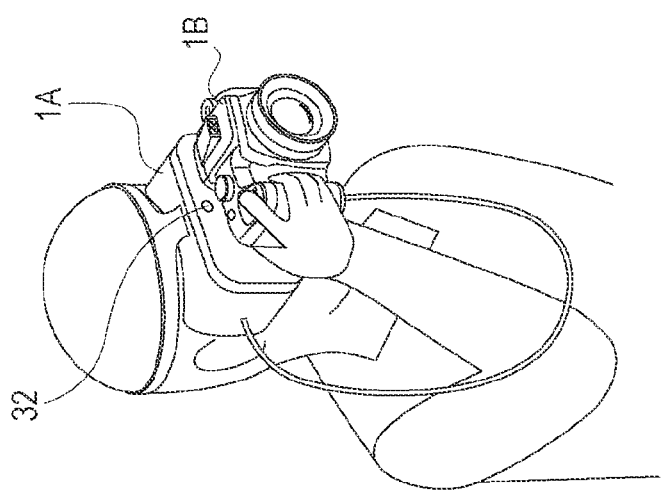
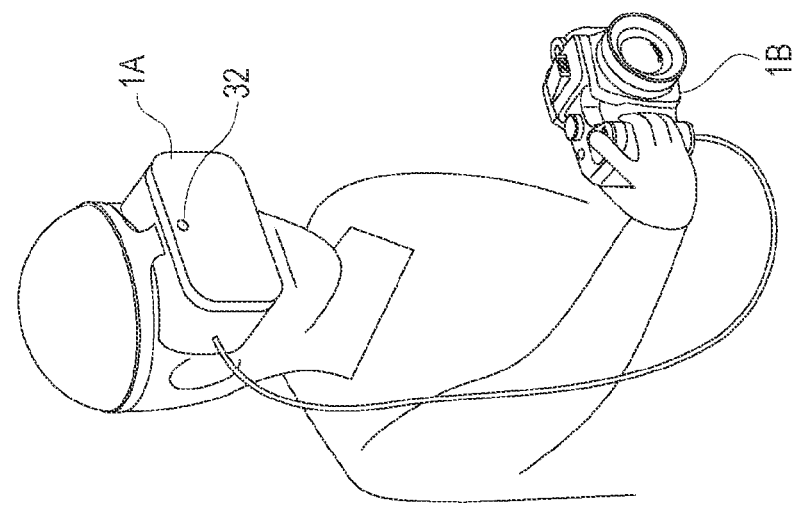

ENLARGED IMAGE LAYOUT
COORDINATE CALCULATION (S105)

ACQUIRE IMAGING ANGLE-OF-VIEW FRAME INFORMATION — S150

SEARCH FOR AREA IN WHICH CENTER OF IMAGING ANGLE-OF-VIEW FRAME IS LOCATED — S151

AR1, AR2, AR3? — S201 — Yes
No
↓
AR7, AR8, AR9? — S202 — Yes
No
↓
AR5? — S220 — Yes
No
↓
AR4? — S221 — Yes
No
↓
PERFORM CALCULATION FOR AR4 — S223

AR2? — S210 — Yes
No
↓
AR1? — S211 — Yes
No
↓
HAS CALCULATION IN PREVIOUS FRAME BEEN FOR LEFT AREA? — S212 — Yes / No
↓
PERFORM CALCULATION FOR AR1 — S213
PERFORM CALCULATION FOR AR3 — S214

HAS CALCULATION IN PREVIOUS FRAME BEEN FOR LEFT AREA? — S222 — Yes / No
↓
PERFORM CALCULATION FOR AR4 — S223
PERFORM CALCULATION FOR AR6 — S224

AR8? — S230 — Yes
No
↓
AR7? — S231 — Yes
No
↓
HAS CALCULATION IN PREVIOUS FRAME BEEN FOR LEFT AREA? — S232 — Yes / No
↓
PERFORM CALCULATION FOR AR7 — S233
PERFORM CALCULATION FOR AR9 — S234

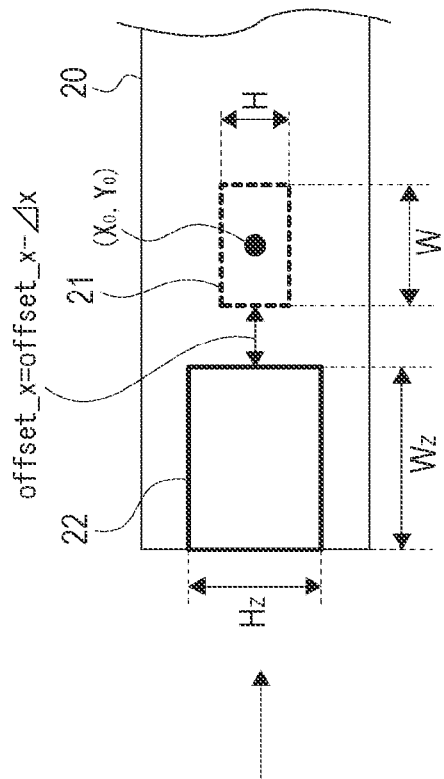
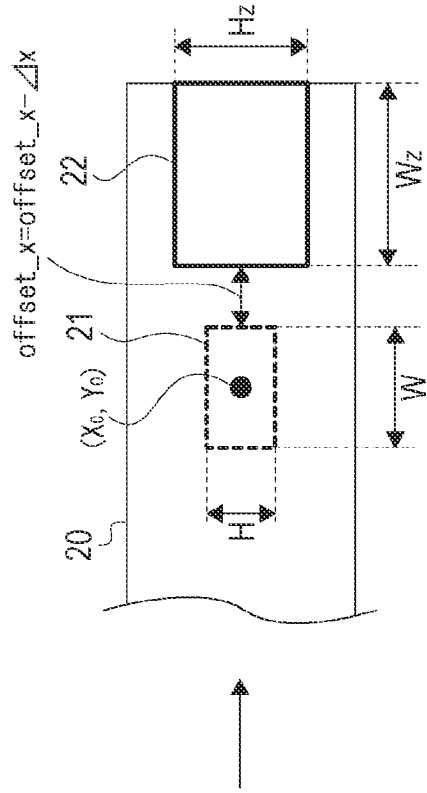
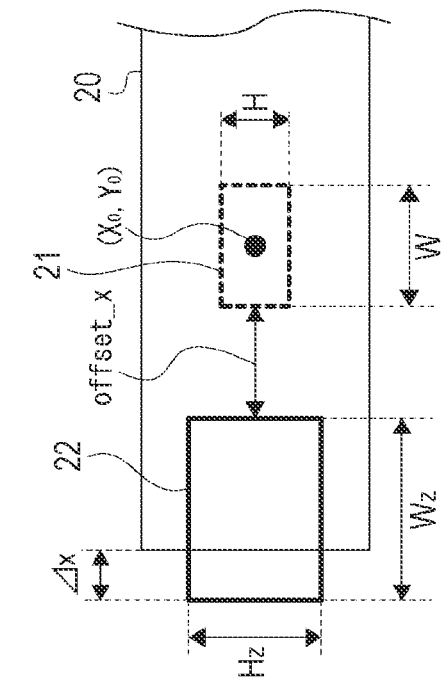
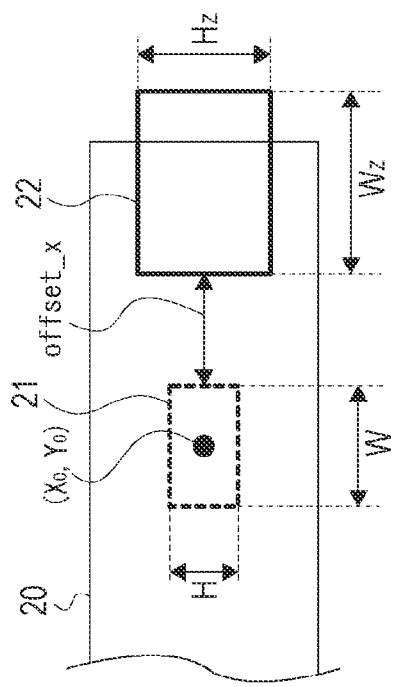
FIG. 27A
FIG. 27B

IMAGE PROCESSING DEVICE AND IMAGE PROCESSING METHOD

CROSS REFERENCE TO RELATED APPLICATIONS

This application is a U.S. National Phase of International Patent Application No. PCT/JP2020/040892 filed on Oct. 30, 2020, which claims priority benefit of Japanese Patent Application No. JP 2019-238572 filed in the Japan Patent Office on Dec. 27, 2019. Each of the above-referenced applications is hereby incorporated herein by reference in its entirety.

TECHNICAL FIELD

The present technology relates to an image processing device, an image processing method, and a program, and relates to a technical field of image display processes to be performed by a plurality of imaging devices.

BACKGROUND ART

There are usage modes in which images captured by a plurality of imaging devices are displayed on one screen.

For example, Patent Document 1 listed below discloses a technology for displaying an image of a relatively wide field of view and a high-resolution image of a relatively narrow field of view that are obtained by a first imaging optical system and a second imaging optical system having different angles of view.

CITATION LIST

Patent Document

Patent Document 1: Japanese Patent Application Laid-Open No. 2013-251783

SUMMARY OF THE INVENTION

Problems to be Solved by the Invention

As a situation in which the user performs imaging, there is a case where the user wishes to follow the target object while checking a wide peripheral field of view. In this case, it is convenient to display, on the same screen, the image obtained by the first imaging device capturing a wide peripheral field of view and the image obtained by the second imaging device capturing the target object.

For such display, the technology disclosed in Patent Document 1 may be used, but, according to the disclosed technology, two images having different angles of view are displayed in divided screen regions.

As a result, movement of the line of sight of the user relative to the display might become larger, or it might become difficult for the user to visually recognize a wide-angle image and a high-resolution image of a moving object. Patent Document 1 also discloses displaying a wide-angle image in a high-resolution image, but in this case, it might be difficult to visually recognize the object appearing in the wide-angle image.

Therefore, the present disclosure suggests a technology for appropriately displaying an image with a relatively wide imaging field of view captured by a first imaging device, and an image with a relatively narrow imaging field of view captured by a second imaging device.

Solutions to Problems

An image processing device according to the present technology includes an image combining unit that performs a combining process of disposing a second image in a first image captured by a first imaging device, the second image being an image of the imaging field of view of a second imaging device capable of imaging a partial field of view in the imaging field of view of the first imaging device.

For example, a display image in which the second image having a relatively narrow field of view is superimposed on the first image having a relatively wide field of view as an image of the imaging field of view of the first imaging device is generated.

The above image processing device according to the present technology may further include: a range detection unit that detects the range of the imaging field of view of the second imaging device in the first image; and an imaging angle-of-view frame combining unit that combines an imaging angle-of-view frame with the first image, the imaging angle-of-view frame indicating the range of the imaging field of view detected by the range detection unit.

That is, an image in which the range of the object being captured by the second imaging device is shown as the imaging angle-of-view frame in the first image is generated, and an image including the imaging angle-of-view frame is displayed.

In the above image processing device according to the present technology, the image combining unit may set the layout position of the second image in the first image, in accordance with the position of the imaging angle-of-view frame.

When the second image is combined with the first image, the position of the combining is not set at a fixed position, but is set in accordance with the position of the imaging angle-of-view frame.

In the above image processing device according to the present technology, the image combining unit may set the layout position of the second image in the first image so as to follow the position of the imaging angle-of-view frame, with a predetermined distance relationship being maintained.

The layout position of the second image to be combined with the first image is set for each frame so as to maintain a constant distance to the imaging angle-of-view frame, for example, and thus, the second image follows the imaging angle-of-view frame.

In the above image processing device according to the present technology, the image combining unit may set the layout position of the second image in the first image so as to follow horizontal changes in the position of the imaging angle-of-view frame while maintaining a predetermined horizontal distance.

For example, as the imaging angle-of-view frame moves in a horizontal direction (transverse direction) in the first image, the second image moves while maintaining a certain horizontal distance.

In the above image processing device according to the present technology, the image combining unit may set the layout position of the second image in the first image so as to follow vertical changes in the position of the imaging angle-of-view frame while maintaining a predetermined vertical distance.

For example, as the imaging angle-of-view frame moves in a vertical direction (upward/downward direction) in the first image, the second image moves while maintaining a certain vertical distance.

In the above image processing device according to the present technology, the image combining unit may calculate the coordinate values of the layout position of the second image in the coordinate space of the first image by an arithmetic operation using the coordinate values of the imaging angle-of-view frame.

For example, the coordinates of the layout position of the second image that maintains a predetermined distance from the imaging angle-of-view frame are calculated using the coordinate values of the center and four corners of the imaging angle-of-view frame.

In the above image processing device according to the present technology, the image combining unit may perform segmentation setting to divide the first image into a plurality of areas, and set the layout position of the second image by a calculation formula selected in accordance with the area in which the imaging angle-of-view frame is located.

The layout position of the second image to be combined with the first image is set so as to follow the imaging angle-of-view frame whose position changes in the first image. In this case, segmentation setting is performed to divide the first image into a plurality of areas, the calculation formula corresponding to the area in which the imaging angle-of-view frame (the center of the imaging angle-of-view frame, for example) is located is selected, and the position of the second image is set.

In the above image processing device according to the present technology, the plurality of areas may include a buffer area that maintains a state in which the calculation formula is selected.

In a case where the first image is divided into a plurality of areas, not the calculation formula corresponding to each area is prepared for all the areas, but a buffer area in which the calculation formula previously used is also set.

In the above image processing device according to the present technology, the image combining unit may set the layout position of the second image in the first image in accordance with the position of the imaging angle-of-view frame, and, in a case where the set layout position is such that all or part of the second image is located outside the range of the first image, the image combining unit may again set the layout position of the second image to change the direction of disposing the second image relative to the imaging angle-of-view frame.

For example, when the layout position of the second image is set so that the direction of disposing the second image relative to the imaging angle-of-view frame is a direction toward the right side, in a case where the second image has a portion outside the first image, resetting is performed so that the direction of disposing the second image relative to the imaging angle-of-view frame becomes a direction toward the left side.

Alternatively, when the layout position of the second image is set so that the direction of disposing the second image relative to the imaging angle-of-view frame is a direction toward the upper side, in a case where the second image has a portion outside the first image, resetting is performed so that the direction of disposing the second image relative to the imaging angle-of-view frame becomes a direction toward the lower side.

In the above image processing device according to the present technology, the image combining unit may set the layout position of the second image in the first image in accordance with the position of the imaging angle-of-view frame, and, in a case where the set layout position is such that all or part of the second image is located outside the range of the first image, the image combining unit may again set the layout position of the second image so as to cause the layout position of the second image to shift toward the range of the first image.

For example, in a case where the layout position of the second image that is set relative to the imaging angle-of-view frame is such a position as to have a portion outside the first image, the direction of disposing the second image is made to shift in a direction of reducing the outside portion.

In the above image processing device according to the present technology, the image combining unit may set the layout position of the second image in the first image in accordance with the position of the imaging angle-of-view frame, and, in a case where the set layout position is such that all or part of the second image is located outside the range of the first image, the combining process may not be performed on the second image.

That is, in a case where the layout position of the second image is a position having a portion outside the first image, the second image is not displayed.

The above image processing device according to the present technology may further include an output control unit that performs control to output the second image as a display image, in a case where the range detection unit has detected the second imaging device in the first image.

That is, this is a state in which the second imaging device is located in front of the first imaging device, and the back surface of the second imaging device is captured in the first image. In this case, the second image is not combined with the first image, and only the second image is displayed to the user.

The output control unit may correspond to the image combining unit. That is, this is a case where the image combining unit performs control to output the second image as a display image. Also, there may be a case where the second image of the second imaging device is output without passing through the image combining unit. In that case, a function as the output control unit should be executed by a unit other than the image combining unit.

In the above image processing device according to the present technology, in a case where the range detection unit fails to detect the range of the imaging field of view of the second imaging device in the first image, the image combining unit may set the layout position of the second image at a preset fixed position in the first image.

For example, in a case where the imaging visual field directions of the first imaging device and the second imaging device are completely different, the range of the imaging field of view of the second imaging device does not exist in the first image. In such a case, the second image is combined and displayed at a specific position in the first image.

The above image processing device according to the present technology may further include an output control unit that performs control to output the first image as a display image, in a case where the range detection unit fails to detect the range of the imaging field of view of the second imaging device in the first image.

For example, in a case where the imaging visual field directions of the first imaging device and the second imaging device are completely different, and the range of the imaging field of view of the second imaging device does not exist in the first image, the second image is not displayed, and the first image is displayed.

The output control unit may also correspond to the image combining unit in this case. That is, this is a case where the image combining unit performs control to output the first image as a display image. Also, there may be a case where the first image of the first imaging device is output without passing through the image combining unit. In that case, a function as the output control unit should be executed by a unit other than the image combining unit.

In the above image processing device according to the present technology, the image combining unit may determine whether or not to combine the second image with the first image, in accordance with the size of the imaging angle-of-view frame.

The size of the imaging angle-of-view frame changes with the angle of view (zooming state) of the second imaging device. Particularly, when imaging is performed at a wide angle, the angle of view of the second imaging device approaches the angle of view of the first imaging device, and the range occupied by the imaging angle-of-view frame becomes wider in the first image. In such a case, the second image is not displayed.

In the above image processing device according to the present technology, the imaging angle-of-view frame combining unit may combine the imaging angle-of-view frame that is non-rectangular in shape with the first image.

For example, the imaging angle-of-view frame is displayed in the shape corresponding to the difference in the visual field direction between the first and second imaging devices.

The above image processing device according to the present technology may further include: a range detection unit that detects the range of a focus frame of the second imaging device in the first image; and a focus frame combining unit that combines the focus frame with the first image, the focus frame indicating the focusing region detected by the range detection unit. The image combining unit may set the layout position of the second image in the first image in accordance with the position of the focus frame.

That is, the focus frame of the second imaging device is displayed in the first image. The coordinates of the layout position of the second image that maintains a predetermined distance from the imaging angle-of-view frame are then calculated, on the basis of the coordinate values of the focus frame, for example.

An image processing method according to the present technology is an image processing method by which an image processing device performs a combining process of disposing a second image in a first image captured by a first imaging device, the second image being an image of the imaging field of view of a second imaging device capable of imaging a partial field of view in the imaging field of view of the first imaging device.

By this method, the first image is displayed in the second image having a relatively wide imaging field of view.

A program according to the present technology is a program for causing an image processing device to perform processes by the above image processing method. With this program, an image processing device according to the present technology can be easily obtained.

BRIEF DESCRIPTION OF DRAWINGS

FIGS. 2A, 2B, and 2C are explanatory diagrams of an example and a usage state of two imaging devices according to an embodiment.

FIG. 20 is a flowchart of an enlarged image layout coordinate calculation process according to the fifth embodiment.

FIGS. 27A and 27B are explanatory diagrams of horizontal shifts to be performed when an enlarged image has an outside portion according to the sixth embodiment.

MODE FOR CARRYING OUT THE INVENTION

Embodiments will be described below in the following order.
<1. Configuration of an Image Processing Device>
<2. First Embodiment>
<3. Second Embodiment>
<4. Third Embodiment>
<5. Fourth Embodiment>
<6. Fifth Embodiment>
<7. Sixth Embodiment>
<8. Seventh Embodiment>
<9. Display of an Imaging Angle-of-View Frame>
<10. Summary and Modifications>

1. Configuration of an Image Processing Device

Figure 1:
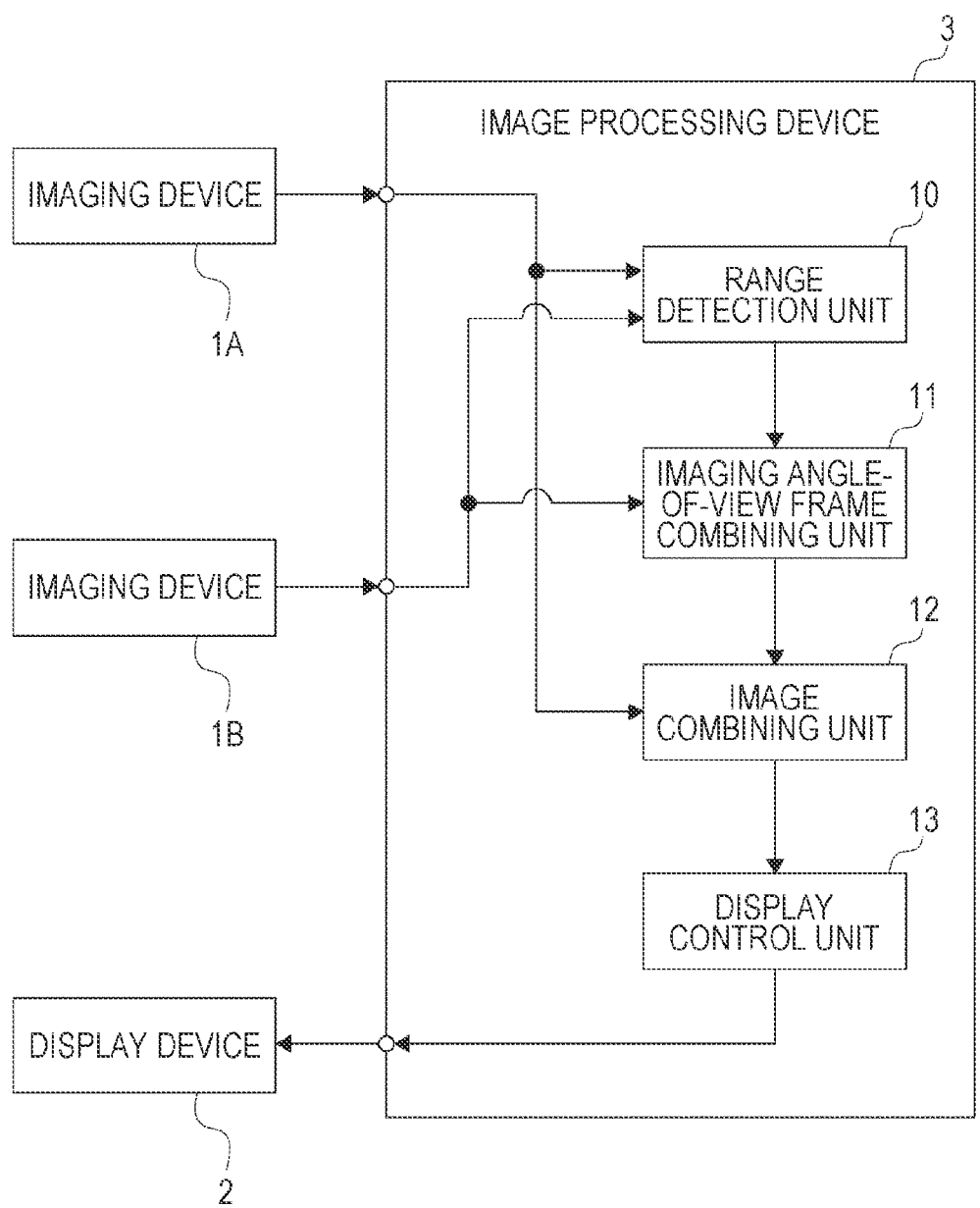
FIG. 1 is a block diagram of an example configuration according to an embodiment of the present technology.

FIG. 1 shows an example configuration of an image processing device 3 as an embodiment. FIG. 1 shows imaging devices 1A and 1B, a display device 2, and an image processing device 3.

The imaging devices 1A and 1B represent two separate devices capable of capturing images, for example. The imaging devices 1A and 1B are devices capable of capturing moving images and still images, and recording the images. FIGS. 2A, 2B, 2C, 3A, 3B, and 3C show examples of the imaging devices 1A and 1B.

FIG. 2A shows, as an example, an imaging device 1A capable of goggle-like display and imaging, and an imaging device 1B as a handheld conventional digital camera.

For example, the user wears the goggle-like imaging device 1A on the head. The imaging device 1A is a device that includes an imaging unit 32, for example, and is capable of capturing an image in a relatively wide imaging field of view and displaying the captured image on a display unit (not shown) in the goggles.

The imaging device 1B is a device capable of capturing a still image or a moving image and recording the captured still image or moving image on a recording medium such as a memory card.

The imaging device 1A and the imaging device 1B can communicate image data and other data to each other by cable communication or wireless communication.

The imaging devices 1A and 1B are not limited to the combination shown in FIG. 2A, and combinations of various imaging devices are possible.

Figure 3A:
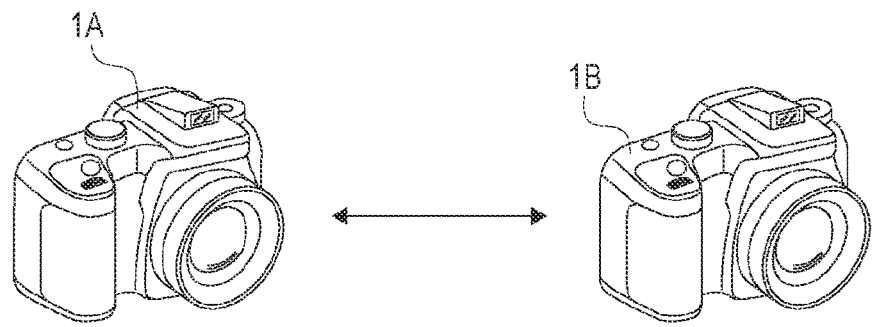
FIGS. 3A, 3B, and 3C are explanatory diagrams of an example of two imaging devices according to an embodiment.

For example, FIG. 3A shows a case where both the imaging devices 1A and 1B are handheld digital cameras.

Figure 3B:
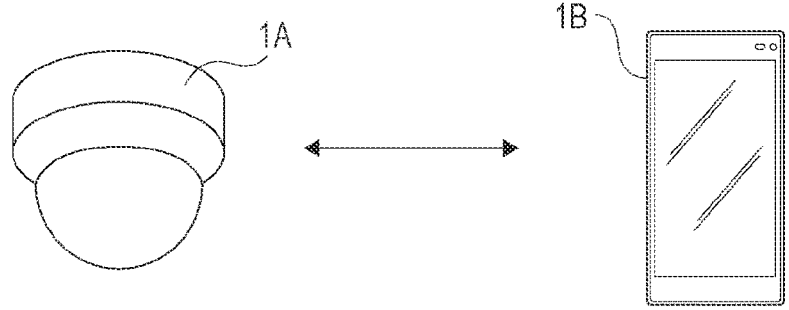

FIG. 3B shows an example in which the imaging device 1A is a 360-degree camera that performs imaging in all directions with a fisheye lens, for example, and the imaging device 1B is a portable terminal such as a smartphone having an imaging function.

Figure 3C:
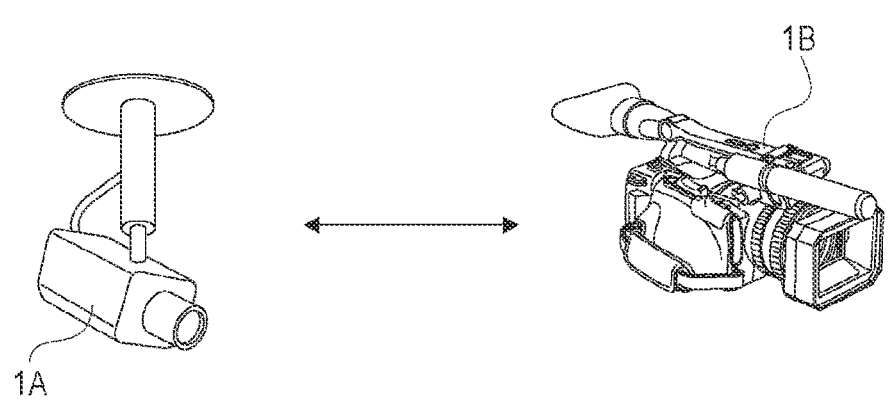

FIG. 3C shows an example in which the imaging device 1A is a surveillance camera and the imaging device 1B is a video camera.

As described above, there are various combinations of the imaging devices 1A and 1B, and various combinations are possible other than the above examples.

In this embodiment, however, at least the imaging device 1B is a device capable of imaging a partial field of view in the imaging field of view of the imaging device 1A. For example, in the case shown in FIG. 2A, the goggle-type imaging device 1A can image the peripheral field of view with a wide imaging field of view (angle of view), so that the user can visually recognize a view in the peripheral field of view on an internal display unit. After that, it is possible to capture an image of the target object existing in the peripheral field of view with the imaging device 1B.

Although the two imaging devices 1A and 1B as described above are shown in FIG. 1, the image processing device 3 and the display device 2 may be devices independent of the imaging devices 1A and 1B, or both of them may be included in the imaging device 1A or the imaging device 1B.

For example, in a case where the goggle-type imaging device 1A and the imaging device 1B that is a handheld digital camera are being used as shown in FIG. 2A, the image processing device 3 and the display device 2 in FIG. 1 may be included in the imaging device 1A.

It is of course conceivable to form a configuration in which the image processing device 3 and the display device 2 are included in the imaging device 1B, the image processing device 3 is included in the imaging device 1B while the display device 2 is included in the imaging device 1A, or conversely, the image processing device 3 is included in the imaging device 1A while the display device 2 is included in the imaging device 1B.

In the description below, the imaging devices 1A and 1B will be described as separate devices. However, in a case where two imaging systems (lens systems, image sensors, and the like) are included in one imaging device and can perform imaging of two systems having a difference in the imaging field of view, the two imaging systems can be applied to the imaging devices 1A and 1B.

The image processing device 3 has processing functions that are the functions as a range detection unit 10, an imaging angle-of-view frame combining unit 11, an image combining unit 12, and a display control unit 13.

For example, the image processing device 3 is designed as a video processor including an arithmetic device such as a microcomputer, and processing functions as the range detection unit 10, the imaging angle-of-view frame combining unit 11, the image combining unit 12, and the display control unit 13 are realized in an arithmetic unit such as a CPU according to a software program.

Image data captured by the imaging devices 1A and 1B and various kinds of additional information are supplied to the image processing device 3.

The image data to be supplied from the imaging devices 1A and 1B to the image processing device 3 is image data for the user who performs imaging to check the object range, for example. Therefore, the image data may be image data with a relatively low resolution as a so-called through-lens image, row image data, image data obtained by developing a row image, or the like, or may be data with a relatively high resolution.

Conceivable examples of the additional information to be supplied from the imaging devices 1A and 1B to the image processing device 3 include information about the focus control position and the zoom lens control position (or the angle of view) during imaging, exposure information, detection information about various sensors mounted on the imaging devices 1A and 1B, such as an orientation sensor, a distance measuring sensor, an angular velocity sensor, an acceleration sensor, an illuminance sensor, and a location sensor, and information about the user's operations on the imaging device 1A or the imaging device 1B, for example.

The range detection unit 10 in the image processing device 3 performs a process of detecting the range of the imaging field of view of the imaging device 1B in a first image captured by the imaging device 1A. For example, in a case where the peripheral field is imaged by the goggle-type imaging device 1A as shown in FIG. 2A, the process is a process of detecting the range of the field of view being imaged by the imaging device 1B in the image of the peripheral field.

Figure 4A:
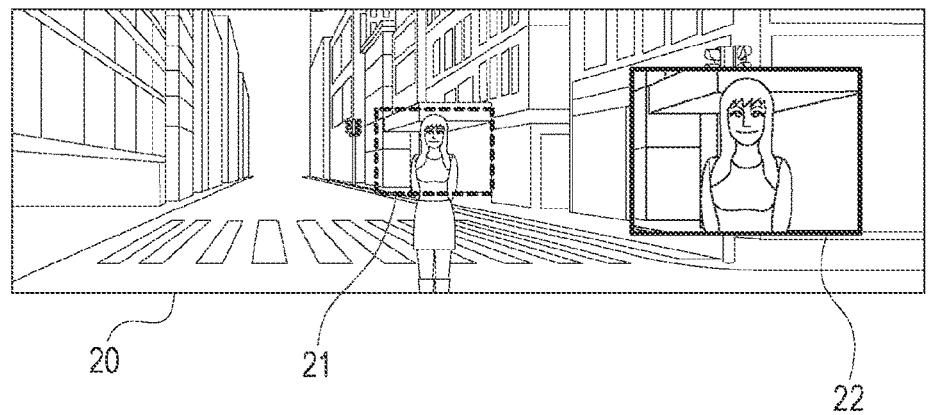
FIGS. 4A and 4B are explanatory views of a peripheral field image, an imaging angle-of-view frame, and an enlarged image displayed according to an embodiment.

For example, FIG. 4A shows an example image captured as a peripheral field image 20 by the imaging device 1A. In this example, the imaging device 1B images the range of the field of view indicated by an imaging angle-of-view frame 21. The range detection unit 10 performs a process of detecting the range indicated by the imaging angle-of-view frame 21 in this manner in the peripheral field image 20.

The position of the imaging field of view of the imaging device 1B in the peripheral field image 20 to be detected by the range detection unit 10 changes with the respective field-of-view directions of the imaging device 1A and the imaging device 1B. Also, the size of the imaging field of view of the imaging device 1B in the peripheral field image 20 to be detected by the range detection unit 10 changes with a difference in angle of view between the imaging device 1A and the imaging device 1B. For example, the size changes with the zooming state of the imaging device 1B.

Accordingly, for each frame, for example, the range detection unit 10 detects the range of the imaging field of view of the imaging device 1B in the first image captured by the imaging device 1A.

For example, the range detection unit 10 can acquire the image data of the peripheral field and the additional information from the imaging device 1A, and also acquire the image data of the field of view being imaged and the additional information from the imaging device 1B. The range detection unit 10 detects the difference in imaging conditions between the imaging device 1A and the imaging device 1B, and detects the imaging field of view of the imaging device 1B relative to the peripheral field of view. The difference in imaging conditions may be an imaging direction difference or an angle-of-view difference (an enlargement factor), for example. Once an imaging direction difference and an angle-of-view difference are acquired, the imaging field of view of the imaging device 1B in the peripheral field of view of the imaging device 1A can be detected by calculation.

Also, the range detection unit 10 may calculate the imaging field of view of the imaging device 1B relative to the peripheral field of view by image analysis. For example, it is also possible to detect the imaging field of view of the imaging device 1B in the peripheral field of view of the imaging device 1A, by performing processes such as so-called block matching, feature point extraction, and feature point matching on the object in the image data from the imaging device 1B and the image data of the peripheral field of view from the imaging device 1A, and detecting the matching portions.

The imaging angle-of-view frame combining unit 11 performs a process of combining the imaging angle-of-view frame 21 indicating the range of the imaging field of view detected by the range detection unit 10. That is, a frame image as the imaging angle-of-view frame 21 indicated by a dashed line in FIG. 4A is combined with the peripheral field image 20.

As a result, the user can visually recognize the peripheral field image 20 to which the imaging angle-of-view frame 21 is added, and check which portion is being imaged by the imaging device 1B.

Since the position and the size of the imaging field of view of the imaging device 1B in the peripheral field image 20 to be detected by the range detection unit 10 change with each frame as described above, the imaging angle-of-view frame combining unit 11 performs, for each frame, the process of combining the image of the imaging angle-of-view frame 21 with the detected range.

The image combining unit 12 performs a combining process of disposing a second image, which is the image of the imaging field of view of the imaging device 1B, so as to overlap the first image (the peripheral field image 20) captured by the imaging device 1A. An example of the second image is an enlarged image 22 shown in FIG. 4A. The image content captured by the imaging device 1B and displayed as the enlarged image 22 is the image content obtained by enlarging the image in the imaging angle-of-view frame 21.

As a result, the user can visually recognize the image captured by the imaging device 1B in detail while viewing the peripheral field image 20 captured by the imaging device 1A.

The size of the enlarged image 22 is only required to be a fixed size, but may be variably set by a user operation, for example.

Note that, since the size of the imaging angle-of-view frame 21 depends on the angle-of-view difference between the imaging devices 1A and 1B, there is a possibility that the size of the imaging angle-of-view frame 21 may be equal to that of the enlarged image 22 or larger than that of the enlarged image 22, and the image content might not be enlarged in some cases. However, the "enlarged image 22" is originally displayed for the purpose of displaying an enlarged image, and therefore, is called that name, for ease of explanation. Note that, as will be described later, in this embodiment, the enlarged image 22 is not displayed in a case where the image in the enlarged image 22 is not in an "enlarged" state due to the size of the imaging angle-of-view frame 21. In that sense, there will be no cases where the enlarged image 22 being displayed is not an enlarged image.

The display control unit 13 performs control to cause the display device 2 to display a combined image as shown in FIG. 4A, for example.

The user can visually recognize the image as shown in FIG. 4A on the display device 2. Accordingly, in the peripheral field image 20, the range being imaged by the imaging device 1B can be checked with the imaging angle-of-view frame 21, and be further visually recognized in detail with the enlarged image 22.

Note that, in the drawing, the imaging angle-of-view frame 21 is indicated by a dashed line, and the frame of the enlarged image 22 is indicated and surrounded by a solid line. However, different display modes may be adopted to make it easier for the user to distinguish the imaging angle-of-view frame 21 and the enlarged image 22. As the different display modes, various examples are conceivable, such as making the colors of the frames differ from each other, highlighting one of the images, making one a color image while making the other a monochromatic image, or making the luminances of them differ from each other.

In a case where the configuration shown in FIG. 1 is to be achieved with the imaging devices 1A and 1B shown in FIG. 2A, it is conceivable that the image processing device 3 and the display device 2 may be included in the goggle-type imaging device 1A, for example.

Figure 5:
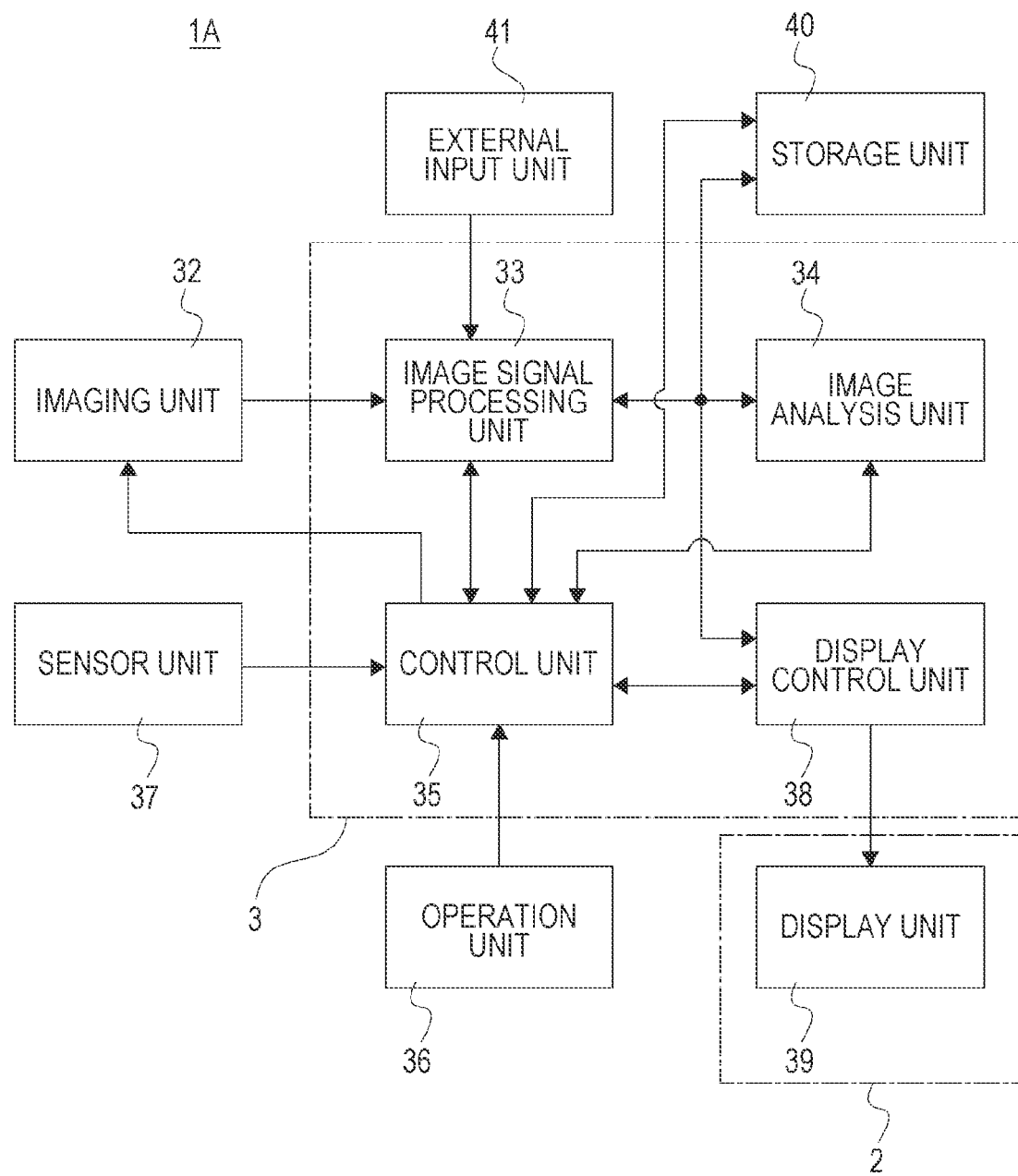
FIG. 5 is a block diagram of an imaging device according to an embodiment.

FIG. 5 shows an example configuration of the imaging device 1A in that case.

The imaging device 1A includes an imaging unit 32, an image signal processing unit 33, an image analysis unit 34, a control unit 35, an operation unit 36, a sensor unit 37, a display control unit 38, a display unit 39, a storage unit 40, and an external input unit 41.

The imaging unit 32 includes an imaging optical system and an image sensor for imaging. The image sensor is an imaging element such as a charge coupled device (CCD) sensor or a complementary metal oxide semiconductor (CMOS) sensor, for example, receives light entering from the object through the imaging optical system, converts the light into an electrical signal, and outputs the electrical signal. In the image sensor, a correlated double sampling (CDS) process, an automatic gain control (AGC) process, or the like, for example, is performed on an electrical signal obtained by photoelectrically converting received light, and an analog/digital (A/D) conversion process is further performed on the electrical signal. Image data as digital data is then output to the image signal processing unit 33 in the subsequent stage.

The image signal processing unit 33 is formed as an image processor, such as a digital signal processor (DSP), for example. The image signal processing unit 33 performs various kinds of processing on the image data input from the imaging unit 32.

For example, in a case where an image signal is assumed to be a normal visible light image, the image signal processing unit 33 performs processes such as a clamping process of clamping the black levels of red (R), green (G), and blue (B) to a predetermined level, a correction process among the color channels of R, G, and B, a demosaicing process of causing the image data for each pixel to include all the color components of R, G, and B, and a process of generating (separating) a luminance (Y) signal and a color (C) signal.

In some cases, the image signal processing unit 33 further performs a necessary resolution conversion process, such as resolution conversion for recording, communication outputs, or monitor images, for example, on the image signal subjected to the various kinds of signal processing.

There also are cases where the image signal processing unit 33 performs a compression processing for recording or communication, for example, en encoding process, or the like on the image data subjected to the resolution conversion.

The image analysis unit 34 performs an image analysis process on each frame (or intermittent frame) of the image signal subjected to predetermined processing by the image signal processing unit 33. For example, by a method such as pattern matching, it is possible to determine the type and an operating state of a body as the object, determine the region and the attribute of the object to measure the feature amount, or perform measurement based on the determination.

The information determined by the image analysis unit 34 is supplied to the control unit 35, and is used in a series of processes for measurement.

Note that the image analysis unit 34 may be designed as an artificial intelligence (AI) engine, perform an image recognition process based on machine learning, deep learning, or the like, and be capable of determining a body or recognizing feature points, for example.

The control unit 35 is formed with a microcomputer (an arithmetic processing device) that includes a central processing unit (CPU), a read only memory (ROM), a random access memory (RAM), and a flash memory.

The CPU comprehensively controls the entire imaging device 1A by executing a program stored in the ROM, the flash memory, or the like.

The RAM is used as a work area for various kinds of data processing by the CPU, to temporarily store data, programs, and the like.

The ROM and the flash memory (nonvolatile memory) are used to store an operating system (OS) for the CPU to control each component, content files such as image files, application programs for various kinds of operations, firmware, and the like.

Such a control unit 35 performs control related to imaging operations such as the shutter speed, exposure adjustment, and the frame rate in the imaging unit 32, parameter control in various kinds of signal processing in the image signal processing unit 33, and control on the analysis process being performed by the image analysis unit 34. The control unit 35 also performs a setting process, imaging operation control, display operation control, and the like, in accordance with the user's operations.

Note that the control unit 35 may include the functions of the image analysis unit 34.

The operation unit 36 may be operating components such as keys, switches, or dials provided on the device housing, or may be a touch panel or the like. Through this operation unit 36, the user may perform power-on/off operations, various setting operations, target value input operations, program activation, and the like, for example. The operation unit 36 transmits a signal corresponding to an input operation, to the control unit 35.

The sensor unit 37 comprehensively represents various sensors provided as necessary. For example, there may be various sensors such as a voice sensor, a location sensor, an illuminance sensor, a contact sensor, a temperature sensor, a distance measuring sensor, an acceleration sensor, an angular velocity sensor, an atmospheric pressure sensor, an altitude sensor, and a pressure sensor.

The display unit 39 is a display unit that performs various kinds of display for the user (the person conducting the imaging or the like), and is formed with a display device such as a liquid crystal display (LCD) or an organic electroluminescence (EL) display provided in the goggles in the goggle-type imaging device 1A, for example. The user can view an image of the object on the display unit 39 in front of the eyes by wearing the imaging device 1A.

The display control unit 38 performs a process of causing the display unit 39 to perform a display operation. For example, the display control unit includes a character generator, a display driver, and the like, for example, and, on the basis of control by the control unit 35, causes the display unit 39 to perform various kinds of display, such as the image display shown in FIG. 4A, for example.

Further, the display control unit 38 may cause the display unit 39 to reproduce and display a still image or a moving image recorded on a recording medium.

On the basis of an instruction of the control unit 35, the display control unit 38 may also cause the display unit 39 to display various operation menus, icons, messages, and the like, which are displays as graphical user interfaces (GUI) on the screen.

The storage unit 40 is formed with a nonvolatile memory, for example, and stores image files of still image data, moving image data, and the like captured by the imaging unit 32, for example, attribute information about the image files, thumbnail images, and the like.

The storage unit 40 can take various forms in practice. For example, the storage unit 40 may be a flash memory included in the imaging device 1A, or may be formed with a memory card (for example, a portable flash memory) that can be detachably attached to the imaging device 1A and a card recording/reproducing unit that makes recording/reproducing access to the memory card. Alternatively, as a component to be included in the imaging device 1A, the storage unit 40 may be formed as a hard disk drive (HDD) or the like.

The external input unit 41 receives inputs of information from an external device by cable communication or wireless communication. In this case, it is conceivable that the external input unit is designed as a communication unit for receiving inputs of image data and additional information from the imaging device 1B.

In the above configuration, the image processing device 3 in FIG. 1 is formed as part of the functions of the image signal processing unit 33, the image analysis unit 34, the control unit 35, and the display control unit 38, for example. Also, the display device 2 in FIG. 1 is formed with the display unit 39.

Note that, although the configuration of the imaging device 1A has been described with reference to FIG. 5, the imaging device 1B also has a configuration substantially equal to that shown in FIG. 5, as long as it functions as a conventional camera.

2. First Embodiment

In the description below, various examples of processes to be performed by the image processing device 3 according to embodiments will be described.

In this embodiment, the image processing device 3 (the imaging device 1A including the image processing device 3, for example) performs display as shown in FIG. 4A on the display unit 39, so that the user can view the imaging angle-of-view frame 21 and the enlarged image 22, as well as the peripheral field image 20.

The enlarged image 22 may be displayed to be superimposed on a fixed position within the peripheral field image 20, for example. Particularly, as the enlarged image 22 is displayed within the peripheral field image 20, the user can visually recognize both the entire peripheral field image 20 and the enlarged image 22 without moving the line of sight greatly, and it is convenient for the user to check both images, which are the periphery and the target object. As the imaging angle-of-view frame 21 is also within the peripheral field image 20, it is of course easy to visually recognize the imaging angle-of-view frame 21, and the user can easily recognize the positional state of the object captured in the enlarged image 22.

However, as described above, the position and the size of the imaging angle-of-view frame 21 change. For this reason, the imaging angle-of-view frame 21 may have a position or a size to overlap the enlarged image 22 in some cases. In such a case, either the imaging angle-of-view frame 21 or the enlarged image 22 becomes difficult to see, or visibility deteriorates due to the overlap.

Therefore, in the embodiment, the layout position of the enlarged image 22 is made variable depending on the imaging angle-of-view frame 21, so that an easy-to-view display state is maintained.

Figure 4B:
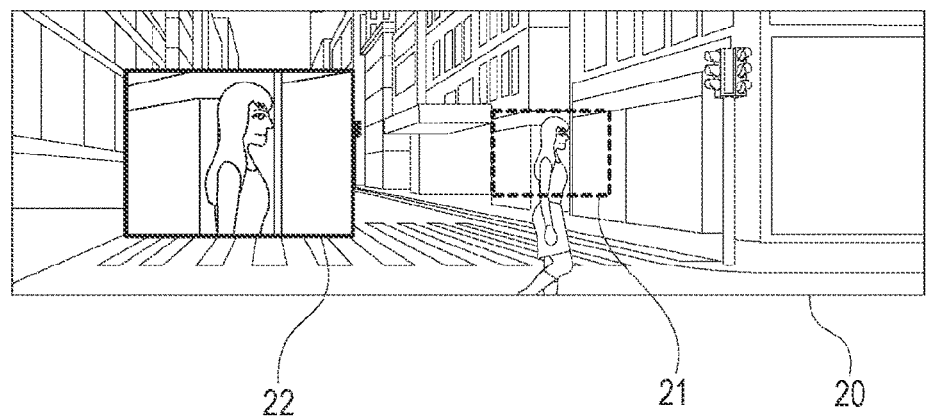

For example, as shown in FIG. 4A, the enlarged image 22 is disposed at a predetermined distance on the right side of the imaging angle-of-view frame 21. However, in a case where the imaging angle-of-view frame 21 is at a position on the right side in the peripheral field image 20, the enlarged image 22 is disposed at a predetermined distance on the left side, as shown in FIG. 4B, for example.

With this arrangement, for example, both the imaging angle-of-view frame 21 and the enlarged image 22 become easily visible, regardless of the position and the size of the imaging angle-of-view frame 21.

Figure 6:
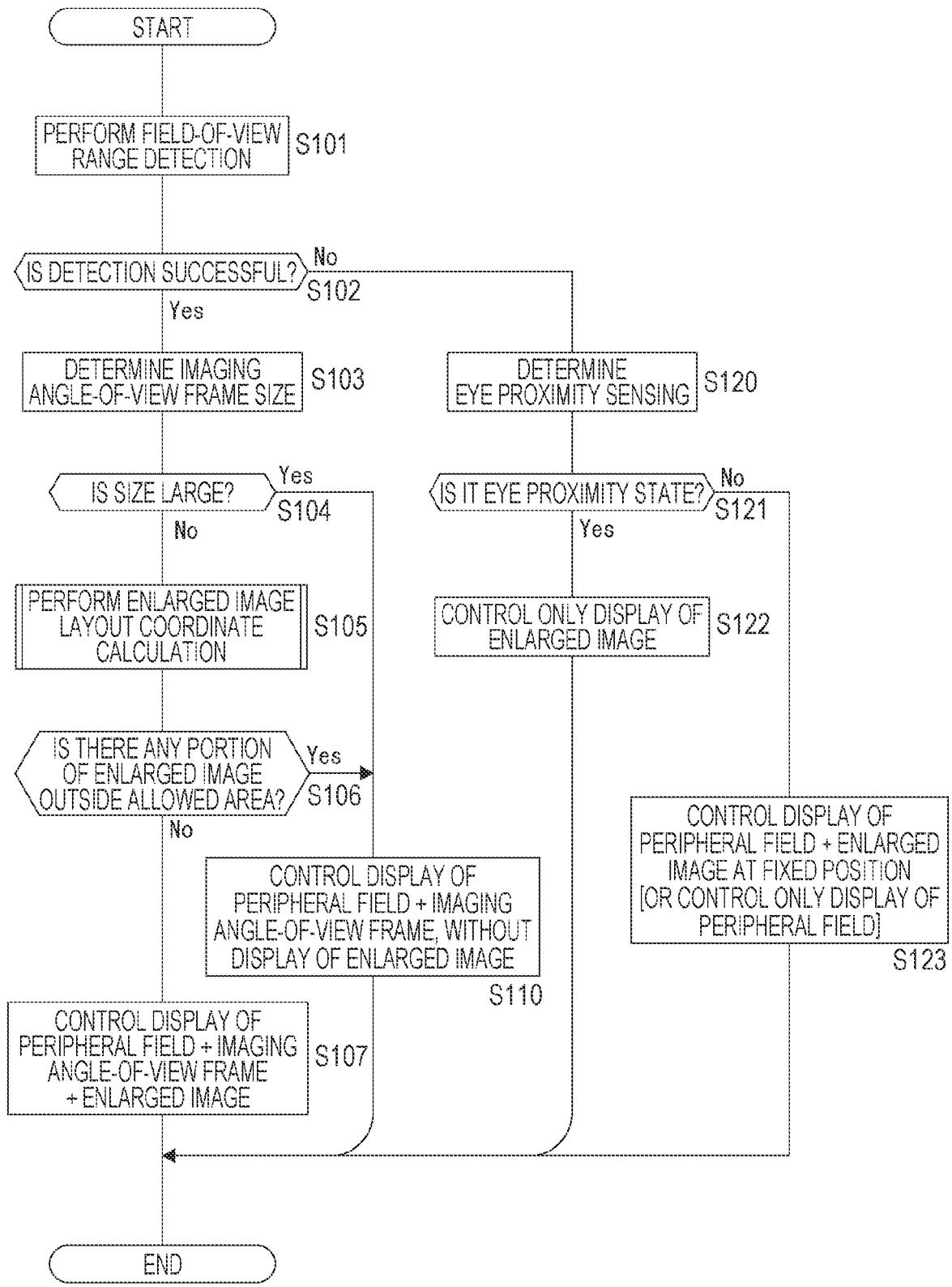
FIG. 6 is a flowchart of an example process according to first to fifth embodiments.
Figure 7:
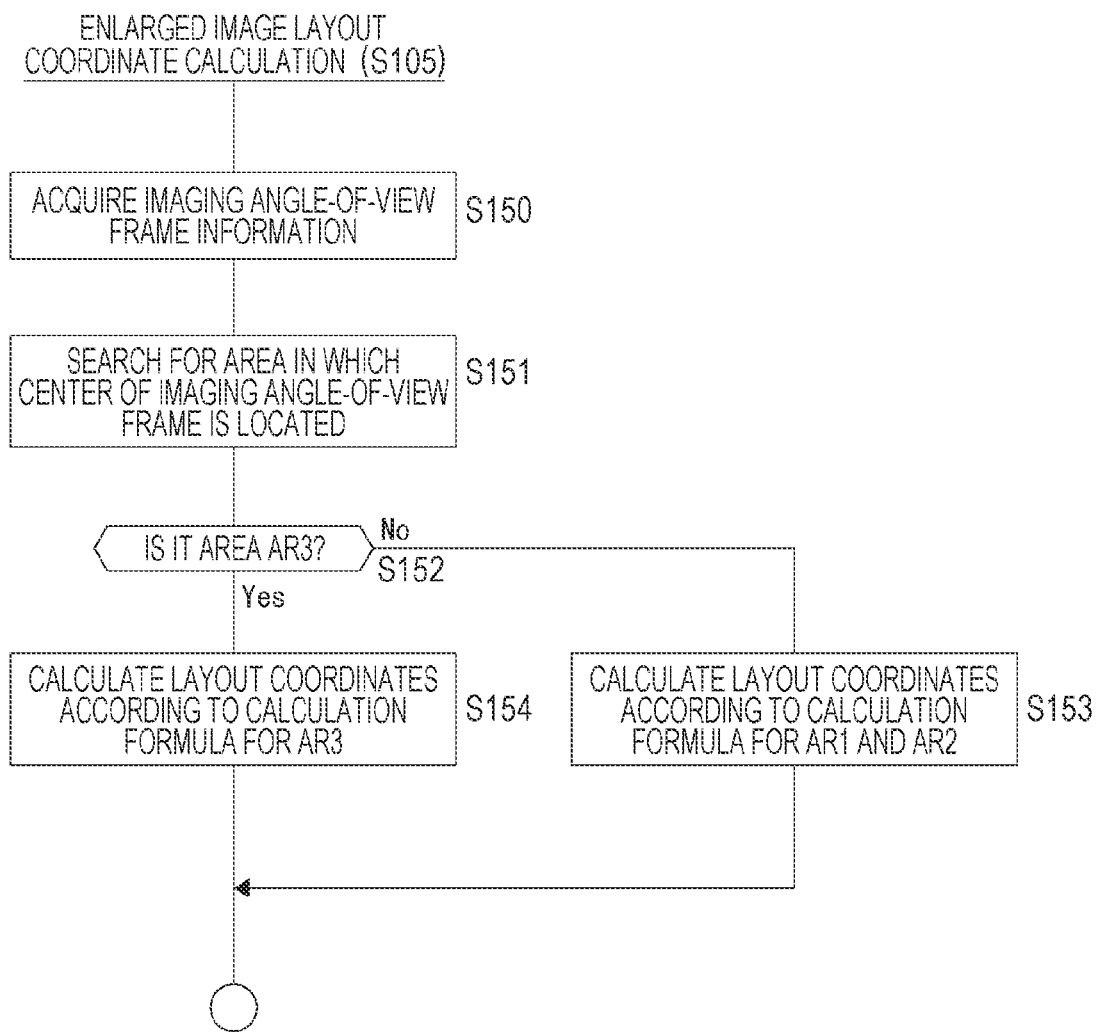
FIG. 7 is a flowchart of an enlarged image layout coordinate calculation process according to the first embodiment.

A specific example as the first embodiment is now described with reference to FIGS. 6 and 7. FIGS. 6 and 7 show processes to be performed by the image processing device 3 having the functions of the range detection unit 10, the imaging angle-of-view frame combining unit 11, the image combining unit 12, and the display control unit 13.

Particularly, this example of processes involves processes to be performed in a case where, while the peripheral field image 20 being captured by the imaging device 1A is displayed on the display device 2, the imaging angle-of-view frame 21 and the enlarged image 22 of the image (a through-lens image or the like) being captured by the imaging device 1B are superimposed and displayed on the peripheral field image 20.

The processes shown in FIG. 6 are performed for each one frame of image data captured by the imaging device 1B, for example. Note that the processes may be performed for each intermittent frame.

In step S101 in FIG. 6, the image processing device 3 performs visual field range detection with the functions of the range detection unit 10. This process is a process of detecting which range in the peripheral field image 20 being currently captured by the imaging device 1A corresponds to the image of the frame being currently captured by the imaging device 1B. That is, the range in which the imaging angle-of-view frame 21 is to be displayed is detected.

As described above, the image processing device 3 detects the difference in imaging conditions between the imaging device 1A and the imaging device 1B, and detects the imaging field of view of the imaging device 1B relative to the peripheral field of view. Alternatively, the imaging field of view of the imaging device 1B relative to the peripheral field of view is detected by image analysis.

Note that the field of view as the peripheral field image 20 varies depending on the imaging direction and the zooming state of the imaging device 1A, and the field of view of the image being captured by the imaging device 1B also varies depending on the imaging direction and the zooming state. Therefore, in the visual field range detection in step S101, an image range that matches the captured image in the current frame of the imaging device 1B is detected in the captured image in the current frame of the imaging device 1A.

In step S103, at the image processing device 3, the process branches depending on whether or not the imaging field of view of the imaging device 1B is successfully detected in the peripheral field image 20. For example, in a case where the imaging device 1B blocks the field of view in front of the lens of the imaging device 1A as shown in FIG. 2B, or in a case where the imaging directions of the imaging devices 1A and 1B are greatly different from each other as shown in FIG. 2C, the imaging field of view of the imaging device 1B may not be included in the peripheral field image 20 in some cases.

On the other hand, in a case where the imaging devices 1A and 1B have substantially the same imaging directions as shown in FIG. 2A, or in a case where the imaging directions are slightly different from each other, the imaging field of view of the imaging device 1B is included in the peripheral field image 20, and the detection in step S101 is possible.

First, a case where the imaging field of view of the imaging device 1B is successfully detected in the peripheral field image 20 is described.

In that case, the image processing device 3 proceeds from step S102 to step S103, and determines the size of the imaging angle-of-view frame 21 to be displayed. That is, it is the size of the range of the imaging field of view of the imaging device 1B in the peripheral field image 20 detected in step S101, and is the area thereof, for example.

In step S104, the process branches depending on whether or not the size of the imaging angle-of-view frame 21 is determined to be large. In this case, for example, it is determined whether or not the size of the imaging angle-of-view frame 21 is larger than the size of the enlarged image 22. Alternatively, it is determined whether or not the size of the imaging angle-of-view frame 21 is larger than a predetermined value. The processes in steps S103 and S104, and in a case where the size is determined to be large will be described later.

For example, if the difference in angle of view between the imaging devices 1A and 1B is large, and the size is determined not to be large in step S104, the image processing device 3 moves on to step S105, and performs enlarged image layout coordinate calculation.

The process of this enlarged image layout coordinate calculation is shown in FIG. 7.

Here, prior to explanation with reference to FIG. 7, the coordinate system to be used for the calculation is described with reference to FIG. 8.

Figure 8:
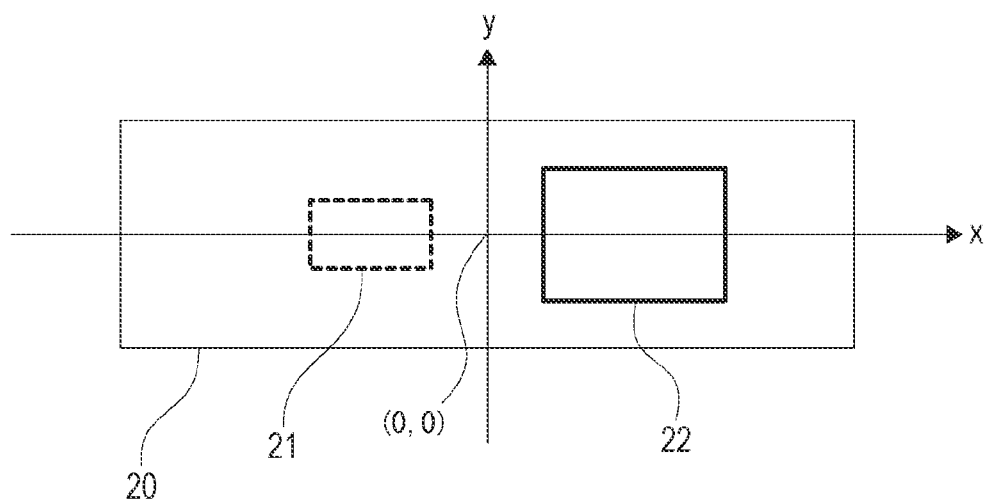
FIG. 8 is an explanatory diagram of the x-y coordinate system to be used in various calculations according to an embodiment.

FIG. 8 shows a coordinate system using the x-axis and the y-axis, with the central coordinates of the peripheral field image 20 being the origin (0, 0). In the coordinate system of the peripheral field image 20, the positions of the imaging angle-of-view frame 21 and the enlarged image 22 are expressed by coordinates.

Figure 9:
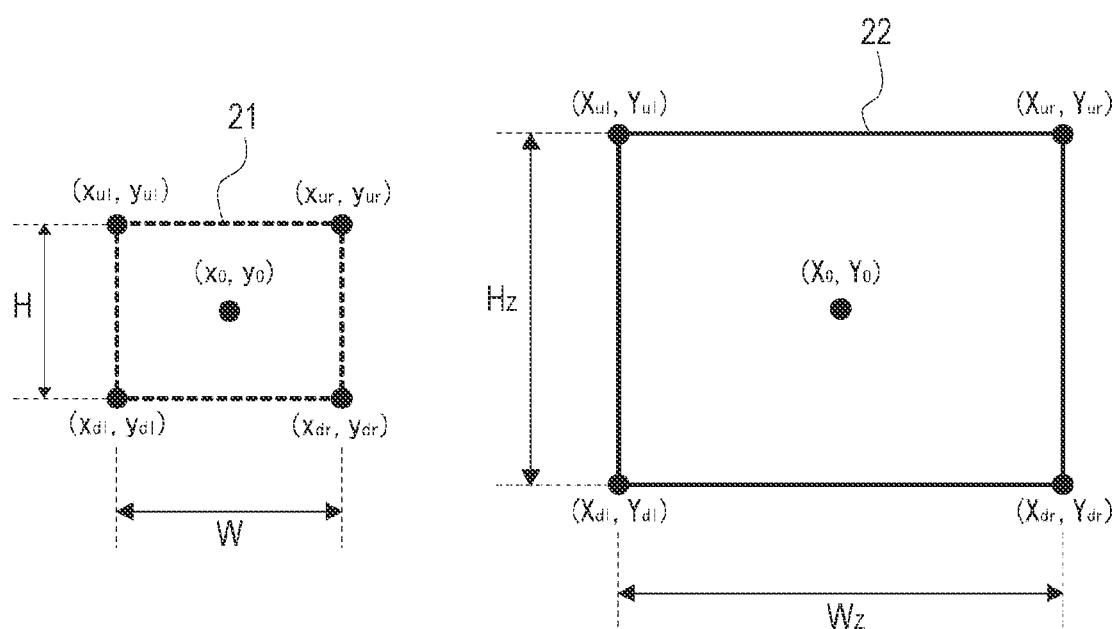
FIG. 9 is an explanatory diagram of the coordinate values to be used in various calculations according to an embodiment.

Specifically, as shown in FIG. 9, the coordinates and the size of the imaging angle-of-view frame 21 are expressed as follows.

Central coordinates: (x0, y0)
Upper left corner coordinates: (xul, yul)
Upper right corner coordinates: (xur, yur)
Lower left corner coordinates: (xdl, ydl)
Lower right corner coordinates: (xdr, ydr)
Vertical size: H
Horizontal size: W Likewise, the coordinates and the size of enlarged image 22 are expressed as follows.

Central coordinates: (X0, Y0)
Upper left corner coordinates: (Xul, Yul)
Upper right corner coordinates: (Xur, Yur)
Lower left corner coordinates: (Xdl, Ydl)
Lower right corner coordinates: (Xdr, Ydr)
Vertical size: Hz
Horizontal size: Wz The image processing device 3 acquires imaging angle-of-view frame information in step S150 in FIG. 7 in the enlarged image layout coordinate calculation. That is, the respective coordinate values of the center and the four corners of the imaging angle-of-view frame 21 shown in FIG. 9 are acquired on the basis of information about the field of view obtained in step S101 in FIG. 6.

In step S151, the image processing device 3 searches for the center of the imaging angle-of-view frame 21, which is the area in which the central coordinates (x0, y0) are located.

Here, the image processing device 3 sets a plurality of divided areas in the peripheral field image 20. As an example, FIG. 10A shows areas AR1, AR2, and AR3 obtained by horizontally dividing the peripheral field image 20 into three at boundary lines BD1 and BD2.

Figure 10A:
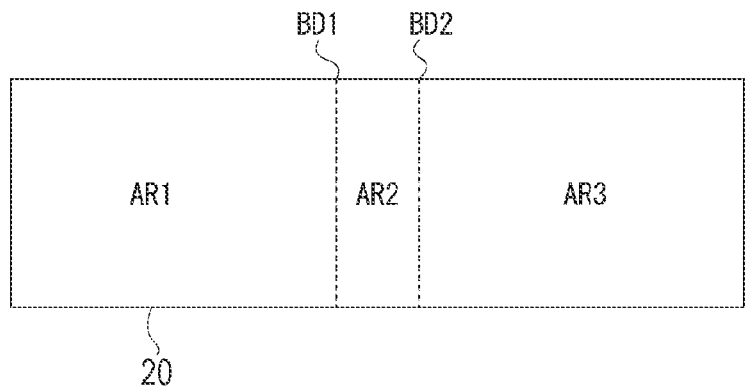
FIGS. 10A, 10B, 10C, and 10D are explanatory diagrams of area segmentation and enlarged image layout position setting according to the first embodiment.

Note that the peripheral field image may be divided so that the respective areas have the same size, but FIG. 10A shows an example in which the central area AR2 is narrower than the others.

In the area search in step S151 of FIG. 7, it is determined in which area the central coordinates (x0, y0) are located among the areas AR1, AR2, and AR3. Since the image processing device 3 grasps the range or the boundary of each of the areas AR1, AR2, and AR3 by the coordinate values, this process can be performed by a simple comparison calculation of the coordinate values.

In step S152, at the image processing device 3 the process branches depending on whether or not the central coordinates (x0, y0) are located in the area AR3.

In a case where the central coordinates (x0, y0) are located in the area AR1 or the area AR2, the image processing device 3 moves on to step S153, and calculates the layout coordinates of the enlarged image 22 using the calculation formulas set for the areas AR1 and AR2.

In a case where the central coordinates (x0, y0) are located in the area AR3, on the other hand, the image processing device 3 moves on to step S154, and calculates the layout coordinates of the enlarged image 22 using the calculation formulas set for the area AR3.

Figure 10B:
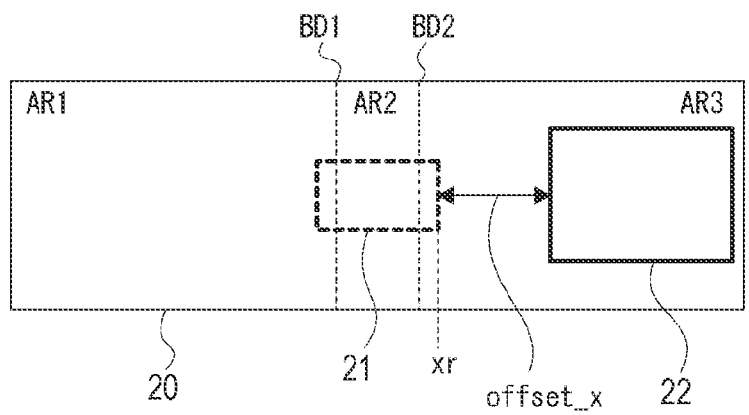
Figure 10C:
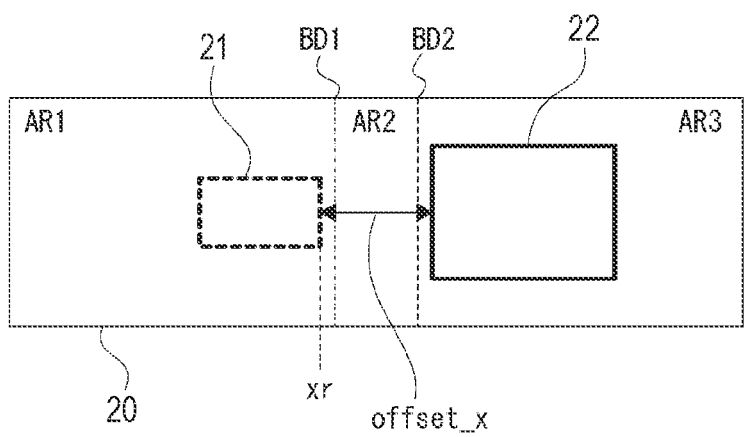

For example, FIG. 10B shows a case where the central coordinates (x0, y0) of the imaging angle-of-view frame 21 are located in the area AR2, and FIG. 10C shows a case where the central coordinates (x0, y0) of the imaging angle-of-view frame 21 are located in the area AR1. In either case, the enlarged image 22 is disposed, with a predetermined horizontal offset amount offset_x being provided on the right side of the imaging angle-of-view frame 21.

Figure 10D:
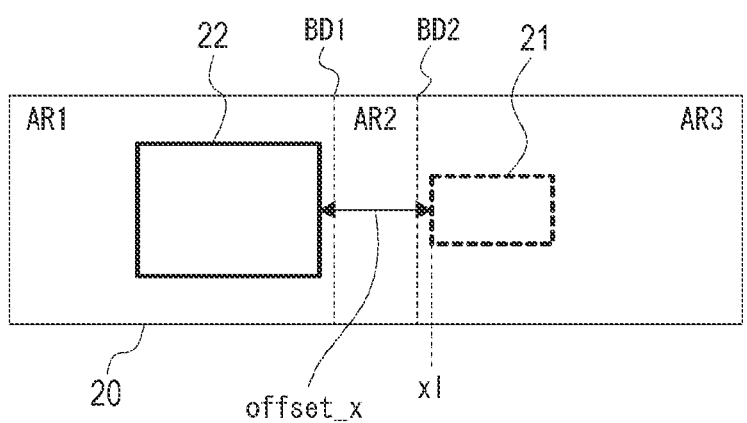

On the other hand, FIG. 10D shows a case where the central coordinates (x0, y0) of the imaging angle-of-view frame 21 are located in the area AR3. In either case, the enlarged image 22 is disposed, also with the horizontal offset amount offset_x being provided on the left side of the imaging angle-of-view frame 21.

In this manner, the layout position of the enlarged image 22 is made different between the right side and the left side, depending on the area in which the central coordinates (x0, y0) of the imaging angle-of-view frame 21 are located. The enlarged image 22 is then disposed, with the constant horizontal offset amount offset_x being provided relative to the imaging angle-of-view frame 21.

Various examples are conceivable as the layout coordinate calculation for disposing the enlarged image 22 in such a manner, but first, example calculations based on the end sides of the imaging angle-of-view frame 21 are described.

Calculation Formulas for the Areas AR1 and AR2

In a case where the central coordinates (x0, y0) of the imaging angle-of-view frame 21 are located in the area AR1 or AR2, the image processing device 3 calculates the coordinates of the four corners of the enlarged image 22 in the process in step S153 as shown below.

$$(Xul, Yul) = (xr + \text{offset\_}x, y0 + Hz/2)$$

$$(Xur, Yur) = (xr + \text{offset\_}x + Wz, y0 + Hz/2)$$

$$(Xdl, Ydl) = (xr + \text{offset\_}x, y0 - Hz/2)$$

$$(Xdr, Ydr) = (xr + \text{offset\_}x + Wz, y0 - Hz/2)$$

Here, "xr" represents the x-coordinate value of the right end side of imaging angle-of-view frame 21 (see FIGS. 10B and 10C). That is, xr=xur=xdr.

Calculation Formulas for the Area AR3

In a case where the central coordinates (x0, y0) of the imaging angle-of-view frame 21 are located in the area AR3, the image processing device 3 calculates the coordinates of the four corners of the enlarged image 22 in the process in step S154 as shown below.

$$(Xul, Yul) = (xl - \text{offset\_}x - Wz, y0 + Hz/2)$$

$$(Xur, Yur) = (xl - \text{offset\_}x, y0 + Hz/2)$$

$$(Xdl, Ydl) = (xl - \text{offset\_}x - Wz, y0 - Hz/2)$$

$$(Xdr, Ydr) = (xl - \text{offset\_}x, y0 - Hz/2)$$

Further, "xl" represents the x-coordinate value of the left end side of imaging angle-of-view frame 21 (see of FIG. 10D). That is, xl=xul=xdl.

Instead of the above, the layout coordinate calculation for disposing the enlarged image 22 can also be performed by example calculations based on the central coordinates (x0, y0) of the imaging angle-of-view frame 21 as shown below.

Calculation Formulas for the Areas AR1 and AR2

In a case where the central coordinates (x0, y0) of the imaging angle-of-view frame 21 are located in the area AR1 or AR2, the image processing device 3 calculates the central coordinates (X0, Y0) of the enlarged image 22 in the process in step S153 as shown below.

$$(X0, Y0) = (x0 + W/2 + \text{offset\_}x + Wz/2, y0)$$

The coordinate values of the four corners of the enlarged image 22 are then calculated as follows.

$$(Xul, Yul) = (X0 - Wz/2, Y0 + Hz/2)$$

$$(Xur, Yur) = (X0 + Wz/2, Y0 + Hz/2)$$

$$(Xdl, Ydl) = (X0 - Wz/2, Y0 - Hz/2)$$

$$(Xdr, Ydr) = (X0 + Wz/2, Y0 - Hz/2)$$

Calculation Formulas for the Area AR3

In a case where the central coordinates (x0, y0) of the imaging angle-of-view frame 21 are located in the area AR3, the image processing device 3 calculates the central coordinates (X0, Y0) of the enlarged image 22 in the process in step S154 as shown below.

$$(X0, Y0) = (x0 - W/2 - \text{offset\_}x - Wz/2, y0)$$

The coordinate values (Xul, Yul), (Xur, Yur), (Xdl, Ydl), and (Xdr, Ydr) of the four corners of the enlarged image 22 are then calculated in a manner similar to the above.

For example, after the layout position of the enlarged image 22 is calculated in step S153 or step S154 in FIG. 7 by the calculation based on the end sides or the center of the imaging angle-of-view frame 21 as described above, the image processing device 3 moves on to step S106 in FIG. 6.

In step S106, the image processing device 3 checks whether or not there is a portion outside the peripheral field image 20, as the layout state of the enlarged image 22.

Processes related to the check of an outside portion will be described later.

In a case where it is determined that the enlarged image 22 does not have any portion protruding from the peripheral field image 20, the image processing device 3 moves on to step S107, and control display of the imaging angle-of-view frame 21 and the enlarged image 22 in the peripheral field image 20.

As a result, the imaging angle-of-view frame 21 and the enlarged image 22 are displayed in the peripheral field image 20, with the display device 2 in the layout state shown in FIG. 10B, 10C, or 10D.

Particularly, since the enlarged image 22 is displayed with the predetermined horizontal offset amount offset_x in the direction depending on the areas of the imaging angle-of-view frame 21, the imaging angle-of-view frame 21 and the enlarged image 22 do not overlap each other, and have a positional relationship in which both are easy to visually recognize.

The processes described so far are performed in a case where the imaging angle-of-view frame 21 and the enlarged image 22 can be appropriately displayed. However, there are cases where these images cannot be displayed or it is better not to display these images.

In the description below, such exceptional processes are explained.

First, a case where the range of the field of view of the imaging device 1B cannot be detected in the peripheral field image 20 in step S101 in FIG. 6 is described.

In this case, the image processing device 3 proceeds from step S102 to step S120, and performs eye proximity sensing determination.

The eye proximity herein refers to a case where the user brings the imaging device 1B immediately before the imaging device 1A (that is, in front of the eyes of the user) as shown in FIG. 2B.

In step S120, the image processing device 3 determines whether or not such an eye proximity state is detected.

Various methods may be used as the method for this determination.

For example, in a case where another object exists immediately before the lens of the imaging unit 32 using the distance measuring sensor of the imaging device 1A, there is a high possibility of an eye proximity state.

Figure 11A:
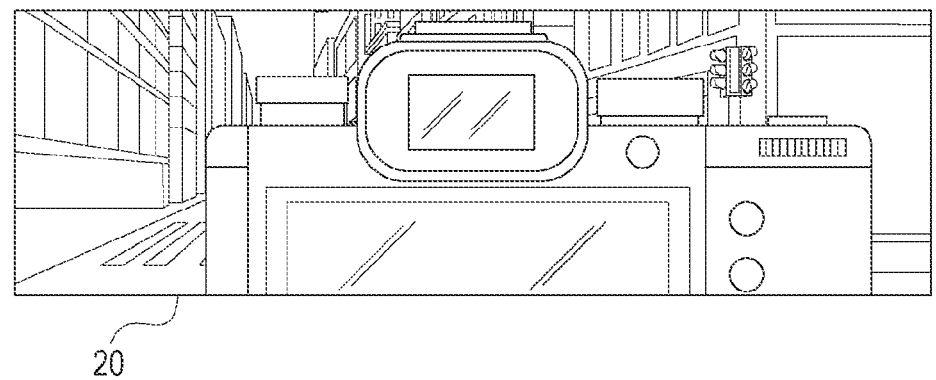
FIGS. 11A and 11B are explanatory diagrams of display images in an eye proximity state according to an embodiment.

Also, in an eye proximity state, the peripheral field image 20 being captured by the imaging device 1A may include the back surface side of the imaging device 1B in a wide range of the screen (or is in an out-of-focus state) as shown in FIG. 11A, for example. Therefore, a state in which an image presumed to be an image of the imaging device 1B is included in a wide range in the captured image can be determined to be an eye proximity state by image analysis.

Further, in a case where the imaging device 1B held with a hand of the user as shown in FIGS. 2A, 2B, and 2C perform imaging, it is also possible to acquire information about the angular velocity sensor, the acceleration sensor, the posture sensor, and the like of the imaging device 1B, and presume that the imaging device 1B is at a position or in a posture in an eye proximity state as shown in FIG. 2B.

Alternatively, a contact sensor may be provided on the front surface of the imaging device 1A to detect contact with an object such as the imaging device 1B.

Further, in a case where the imaging devices 1A and 1B include a highly accurate location sensor, eye proximity can be detected through the positional relationship between them.

The image processing device 3 can determine an eye proximity state by one or a combination of a plurality of these methods, for example.

In a case where an eye proximity state is determined, the image processing device 3 proceeds from step S121 to step S122, and performs display control only on the enlarged image 22.

Figure 11B:

That is, in the display device 2, the peripheral field image 20 and the imaging angle-of-view frame 21 are not displayed, but only the enlarged image 22 is displayed at the center in the screen as shown in FIG. 11B, for example.

When the peripheral field image 20 becomes as shown in FIG. 11A in an eye proximity state, for example, the periphery is not appropriately displayed, and the image of the imaging field of view of the imaging device 1B is not included either. Accordingly, the imaging angle-of-view frame 21 cannot be displayed either.

Therefore, only the enlarged image 22 as the image being captured by the imaging device 1B is displayed. Particularly, in the case of the posture shown in FIG. 2B, the user feels as if looking into the viewfinder of the imaging device 1B, displaying only the image being captured by the imaging device 1B does not cause any strangeness.

On the other hand, in a case where an eye proximity state is not determined in step S120, the process being performed by the image processing device 3 proceeds from step S121 to step S123.

This is considered to be a case where the imaging directions of the imaging devices 1A and 1B are greatly different from each other, and the image of the imaging field of view of the imaging device 1B does not exist in the image (the peripheral field image 20) being captured by the imaging device 1A, as shown in FIG. 2C, for example.

Figure 12A:
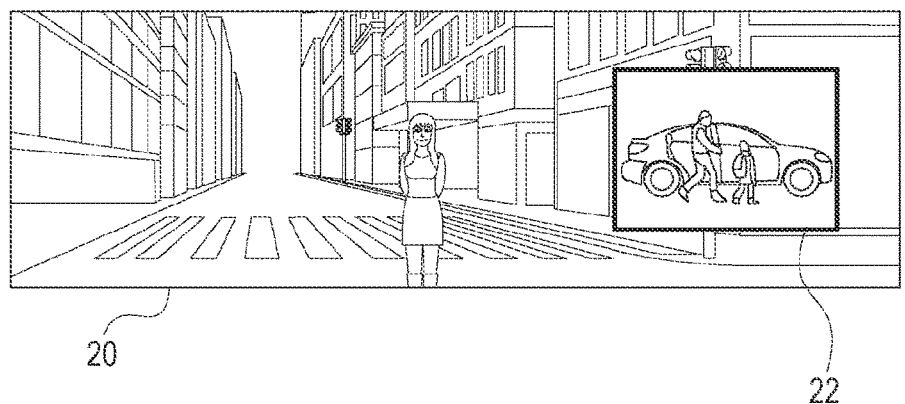
FIGS. 12A and 12B are explanatory diagrams of a state of specific position display or non-display of an enlarged image according to an embodiment.

Therefore, the image processing device 3 performs control so that the peripheral field image 20 and the enlarged image 22 are displayed as shown in FIG. 12A, for example.

In this case, as a matter of course, the imaging angle-of-view frame 21 is not displayed. This is because there exists no corresponding portion. The enlarged image 22 is displayed at a fixed position in the peripheral field image 20. In the example in FIG. 12A, the enlarged image 22 is superimposed and displayed on the right corner portion of the peripheral field image 20.

Note that, in such a case, the image processing device 3 may perform control so that only the peripheral field image 20 is displayed, as shown in FIG. 12 B.

Figure 12B:
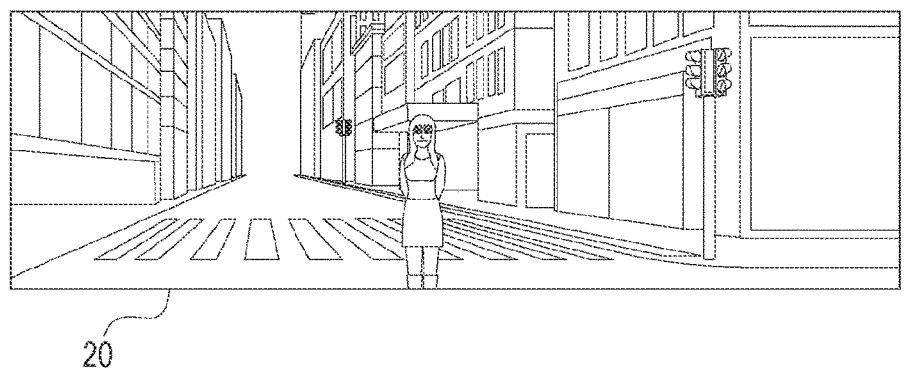

In the display shown in FIG. 12B, when the user is in the posture shown in FIG. 2C, for example, it is easy for the user to recognize a state in which the field of view of the imaging device 1B is not included in the peripheral field image 20 substantially corresponding to the user's field of view.

Conversely, in the display shown in FIG. 12A, the object being captured by the imaging device 1B can be recognized in a case where the user checks the peripheral field of view with the user's face in any direction.

Since both examples have advantages, in a case where the process moves on to step S123, the user may be allowed to select whether to have the enlarged image 22 displayed in a fixed manner as shown in FIG. 12A, or whether to have the enlarged image 22 hidden as shown in FIG. 12B.

Next, the process related to the size of the imaging angle-of-view frame 21 in step S104 in FIG. 6 is described.

Even in a case where the range of the imaging angle-of-view frame 21 in the peripheral field image 20 is successfully determined, if the size is determined to be "large size" in step S104, the image processing device 3 moves on to step S110.

Figure 13A:
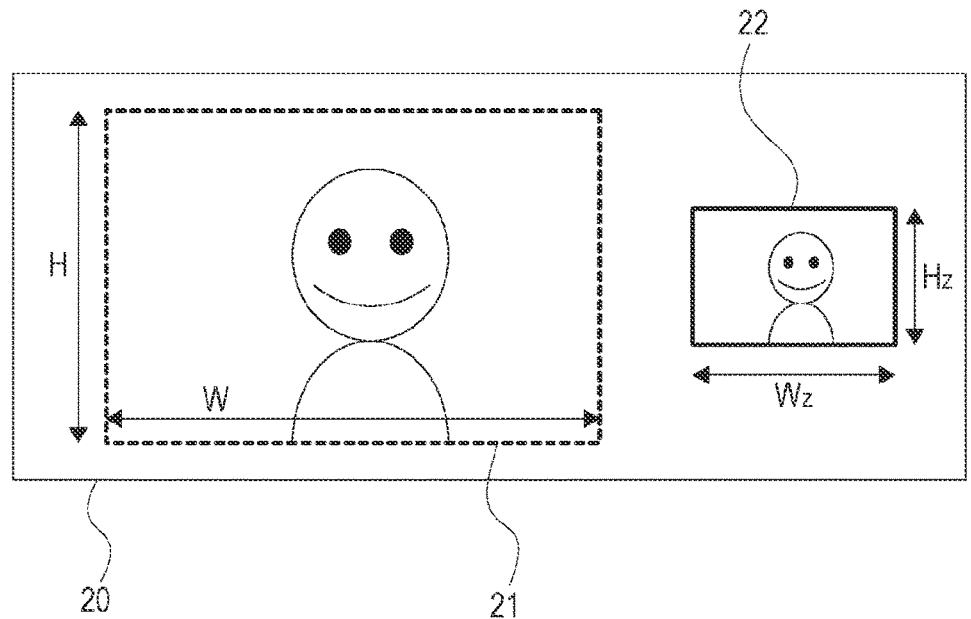
FIGS. 13A and 13B are explanatory diagrams of non-display of an enlarged image depending on the size of an imaging angle-of-view frame according to an embodiment.

The "large size" of the imaging angle-of-view frame 21 refers to a state shown in FIG. 13A. That is, it is a case where the range surrounded by the imaging angle-of-view frame 21 is larger than the enlarged image 22.

Specifically, in step S104, it is only required to determine whether or not the following is satisfied:

$$W \times H \leq Wz \times Hz$$

Note that the size "Wz×Hz" of the enlarged image 22 may be a fixed size.

If W×H≤Wz×Hz is not satisfied, the process moves on to step S105, and display shown in FIG. 10B, 10C, or 10D is performed. In this case, the enlarged image 22 is larger than the imaging angle-of-view frame 21, and therefore, it is meaningful to display the enlarged image 22. That is, as described above, the user can visually recognize the details of the image being captured by the imaging device 1B.

On the other hand, when W×H≤Wz×Hz is satisfied, if processing is performed in a similar manner, the display shown in FIG. 13A is obtained, and there will be no point in displaying the enlarged image 22. This is because the image being captured by the imaging device 1B can visually recognized in detail through the image in the range of the imaging angle-of-view frame 21 (that is, part of the image being captured by the imaging device 1A).

Figure 13B:
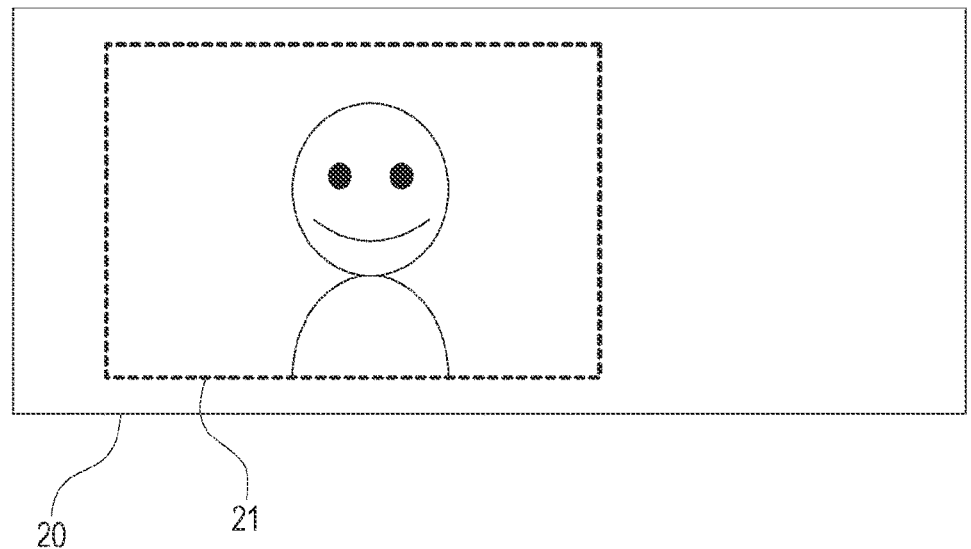

Therefore, the image processing device 3 moves on to step S110, and performs display control on the peripheral field image 20 and the imaging angle-of-view frame 21 while hiding the enlarged image 22. That is, the display shown in FIG. 13B is performed in the display device 2.

Note that such a state may correspond to a case where the angle-of-view difference between the imaging devices 1A and 1B becomes smaller as the imaging device 1B performs wide-angle imaging, for example.

Also, in step S104, in addition to the determination as to whether W×H≤Wz×Hz, a check may be made to determine whether W×H≤(threshold thS). That is, when the size of the imaging angle-of-view frame 21 is equal to or larger than a predetermined size, the process may move on to step S110.

The threshold thS as the predetermined size in this case is not necessarily the size of the enlarged image 22. For example, even if the imaging angle-of-view frame 21 is slightly smaller than the enlarged image 22, the significance of displaying the enlarged image 22 might be reduced when the imaging angle-of-view frame 21 is relatively large. Therefore, in a case where the imaging angle-of-view frame 21 has a size equal to or larger than a certain size, and the object in the frame can be visually recognized in sufficient detail, the process moves on to step S110, and the enlarged image 22 may be hidden.

Figure 14A:
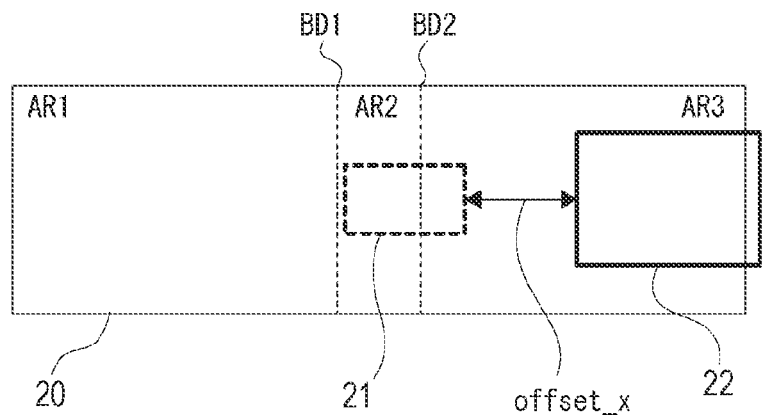
FIGS. 14A, 14B, and 14C are explanatory diagrams of a process to be performed when an enlarged image has an outside portion according to an embodiment.

Next, the process in step S106 in FIG. 6 is described. When the layout position of the enlarged image 22 is calculated in accordance with the position/size of the imaging angle-of-view frame 21 in step S105, there may be a case where the enlarged image 22 has a portion outside the peripheral field image 20, as shown in FIG. 14A, for example. The size of the outside portion varies. A region of less than ½ of the enlarged image 22 might be located outside as shown in FIG. 14B, or a region of ½ or more of the enlarged image 22 might be located outside as shown in FIG. 14B.

Basically, whether to dispose the enlarged image 22 on the right side or the left side is determined depending on the areas AR1, AR2, and AR3 as described above. However, since the layout position is set after an offset amount offset_x from the imaging angle-of-view frame 21 is secured, an outside portion as shown in FIG. 14A, 14B, or 14C is likely to occur when the size of the imaging angle-of-view frame 21 becomes larger.

The allowable range may be set for such outside portions in various manners.

Figure 14B:
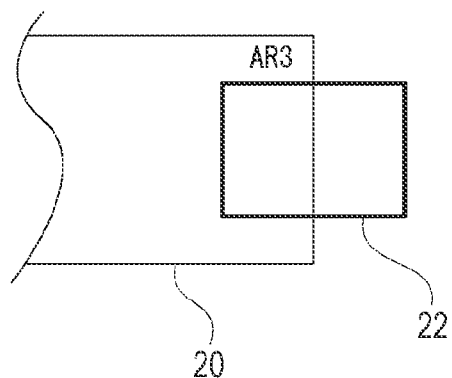
Figure 14C:
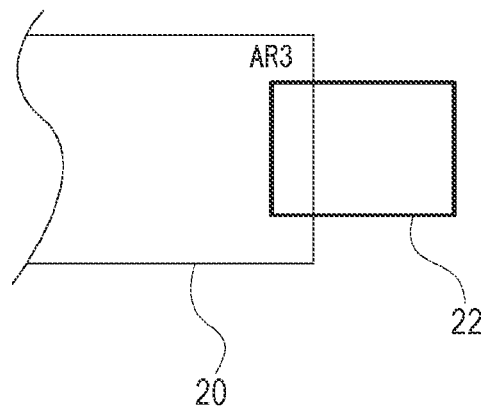

For example, in a case where an outside portion of less than ½ of the region of the enlarged image 22 is set as the allowable range, the outside portions shown in FIGS. 14A and 14B are determined to in the allowable range, and the process moves on to step S107. On the other hand, the outside portion shown in FIG. 14C is regarded unacceptable, and the process moves on to step S110. As described above, in step S110, enlarged image 22 is hidden (see FIG. 13B).

With this arrangement, in a case where the enlarged image 22 has a portion outside the allowable range, the enlarged image 22 is not displayed, so that display with poor appearance is not performed. Further, as long as the setting of the areas AR1, AR2, and AR3, and the corresponding calculation formulas for the enlarged image 22 are appropriate, it can be said that an outside portion appears when the size of the imaging angle-of-view frame 21 increases to a certain extent. Therefore, there also are circumstances in which it is easy to check the image being captured by the imaging device 1B through the image in the range of the imaging angle-of-view frame 21, without forcibly displaying the enlarged image 22.

As the above processes shown in FIG. 6 are performed, the imaging angle-of-view frame 21 and the enlarged image 22 are appropriately displayed in the peripheral field image 20 without any overlap. Also, each of the images, which are the peripheral field image 20, the imaging angle-of-view frame 21, and the enlarged image 22, is displayed in accordance with the situation.

3. Second Embodiment

An example in which a focus frame is used is now described as a second embodiment.

Figure 15A:
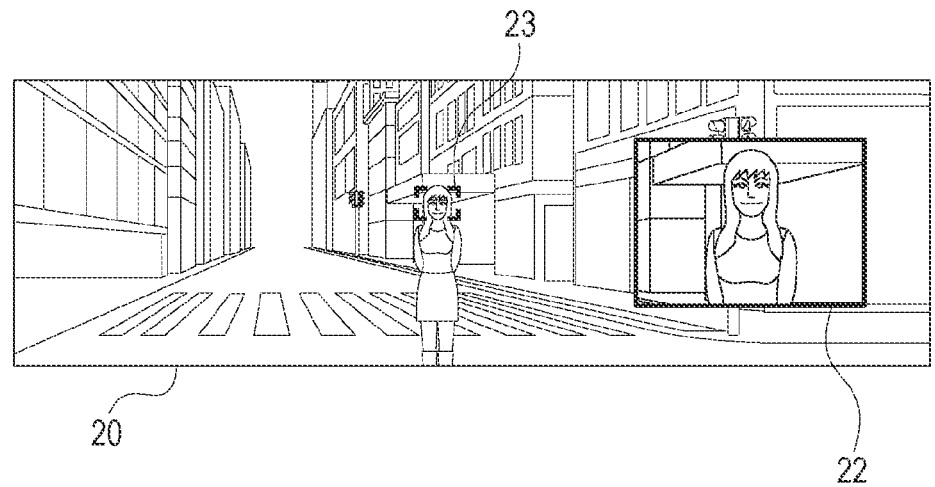
FIGS. 15A and 15B are explanatory diagrams of a focus frame according to a second embodiment.

For example, as shown in FIG. 15A, a focus frame 23 is displayed in place of the imaging angle-of-view frame 21 in the peripheral field image 20.

Figure 15B:
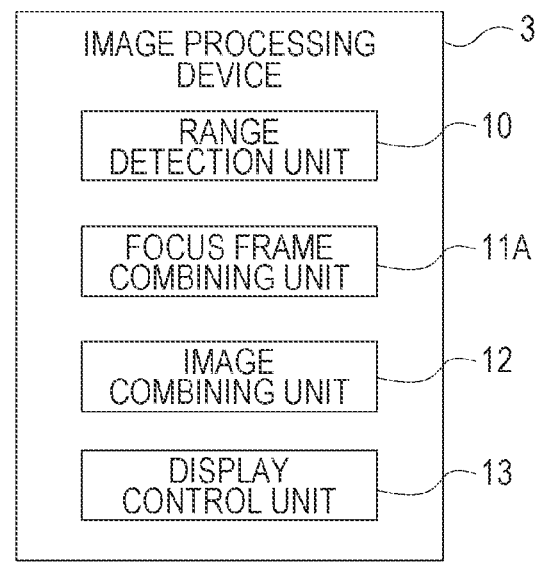

The image processing device 3 only has to perform processes related to the focus frame 23, instead of the above-described processes related to the imaging angle-of-view frame 21. For example, as shown in FIG. 15B, the functional configuration of the image processing device 3 includes a focus frame combining unit 11A, instead of the imaging angle-of-view frame combining unit 11 shown in FIG. 1.

The processes are substantially similar to those in FIG. 6, and the processes related to the imaging angle-of-view frame 21 are simply replaced with the processes related to the focus frame 23.

For example, in step S101, the positional information about the focus frame is acquired from the imaging device 1B, and the range in which the position is located is detected in the peripheral field image 20. Also, in step S103, the size of the focus frame is determined.

Further, in step S107, display control is performed on the peripheral field image 20, the focus frame 23, and the enlarged image 22. In step S110, display control is performed on the peripheral field image 20 and the focus frame 23.

Figure 16:
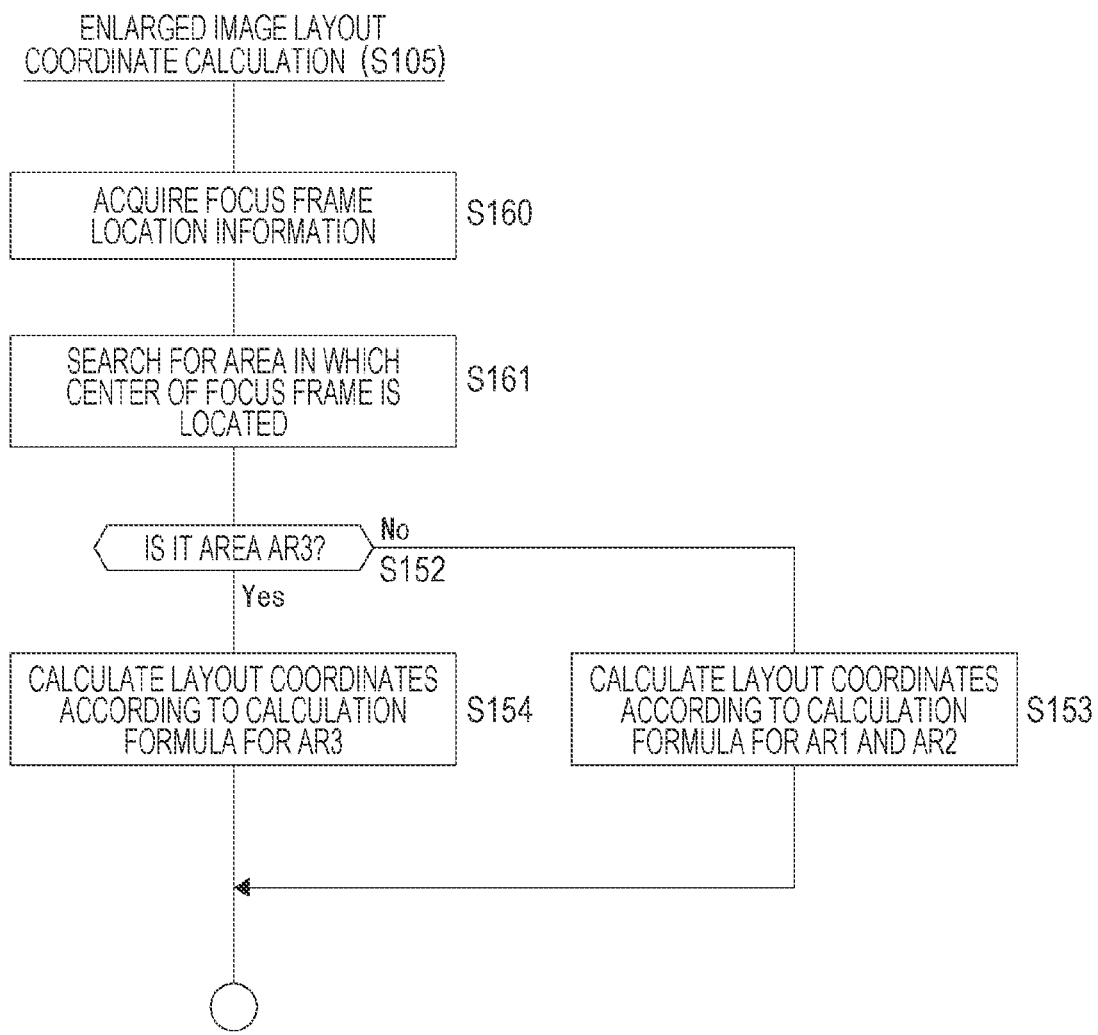
FIG. 16 is a flowchart of an enlarged image layout coordinate calculation process according to the second embodiment.

In this case, the layout position of the enlarged image 22 is calculated on the basis of the focus frame 23. Therefore, the processes shown in FIG. 16 are performed in the enlarged image layout coordinate calculation in step S105 in FIG. 6.

In step S160, the image processing device 3 acquires positional information about the focus frame from the imaging device 1B in the peripheral field image 20. In step S161, the area in which the central coordinates of the focus frame 23 are located is then searched for. For example, a check is made to determine which one of the areas AR1, AR2, and AR3 the center of the focus frame is located.

After that, steps S152, S153, and S154 are similar to those in FIG. 7.

In this manner, the layout position of the enlarged image 22 can be set on the basis of the focus frame 23, and both the focus frame 23 and the enlarged image 22 can be displayed with excellent visibility.

Note that the focus frame 23 and the enlarged image 22 are displayed within the peripheral field image 20 in the above example. However, in a case where the imaging angle-of-view frame 21 is displayed without display of the focus frame 23, the layout position of the enlarged image 22 can also be set on the basis of the focus frame 23 in the processes shown in FIG. 16.

Also, in an example display, the imaging angle-of-view frame 21, the focus frame 23, and the enlarged image 22 may be displayed within the peripheral field image 20.

Further, in a case where either the imaging angle-of-view frame 21 or the focus frame 23 is displayed within the peripheral field image 20, the layout position of the enlarged image 22 can also be calculated, using information from which the position of the object can be detected, other than the above information. For example, the information may include the feature points, the specific shape, the color information, and the predicted movement position of the object of the imaging device 1B.

4. Third Embodiment

A third embodiment described below is an example in which the right/left position of the enlarged image 22 is not frequently switched in a case where the area is divided and the right/left position of the enlarged image 22 is determined as in the first embodiment.

In this case, the processes to be performed are similar to those shown in FIG. 6. The image processing device 3 performs the processes shown in FIG. 17 as the process of the enlarged image layout coordinate calculation in step S105 in FIG. 6.

Figure 17:
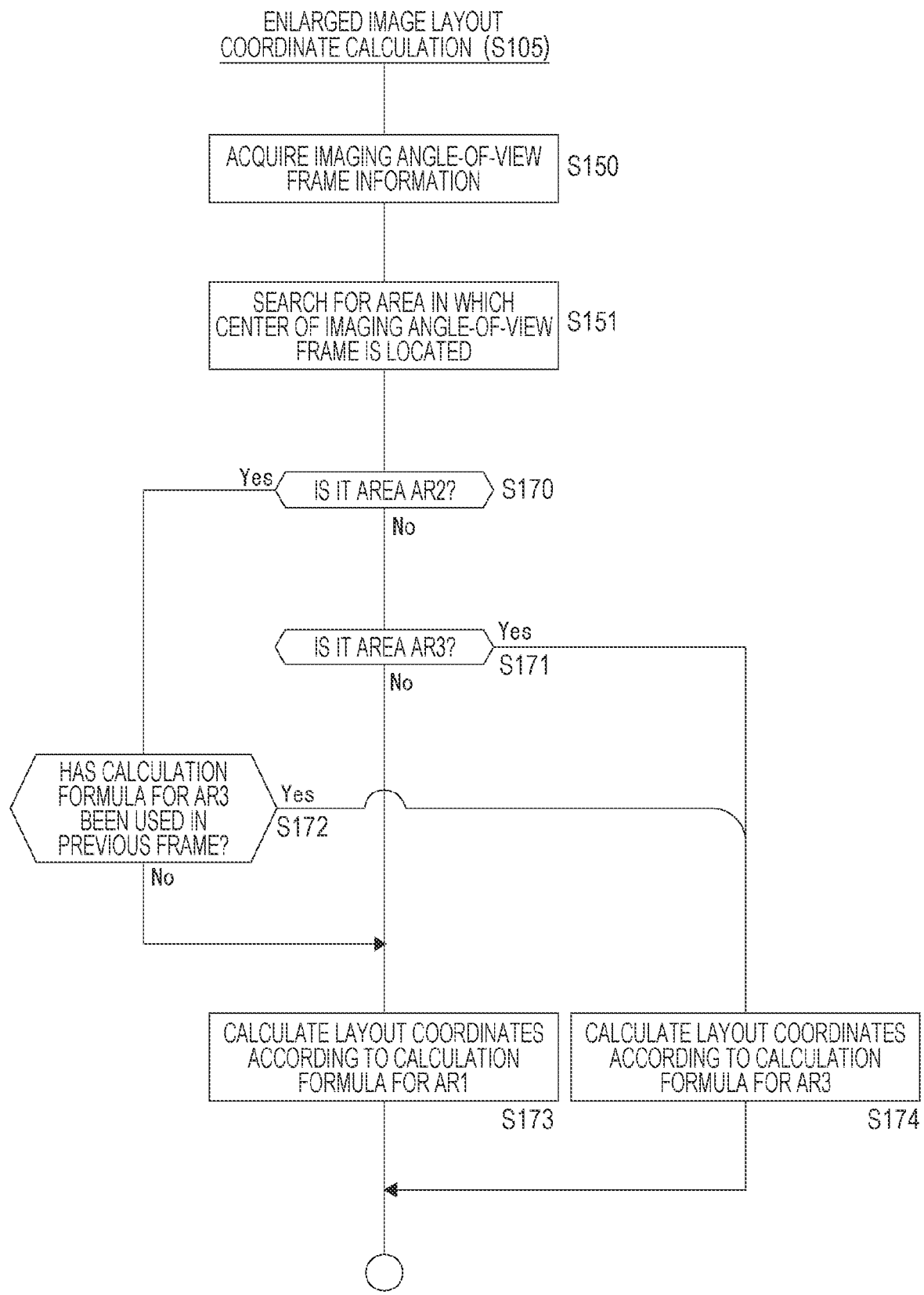
FIG. 17 is a flowchart of an enlarged image layout coordinate calculation process according to a third embodiment.

The image processing device 3 acquires imaging angle-of-view frame information in step S150 in FIG. 17. That is, the respective coordinate values of the center and the four corners of the imaging angle-of-view frame 21 shown in FIG. 9 are acquired on the basis of information about the field of view obtained in step S101 in FIG. 6.

In step S151 in FIG. 17, the image processing device 3 searches for the center of the imaging angle-of-view frame 21, which is the area in which the central coordinates (x0, y0) are located. For example, a search is performed to determine which one of the areas AR1, AR2, and AR3 shown in FIG. 10A the center is located.

In a case where the central coordinates (x0, y0) are located in the area AR1, the image processing device 3 moves on to step S173 after steps S170 and S171, and calculates the layout coordinates of the enlarged image 22 using the calculation formulas set for the area AR1.

The calculation formulas for the area AR1 are the calculation formulas described as the calculation formulas for the areas AR1 and AR2 in the first embodiment.

In a case where the central coordinates (x0, y0) are located in the area AR3, the image processing device 3 moves on to step S174 after steps S170 and S171, and calculates the layout coordinates of the enlarged image 22 using the calculation formulas set for the area AR3. That is, the calculation formulas for the area AR3 are similar to those of the first embodiment.

In a case where the central coordinates (x0, y0) are located in the central area AR2, the image processing device 3 proceeds from step S170 to step S172, and branches the processes depending on which ones of the calculation formulas for the area AR1 and the calculation formulas for the area AR3 have been used to calculate the layout coordinates in the previous frame.

Specifically, in a case where the calculation formulas for the area AR1 have been used in the previous frame, the process moves on to step S173, and the layout coordinates of the enlarged image 22 are calculated using the calculation formulas set for the area AR1.

In a case where the calculation formulas for the area AR3 have been used in the previous frame, on the other hand, the process moves on to step S174, and the layout coordinates of the enlarged image 22 are calculated using the calculation formulas set for the area AR3.

That is, in this example, the area AR2 functions as a buffer area having hysteresis in the right-left position switching.

For example, in a state in which the imaging angle-of-view frame 21 is located in the area AR1 in a certain frame while the enlarged image 22 is displayed on the right side, even if the imaging angle-of-view frame 21 gradually moves to the right frame by frame and enters the area AR2, the enlarged image 22 remains displayed on the right side. After that, when the imaging angle-of-view frame 21 further moves to the right and enters area AR3, the enlarged image 22 is displayed on the left side.

Also, in a state in which the imaging angle-of-view frame 21 is located in the area AR3 in a certain frame while the enlarged image 22 is displayed on the left side, even if the imaging angle-of-view frame 21 gradually moves to the left frame by frame and enters the area AR2, the enlarged image 22 remains displayed on the left side. After that, when the imaging angle-of-view frame 21 further moves to the left and enters area AR1, the enlarged image 22 is displayed on the right side.

In this manner, the display position of the enlarged image 22 is prevented from being frequently switched between the right side and left side on the area boundaries. As a result, any difficulty in viewing is not caused by frequent right-left switching.

5. Fourth Embodiment

A fourth embodiment is now described with reference to FIGS. 18A, 18B, 18C, 18D, and 18E.

Figure 18A:
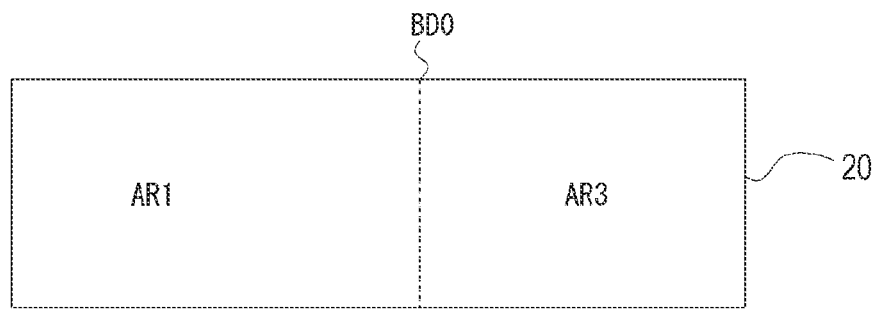
FIGS. 18A, 18B, 18C, 18D, and 18E are explanatory diagrams of enlarged image position setting according to a fourth embodiment.

This is an example in which the area is divided into two areas AR1 and AR3 by a segmentation boundary BD0 as shown in FIG. 18A. In this example, the segmentation boundary BD0 is set at a position slightly to the right of the center in the horizontal direction.

Figure 18B:
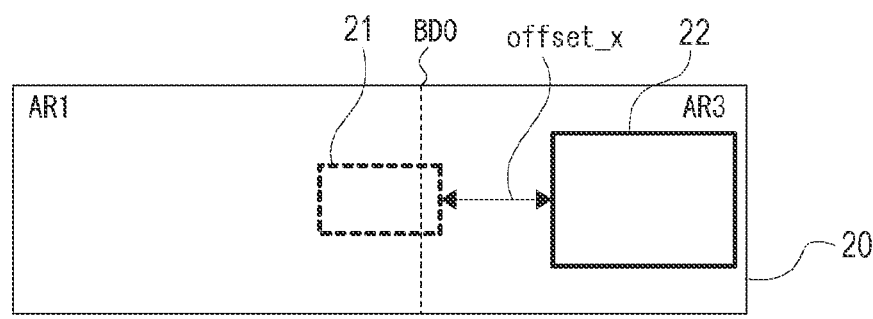
Figure 18C:
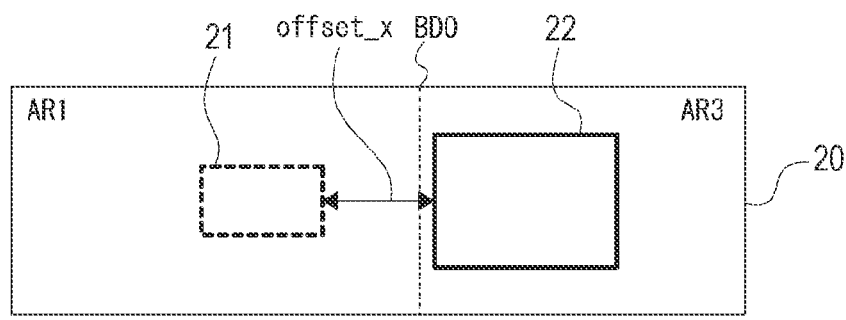

In a case where the central coordinates (x0, y0) of the imaging angle-of-view frame 21 are located in the area AR1, the enlarged image 22 is disposed on the right side of the imaging angle-of-view frame 21 as shown in FIGS. 18B and 18C.

Figure 18D:
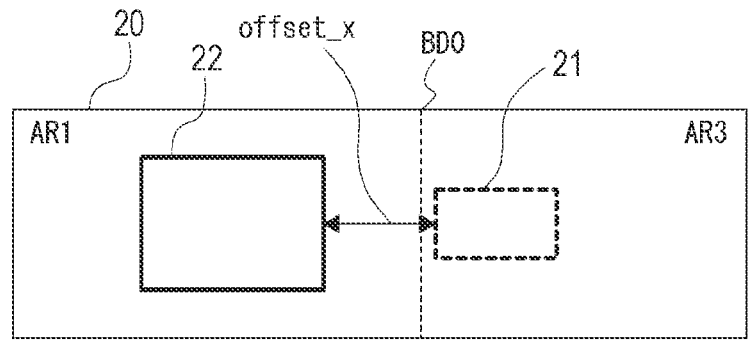

In a case where the central coordinates (x0, y0) of the imaging angle-of-view frame 21 are located in the area AR3, on the other hand, the enlarged image 22 is disposed on the left side of the imaging angle-of-view frame 21 as shown in FIG. 18D.

That is, this is a concept in which the areas AR1 and AR2 of the first embodiment are combined into the area AR1.

As the area is divided into at least two areas in this manner, the position of the enlarged image 22 can be appropriately switched between the right side and the left side.

Figure 18E:
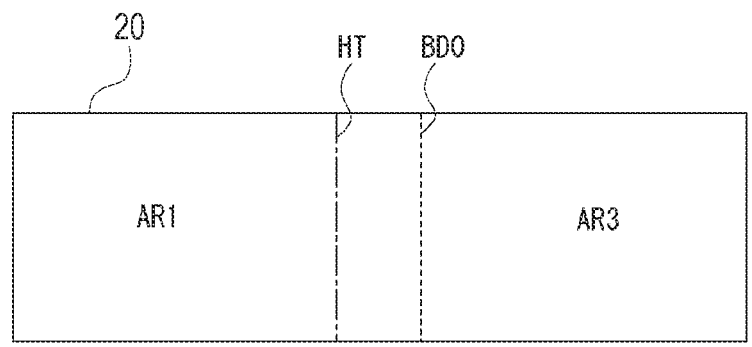

Note that, in a case where hysteresis is applied to the right-left switching as in the third embodiment, a line HT may be set as shown in FIG. 18E, for example, and the right side of the line HT in the area AR1 is regarded as an area similar to the area AR2 in the third embodiment.

6. Fifth Embodiment

A fifth embodiment described below is an example in which the inside of the peripheral field image 20 is divided into nine areas: three areas in the horizontal direction and three areas in the vertical direction.

Figure 19A:
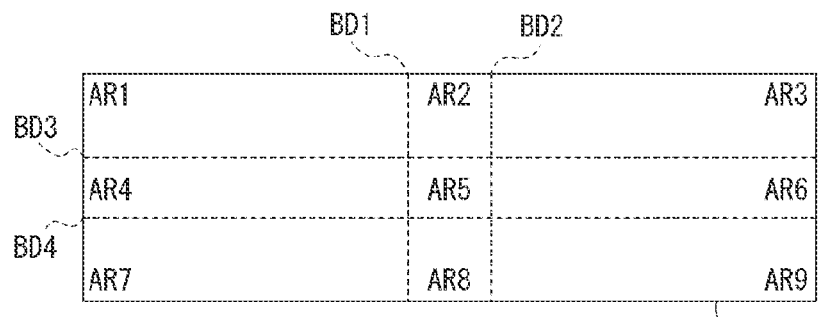
FIGS. 19A, 19B, 19C, and 19D are explanatory diagrams of enlarged image position setting according to a fifth embodiment.

For example, as shown in FIG. 19A, areas AR1 to AR9 are set by vertical boundary lines BD1 and BD2 and horizontal boundary lines BD3 and BD4.

In this case, the image processing device may perform the processes shown in FIG. 6. However, in the process of the enlarged image layout coordinate calculation in step S105, the layout position of the enlarged image 22 is calculated using calculation formulas corresponding to the area in which the central coordinates (x0, y0) of the imaging angle-of-view frame 21 are located among the nine areas AR1 to AR9.

In particular, in this case, not only the right/left position of the enlarged image 22 but also the vertical position thereof is switched.

Figure 19B:
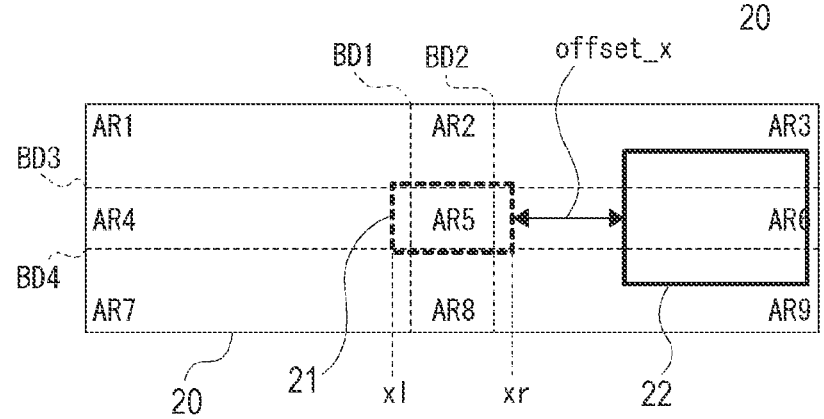

Specifically, in a case where the central coordinates (x0, y0) of the imaging angle-of-view frame 21 belong to one of the areas AR4, AR5, and AR6, which are the central areas in the vertical direction, the enlarged image 22 is disposed with a horizontal offset amount offset_x on the right side or the left side of the imaging angle-of-view frame 21. FIG. 19B shows an example in which the enlarged image 22 is disposed on the right side.

Figure 19C:
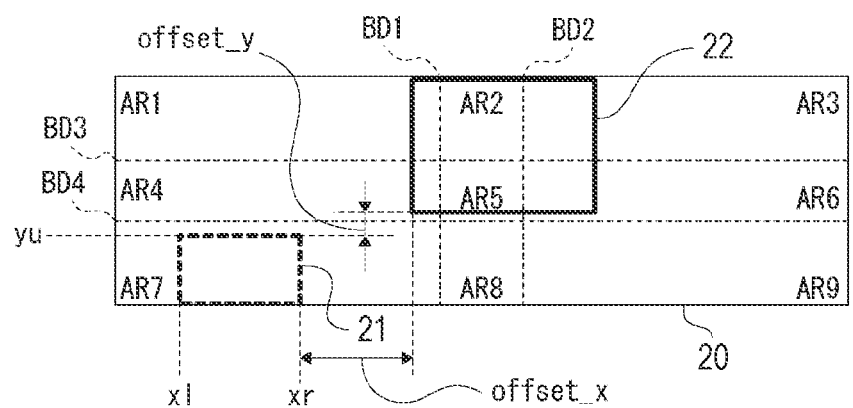

Also, in a case where the central coordinates (x0, y0) of the imaging angle-of-view frame 21 belong to one of the areas AR7, AR8, and AR9, which are the lower areas in the vertical direction, the enlarged image 22 is disposed with the horizontal offset amount offset_x and a vertical offset amount offset_y on the upper right side or the upper left side of the imaging angle-of-view frame 21. FIG. 19C shows an example in which the enlarged image 22 is disposed on the upper right side.

Figure 19D:
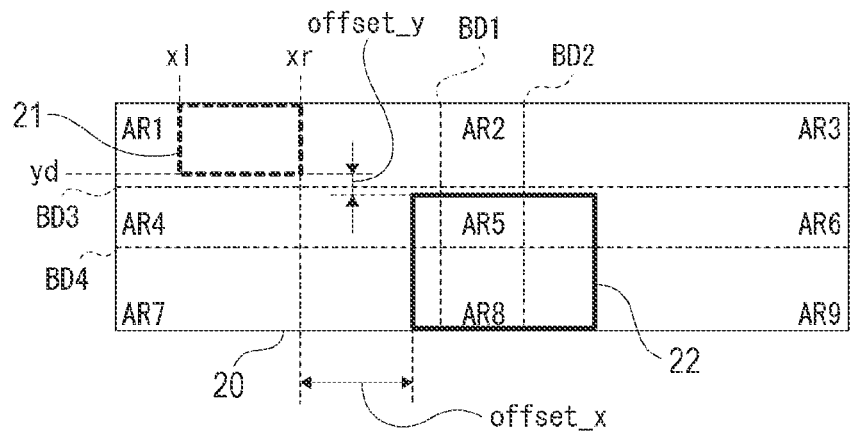

Further, in a case where the central coordinates (x0, y0) of the imaging angle-of-view frame 21 belong to one of the areas AR1, AR2, and AR3, which are the upper areas in the vertical direction, the enlarged image 22 is disposed with the horizontal offset amount offset_x and the vertical offset amount offset_y on the lower right side or the lower left side of the imaging angle-of-view frame 21. FIG. 19D shows an example in which the enlarged image 22 is disposed on the lower right side.

FIG. 20 shows an example process in step S105 in FIG. 6 for such a layout.

The image processing device 3 acquires imaging angle-of-view frame information in step S150 in FIG. 20. That is, the respective coordinate values of the center and the four corners of the imaging angle-of-view frame 21 shown in FIG. 9 are acquired on the basis of information about the field of view obtained in step S101 in FIG. 6.

In step S151 in FIG. 20, the image processing device 3 searches for the center of the imaging angle-of-view frame 21, which is the area in which the central coordinates (x0, y0) are located. For example, a search is performed to determine which one of the areas AR1 to AR9 shown in FIG. 19A the center is located.

In a case where the central coordinates (x0, y0) are located in one of the areas AR1, AR2, and AR3, the image processing device 3 proceeds from step S201 to step S210.

In a case where the central coordinates (x0, y0) are located in the area AR1, the image processing device 3 then moves on to step S213 after step S211, and calculates the layout coordinates of the enlarged image 22 using the calculation formulas set for the area AR1 described later.

In a case where the central coordinates (x0, y0) are located in the area AR3, on the other hand, the image processing device 3 moves on to step S214 after step S211, and calculates the layout coordinates of the enlarged image 22 using the calculation formulas set for the area AR3 described later.

In a case where the central coordinates (x0, y0) are located in the central area AR2, the image processing device 3 proceeds from step S210 to step S212, and branches the processes depending on which ones of the calculation formulas for the left areas and the calculation formulas for the right areas have been used to calculate the layout coordinates in the previous frame.

In this case, the calculation formulas for the left areas refer to the calculation formulas for the area AR1, the calculation formulas for the area AR4, and the calculation formulas for the area AR7.

Also, the calculation formulas for the right areas refer to the calculation formulas for the area AR3, the calculation formulas for the area AR6, and the calculation formulas for the area AR9.

In a case where the calculation formulas for the left areas have been used in the previous frame, the process moves on to step S213, and the layout coordinates of the enlarged image 22 are calculated using the calculation formulas set for the area AR1.

In a case where the calculation formulas for the right areas have been used in the previous frame, on the other hand, the process moves on to step S214, and the layout coordinates of the enlarged image 22 are calculated using the calculation formulas set for the area AR3.

In a case where the central coordinates (x0, y0) belong to one of the areas AR4, AR5, and AR6, the image processing device 3 moves on to step S220 after steps S201 and S202.

In a case where the central coordinates (x0, y0) are located in the area AR4, the image processing device 3 then moves on to step S223 after step S221, and calculates the layout coordinates of the enlarged image 22 using the calculation formulas set for the area AR4 described later.

In a case where the central coordinates (x0, y0) are located in the area AR6, on the other hand, the image processing device 3 moves on to step S224 after step S221, and calculates the layout coordinates of the enlarged image 22 using the calculation formulas set for the area AR6 described later.

In a case where the central coordinates (x0, y0) are located in the central area AR5, the image processing device 3 proceeds from step S220 to step S222, and branches the processes depending on which ones of the calculation formulas for the left areas and the calculation formulas for the right areas have been used to calculate the layout coordinates in the previous frame.

In a case where the calculation formulas for the left areas have been used in the previous frame, the process moves on to step S223, and the layout coordinates of the enlarged image 22 are calculated using the calculation formulas set for the area AR4.

In a case where the calculation formulas for the right areas have been used in the previous frame, on the other hand, the process moves on to step S224, and the layout coordinates of the enlarged image 22 are calculated using the calculation formulas set for the area AR6.

In a case where the central coordinates (x0, y0) belong to one of the areas AR7, AR8, and AR9, the image processing device 3 moves on to step S230 after steps S201 and S202.

In a case where the central coordinates (x0, y0) are located in the area AR7, the image processing device 3 then moves on to step S233 after step S231, and calculates the layout coordinates of the enlarged image 22 using the calculation formulas set for the area AR7 described later.

In a case where the central coordinates (x0, y0) are located in the area AR9, on the other hand, the image processing device 3 moves on to step S234 after step S231, and calculates the layout coordinates of the enlarged image 22 using the calculation formulas set for the area AR9 described later.

In a case where the central coordinates (x0, y0) are located in the central area AR8, the image processing device 3 proceeds from step S230 to step S232, and branches the processes depending on which ones of the calculation formulas for the left areas and the calculation formulas for the right areas have been used to calculate the layout coordinates in the previous frame.

In a case where the calculation formulas for the left areas have been used in the previous frame, the process moves on to step S233, and the layout coordinates of the enlarged image 22 are calculated using the calculation formulas set for the area AR7.

In a case where the calculation formulas for the right areas have been used in the previous frame, on the other hand, the process moves on to step S234, and the layout coordinates of the enlarged image 22 are calculated using the calculation formulas set for the area AR9.

The calculation formulas for calculating the coordinates of the four corners of the enlarged image 22 depending on the respective areas are shown below.

First, as an example, example calculations based on the end sides of the imaging angle-of-view frame 21 are described.

Note that the definitions of the respective coordinates are as shown in FIG. 9.

Further, "xr" represents the x-coordinate value of the right end side of the imaging angle-of-view frame 21, "xl" represents the x-coordinate value of the left end side of the imaging angle-of-view frame 21, "yu" represents the y-coordinate value of the upper end side of the imaging angle-of-view frame 21, and "yd" is the y-coordinate value of the lower end side of the imaging angle-of-view frame 21 (see FIGS. 19B, 19C, and 19D).

Calculation Formulas for the Area AR1

$(Xul, Yul) = (xr + \text{offset\_}x, yd - \text{offset\_}y)$ $(Xur, Yur) = (xr + \text{offset\_}x + Wz, yd - \text{offset\_}y)$ $(Xdl, Ydl) = (xr + \text{offset\_}x, yd - \text{offset\_}y - Hz)$ $(Xdr, Ydr) = (xr + \text{offset\_}x + Wz, yd - \text{offset\_}y - Hz)$ Calculation Formulas for the Area AR3

$(Xul, Yul) = (xl - \text{offset\_}x - Wz, yd - \text{offset\_}y)$ $(Xur, Yur) = (xl - \text{offset\_}x, yd - \text{offset\_}y)$ $(Xdl, Ydl) = (xl - \text{offset\_}x - Wz, yd - \text{offset\_}y - Hz)$ $(Xdr, Ydr) = (xl - \text{offset\_}x, yd - \text{offset\_}y - Hz)$ Calculation Formulas for the Area AR4

$(Xul, Yul) = (xr + \text{offset\_}x, y0 + Hz/2)$ $(Xur, Yur) = (xr + \text{offset\_}x + Wz, y0 + Hz/2)$ $(Xdl, Ydl) = (xr + \text{offset\_}x, y0 - Hz/2)$ $(Xdr, Ydr) = (xr + \text{offset\_}x + Wz, y0 - Hz/2)$ Calculation Formulas for the Area AR6

$(Xul, Yul) = (xl - \text{offset\_}x - Wz, y0 + Hz/2)$ $(Xur, Yur) = (xl - \text{offset\_}x, y0 + Hz/2)$ $(Xdl, Ydl) = (xl - \text{offset\_}x - Wz, y0 - Hz/2)$ $(Xdr, Ydr) = (xl - \text{offset\_}x, y0 - Hz/2)$ Calculation Formulas for the Area AR7

$(Xul, Yul) = (xr + \text{offset\_}x, yu + \text{offset\_}y + Hz)$ $(Xur, Yur) = (xr + \text{offset\_}x + Wz, yu + \text{offset\_}y + Hz)$ $(Xdl, Ydl) = (xr + \text{offset\_}x, yu + \text{offset\_}y)$ $(Xdr, Ydr) = (xr + \text{offset\_}x + Wz, yu + \text{offset\_}y)$ Calculation Formulas for the Area AR9

$(Xul, Yul) = (xl - \text{offset\_}x - Wz, yu + \text{offset\_}y + Hz)$ $(Xur, Yur) = (xl - \text{offset\_}x, yu + \text{offset\_}y + Hz)$ $(Xdl, Ydl) = (xl - \text{offset\_}x - Wz, yu + \text{offset\_}y)$ $(Xdr, Ydr) = (xl - \text{offset\_}x, yu + \text{offset\_}y)$ Instead of the above, example calculations based on the central coordinates (x0, y0) of the imaging angle-of-view frame 21 can be used in the layout coordinate calculations for disposing the enlarged image 22.

For the respective areas, the central coordinates (X0, Y0) of the enlarged image 22 are calculated from the central coordinates (x0, y0) of the imaging angle-of-view frame 21 as shown below.

Calculation Formulas for the Area AR1

$(X0, Y0) = (x0 + W/2 + \text{offset\_}x + Wz/2, y0 - H/2 - \text{offset\_}y - Hz/2)$ Calculation Formulas for the Area AR3

$(X0, Y0) = (x0 - W/2 - \text{offset\_}x - Wz/2, y0 - H/2 - \text{offset\_}y - Hz/2)$ Calculation Formulas for the Area AR4

$(X0, Y0) = (x0 + W/2 + \text{offset\_}x + Wz/2, y0)$

Calculation Formulas for the Area AR6

$(X0, Y0) = (x0 - W/2 - \text{offset\_}x - Wz/2, y0)$

Calculation Formulas for the Area AR7

$(X0, Y0) = (x0 + W/2 + \text{offset\_}x + Wz/2, y0 + H/2 + \text{offset\_}y + Hz/2)$ Calculation Formulas for the Area AR9

$(X0, Y0) = (x0 - W/2 - \text{offset\_}x - Wz/2, y0 + H/2 + \text{offset\_}y + Hz/2)$ Further, in each case, the coordinates of the four corners of the enlarged image 22 are calculated according to the equations shown below.

$(Xul, Yul) = (X0 - Wz/2, Y0 + Hz/2)$ $(Xur, Yur) = (X0 + Wz/2, Y0 + Hz/2)$ $(Xdl, Ydl) = (X0 - Wz/2, Y0 - Hz/2)$ $(Xdr, Ydr) = (X0 + Wz/2, Y0 - Hz/2)$

As the processes shown in FIG. 20 are performed using the above example calculation formulas, the enlarged image 22 is disposed as follows.

When the central coordinates (x0, y0) of the imaging angle-of-view frame 21 are located in the area AR1, the enlarged image 22 is disposed on the lower right side, with the horizontal offset amount offset_x from the right end side and the vertical offset amount offset_y from the lower end side of the imaging angle-of-view frame 21 being maintained.

When the central coordinates (x0, y0) of the imaging angle-of-view frame 21 are located in the area AR3, the enlarged image 22 is disposed on the lower left side, with the horizontal offset amount offset_x from the left end side and the vertical offset amount offset_y from the lower end side of the imaging angle-of-view frame 21 being maintained.

When the central coordinates (x0, y0) of imaging angle-of-view frame 21 are located in the area AR2, the enlarged image 22 is disposed either on the lower right side or the lower left side as above.

When the central coordinates (x0, y0) of the imaging angle-of-view frame 21 are located in the area AR4, the enlarged image 22 is disposed on the right side, with the horizontal offset amount offset_x from the right end side of the imaging angle-of-view frame 21 being maintained.

When the central coordinates (x0, y0) of the imaging angle-of-view frame 21 are located in the area AR6, the enlarged image 22 is disposed on the left side, with the horizontal offset amount offset_x from the left end side of the imaging angle-of-view frame 21 being maintained.

When the central coordinates (x0, y0) of imaging angle-of-view frame 21 are located in the area AR5, the enlarged image 22 is disposed either on the right side or the left side as above.

When the central coordinates (x0, y0) of the imaging angle-of-view frame 21 are located in the area AR7, the enlarged image 22 is disposed on the upper right side, with the horizontal offset amount offset_x from the right end side and the vertical offset amount offset_y from the upper end side of the imaging angle-of-view frame 21 being maintained.

When the central coordinates (x0, y0) of the imaging angle-of-view frame 21 are located in the area AR9, the enlarged image 22 is disposed on the upper left side, with the horizontal offset amount offset_x from the left end side and the vertical offset amount offset_y from the upper end side of the imaging angle-of-view frame 21 being maintained.

When the central coordinates (x0, y0) of imaging angle-of-view frame 21 are located in the area AR8, the enlarged image 22 is disposed either on the upper right side or the upper left side as above.

As the layout position of the enlarged image 22 is set as described above, for example, the imaging angle-of-view frame 21 and the enlarged image 22 are appropriately displayed within the peripheral field image 20 without any overlap. Particularly, the enlarged image 22 is disposed on the upper, lower, right, or left side of the imaging angle-of-view frame 21, depending on the areas, and is disposed at a predetermined distance from the imaging angle-of-view frame 21, the predetermined distance being expressed as the offset amounts offset_x and offset_y. Thus, a display state in which a high visibility is maintained for the user can be achieved.

Further, as for the directions of the right and left positions, the central areas AR2, AR5, and AR8 aligned in a horizontal direction function as buffer areas applying hysteresis to the right-left position switching of the enlarged image 22. Thus, right-left switching does not occur frequently, which is suitable for enhancing visibility.

Note that hysteresis may be applied to switching of positions in the vertical direction.

Note that, in a case where the processes in steps S103, S104, S106, S110, and S120 to S123 in FIG. 6 are also performed, the enlarged image 22 is hidden, the peripheral field image 20 is hidden, or only the enlarged image is displayed, as an exceptional process in the fifth embodiment. With this arrangement, display suitable for the visual field states and the imaging directions of the imaging devices 1A and 1B is performed.

Figure 21:
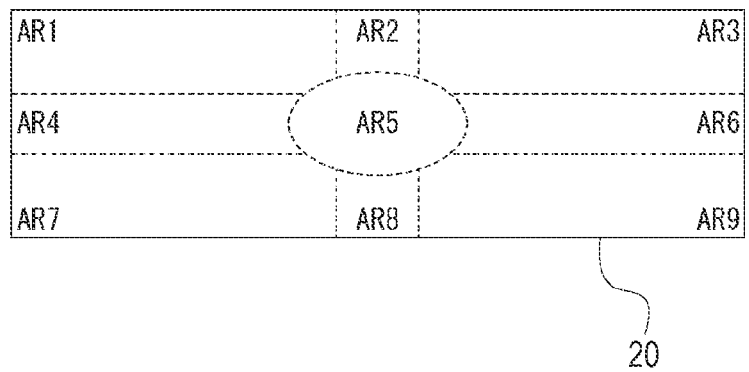
FIG. 21 is an explanatory diagram of a modification of area segmentation setting according to the fifth embodiment.

FIG. 21 shows a modification of the area segmentation. In this example, the area AR5 has an elliptical shape, and the area segmentation may be set using such a curved line. Various other examples of area segmentation are of course conceivable.

7. Sixth Embodiment

A sixth embodiment described below is an example that does not involve the area segmentation setting described in the first to fifth embodiments.

However, the enlarged image 22 is also located at a certain distance from the imaging angle-of-view frame 21, and the enlarged image 22 also moves horizontally as the imaging angle-of-view frame 21 moves, as in the above embodiments.

However, whether the enlarged image 22 is disposed on the right side or the left side of the imaging angle-of-view frame 21 is determined in a manner similar that of the previous frame, and right-left switching is performed under a specific condition.

Figure 22A:
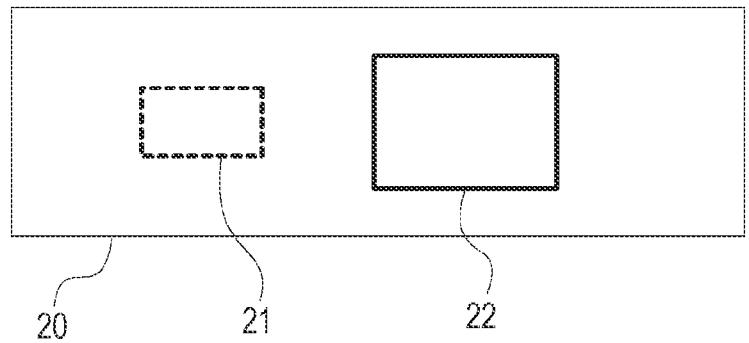
FIGS. 22A, 22B, and 22C are explanatory diagrams of enlarged image position setting according to a sixth embodiment.

FIG. 22A shows a state in which the enlarged image 22 is disposed on the right side of the imaging angle-of-view frame 21.

Figure 22B:
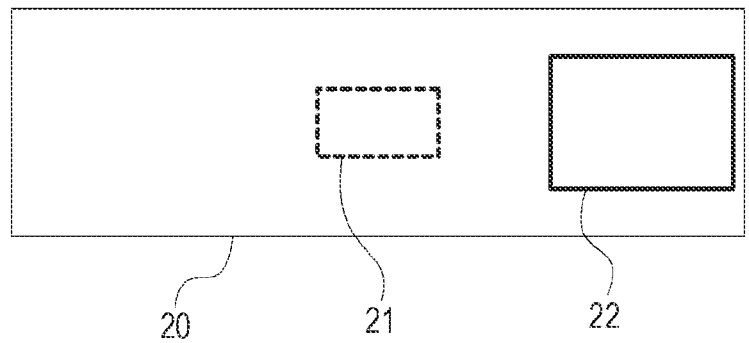

FIG. 22B shows a state in which the enlarged image 22 is located at a position shifted to the right when the imaging angle-of-view frame 21 shifts to the right.

Figure 23A:
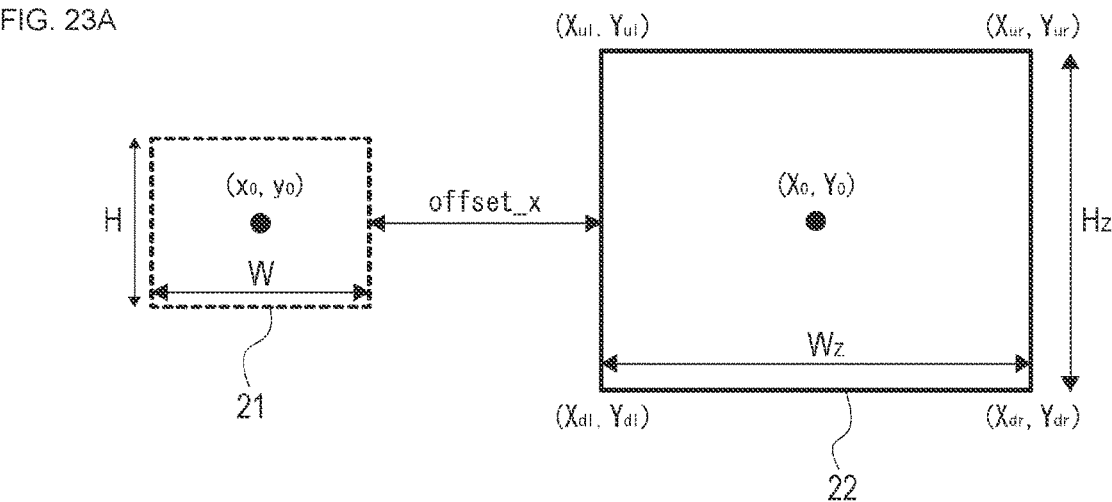
FIGS. 23A and 23B are explanatory diagrams of the layout relationship between an imaging angle-of-view frame and an enlarged image according to the sixth embodiment.

In either case, the imaging angle-of-view frame 21 and the enlarged image 22 have positional relationship involving a horizontal offset amount offset_x as shown in FIG. 23A.

Figure 22C:
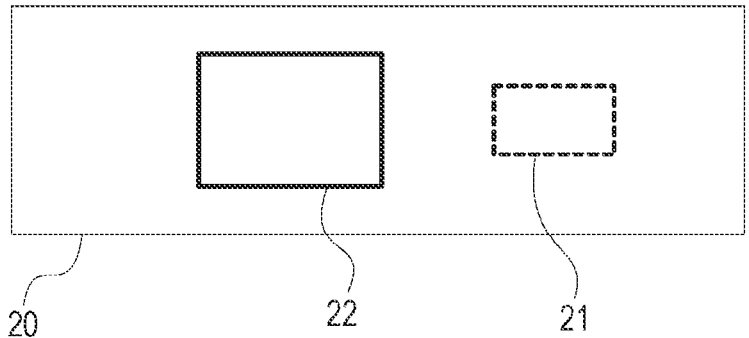

If the layout position of the enlarged image 22 is determined to be inappropriate at a certain point of time, the layout position of the enlarged image 22 is horizontally inverted, and the enlarged image 22 is disposed on the left side of the imaging angle-of-view frame 21 as shown in FIG. 22C, for example.

Figure 23B:
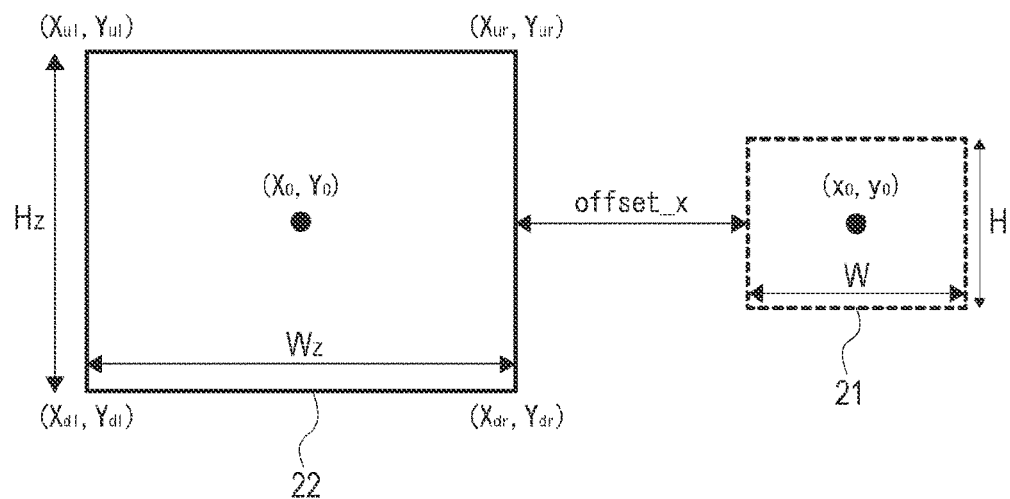

In this case, the imaging angle-of-view frame 21 and the enlarged image 22 also have positional relationship involving the horizontal offset amount offset_x as shown in FIG. 23B.

As described above, the enlarged image 22 follows the imaging angle-of-view frame 21 while maintaining the horizontal offset amount offset_x, and the right/left position thereof is changed in accordance with the position of the imaging angle-of-view frame 21 in a manner substantially similar to that in the first embodiment. However, the change in the right/left position is not based on the area segmentation setting in this case.

Figure 24:
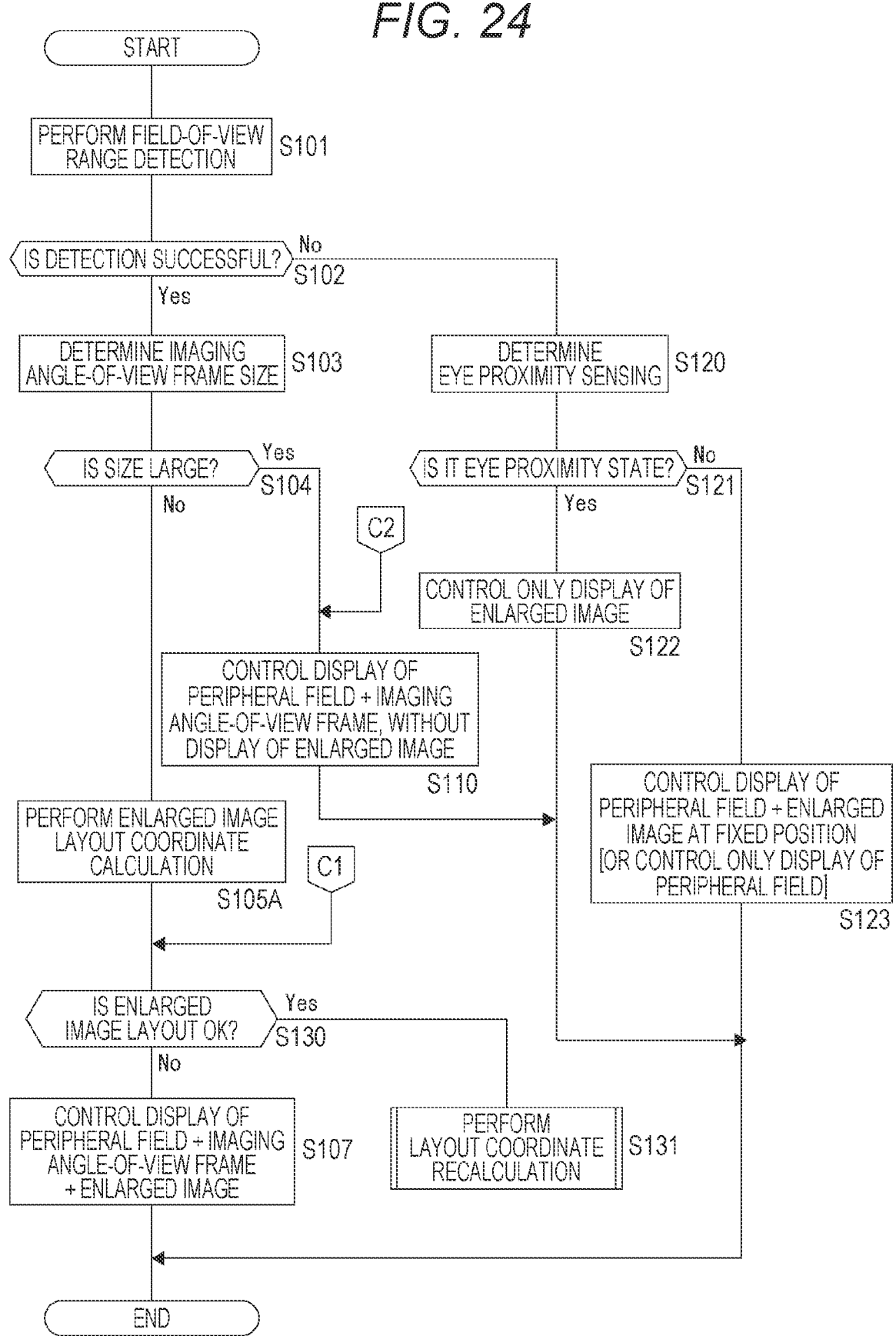
FIG. 24 is a flowchart of example processes according to the sixth to seventh embodiments.

FIG. 24 shows example processes to be performed by the image processing device 3 according to the sixth embodiment.

Note that, in FIG. 24, processes similar to those in FIG. 6 are denoted by the same step numbers as those in FIG. 6, and explanation of them will not be repeated below. The differences from FIG. 6 are that, in step S105A, the process of the enlarged image layout coordinate calculation is performed in a manner similar to that in the previous frame, and, in a case where the enlarged image layout coordinates are determined not to be appropriate, the enlarged image layout coordinates are recalculated in step S131.

In step S105A, the enlarged image layout coordinate calculation is performed. In this case, if the enlarged image 22 is disposed on the right side of the imaging angle-of-view frame 21 in the previous frame, the calculation is also performed for a right-side position in the current frame. That is, the central coordinates (X0, Y0) of the enlarged image 22 are calculated according to the following equation:

$$(X0,Y0)=(x0+W/2+\text{offset}\_x+Wz/2,y0)$$

The coordinate values of the four corners of the enlarged image 22 are then calculated as follows.

$$(Xul,Yul)=(X0-Wz/2,Y0+Hz/2)$$

$$(Xur,Yur)=(X0+Wz/2,Y0+Hz/2)$$

$$(Xdl,Ydl)=(X0-Wz/2,Y0-Hz/2)$$

$$(Xdr,Ydr)=(X0+Wz/2,Y0-Hz/2)$$

Further, in a case where the enlarged image 22 is located on the left side of the imaging angle-of-view frame 21 in the previous frame at the time of step S105A, the calculation is also performed for a left-side position in the current frame. That is, the central coordinates (X0, Y0) of the enlarged image 22 are calculated according to the following equation:

$$(X0,Y0)=(x0-W/2-\text{offset}\_x-Wz/2,y0)$$

The coordinate values (Xul, Yul), (Xur, Yur), (Xdl, Ydl), and (Xdr, Ydr) of the four corners of the enlarged image 22 are then calculated in a manner similar to the above.

As a result, the displays as shown in FIGS. 22A, 22B, and 22C, for example, are obtained through the display control in step S107.

By the calculation in step S105A, however, the layout position of the enlarged image 22 becomes inappropriate in some cases. That is, the enlarged image 22 has a portion outside the peripheral field image 20 in some cases.

Figure 25:
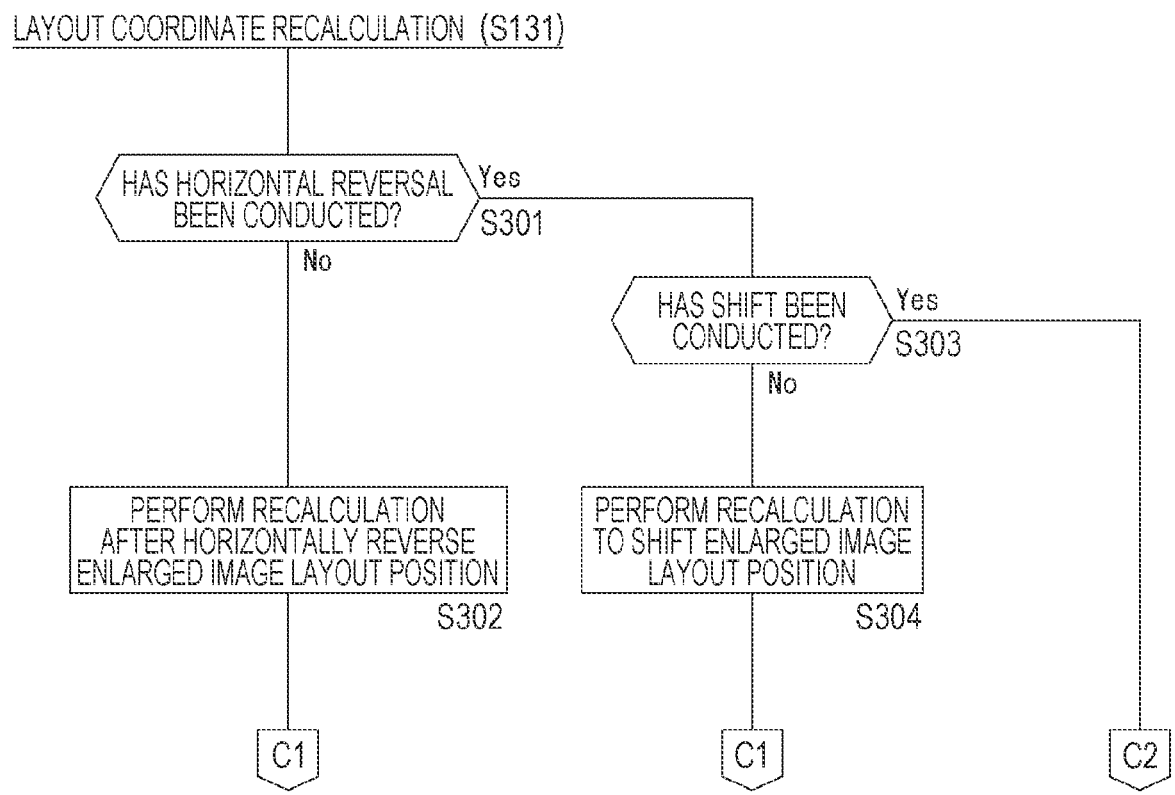
FIG. 25 is a flowchart of a layout coordinate recalculation process according to the sixth embodiment.

In that case, the image processing device 3 proceeds from step S130 to step S131, and performs a layout coordinate recalculation process as shown in FIG. 25.

Note that the sixth embodiment is an example in which only an outside portion in a horizontal direction (rightward/leftward direction) is taken into consideration. An example in which only an outside portion in a vertical direction (upward/downward direction) is taken into consideration at the time of the layout coordinate recalculation will be described later as a seventh embodiment.

In a case where the layout position of the enlarged image 22 calculated in step S105A has a portion outside the peripheral field image 20, and the process moves on to step S131, the process first proceeds from step S301 to step S302 in FIG. 25.

In this case, the layout position of the enlarged image 22 is horizontally inverted and is recalculated. For example, in a case where an outside portion has appeared at the time of the calculation for a right-side position as above, recalculation is performed for a left-side position as above.

The process then returns to step S130 in FIG. 24, as indicated by "c1". If the enlarged image 22 no longer has a portion outside the peripheral field image 20 as a result of the horizontal inversion performed in such a manner, the enlarged image layout position is determined to be "OK", and the process moves on to step S107.

Figure 26A:
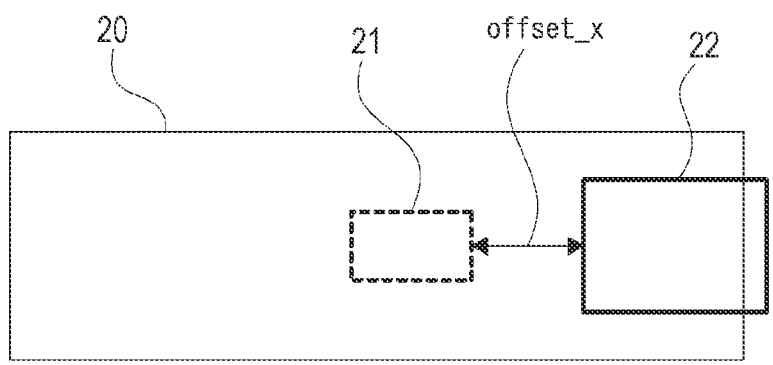
FIGS. 26A and 26B are explanatory diagrams of right-left switching to be performed when an enlarged image has an outside portion according to the sixth embodiment.
Figure 26B:
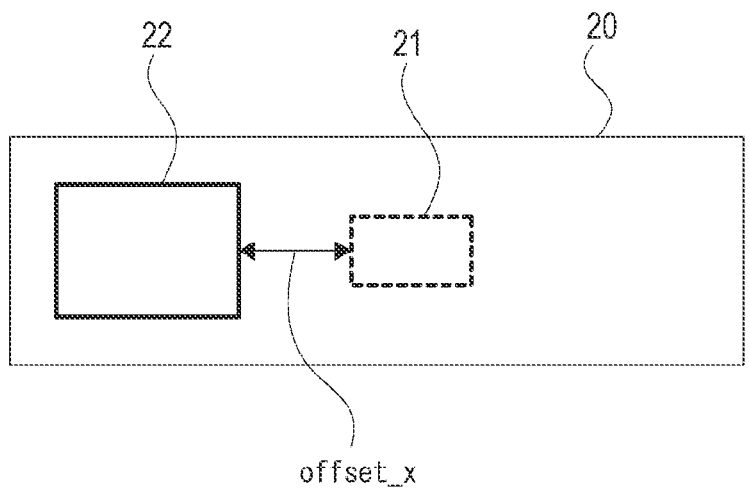

FIG. 26A shows a state in which the layout position of the enlarged image 22 has a portion outside the peripheral field image 20 as calculated in step S105A, for example. FIG. 26B shows a state in which the layout position of the enlarged image 22 is horizontally inverted to be located within the peripheral field image 20.

However, even if the horizontal inversion is performed, the layout position of the enlarged image 22 might still be inappropriate.

In that case, the image processing device 3 again proceeds from step S130 to step S131, and performs the processes shown in FIG. 25. In this case, the horizontal inversion has already been performed, and therefore, the image processing device 3 proceeds from step S301 to step S303. Since any shift has not been performed yet, the layout position is then recalculated in step S304 so that the layout position of the enlarged image 22 shifts.

For example, the value of the horizontal offset amount offset_x is reduced, and recalculation is then performed by the calculation formulas for a right-side position or the calculation formulas for a left-side position as described above.

That is, the value of the horizontal offset amount offset_x is changed as follows:

offset_$x$=offset_$x$−Δ$x$, and recalculation is then performed.

The value of Δx may be a fixed value, or may represent the amount of the outside portion in the x-axis direction.

The process then returns to step S130 in FIG. 24, as indicated by "c1". If the enlarged image 22 no longer has a portion outside the peripheral field image 20 as a result of the horizontal shift performed in such a manner, the enlarged image layout position is determined to be "OK", and the process moves on to step S107.

FIG. 27A shows that, in a case where the layout position of the enlarged image 22 has an outside portion on the left side of the peripheral field image 20 even after horizontal inversion occurs through recalculation, for example, a horizontal shift to the right is performed so that the layout position of the enlarged image 22 is changed to a position not having any outside portion.

FIG. 27B shows that, in a case where the layout position of the enlarged image 22 has an outside portion on the right side of the peripheral field image 20 even after horizontal inversion occurs through recalculation, for example, a horizontal shift to the left is performed so that the layout position of the enlarged image 22 is changed to a position not having any outside portion.

However, even if the horizontal inversion and the shift are performed as described above, the layout position of the enlarged image 22 might still be inappropriate. In that case, the process moves on to step S131 for the third time, but this time, the process proceeds from step S303 in FIG. 25 to step S110 in FIG. 24 as indicated by "c2". In this case, display control is performed on the peripheral field image 20 and the imaging angle-of-view frame 21 while the enlarged image 22 is hidden.

As described above, in the sixth embodiment, when the enlarged image 22 to follow the imaging angle-of-view frame 21 has a portion outside the peripheral field image 20, horizontal inversion is performed. In a case where there still is a portion outside the peripheral field image, a shift is performed to counter the problem.

Note that, when the enlarged image 22 has even a small portion outside the peripheral field image 20, the recalculation in step S131 may be performed. However, an outside portion of a certain size may be set as an allowable range in step S130.

8. Seventh Embodiment

A seventh embodiment is an example in which, in a case where the imaging angle-of-view frame 21 moves in a vertical direction, the layout position of the enlarged image 22 moves in the opposite direction, in addition to the sixth embodiment.

For example, in a case where the central coordinates (x0, y0) of the imaging angle-of-view frame 21=(x0, 0) in the coordinate system shown in FIG. 8, the central coordinates (X0, Y0) of the enlarged image 22=(X0, 0), and the layout position of the enlarged image 22 is set exactly in a lateral direction of the imaging angle-of-view frame 21 as shown in FIGS. 22A, 22B, and 22C.

Figure 28A:
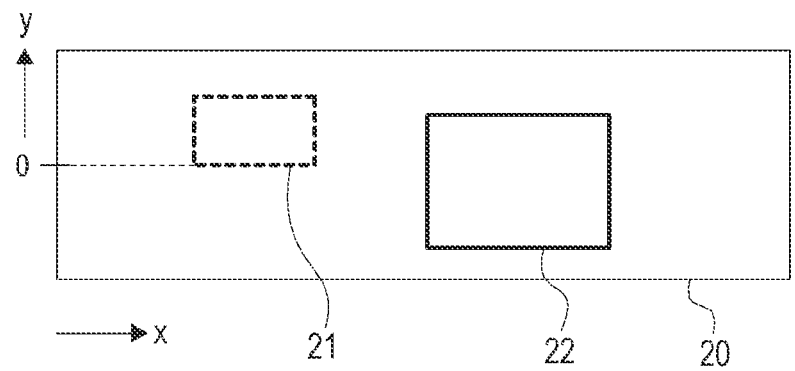
FIGS. 28A and 28B are explanatory diagrams of enlarged image position setting according to the seventh embodiment.
Figure 29A:
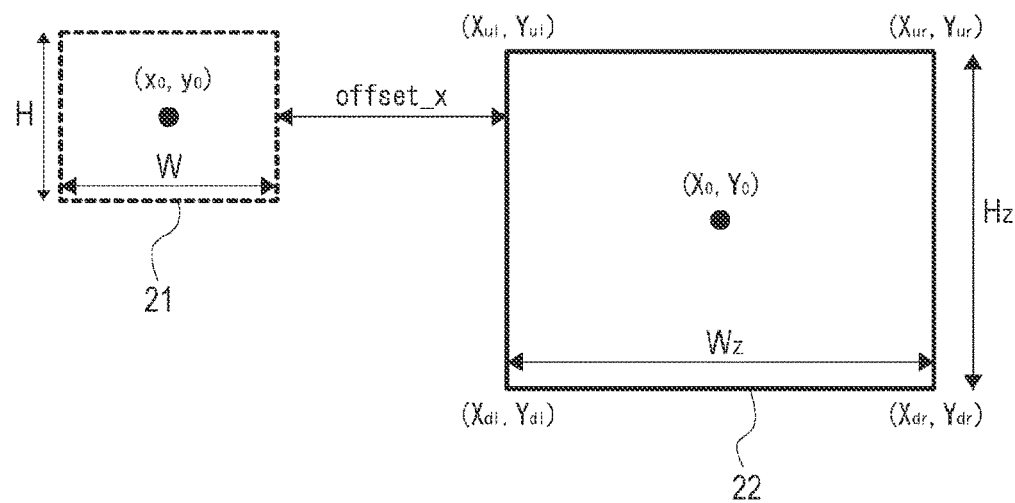
FIGS. 29A and 29B are explanatory diagrams of the layout relationship between an imaging angle-of-view frame and an enlarged image according to the seventh embodiment.

In a case where the vertical position of the imaging angle-of-view frame 21 shifts upward from the y-coordinate value=0, on the other hand, the layout position of the enlarged image 22 shifts downward by the equivalent amount as shown in FIG. 28A. However, the horizontal offset amount offset_x is maintained, as shown in FIG. 29A.

Figure 28B:
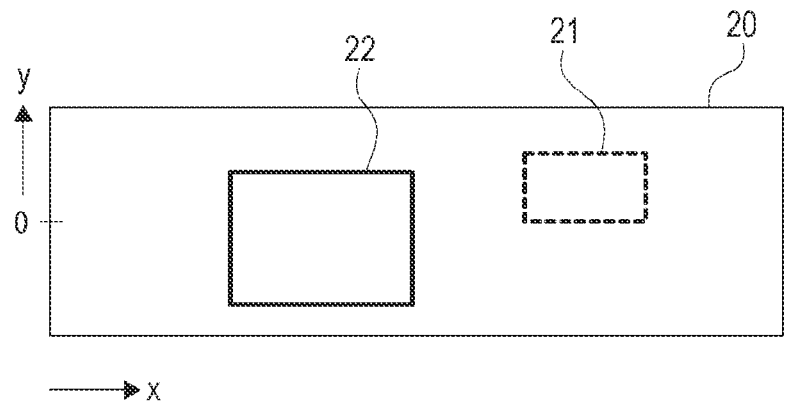
Figure 29B:
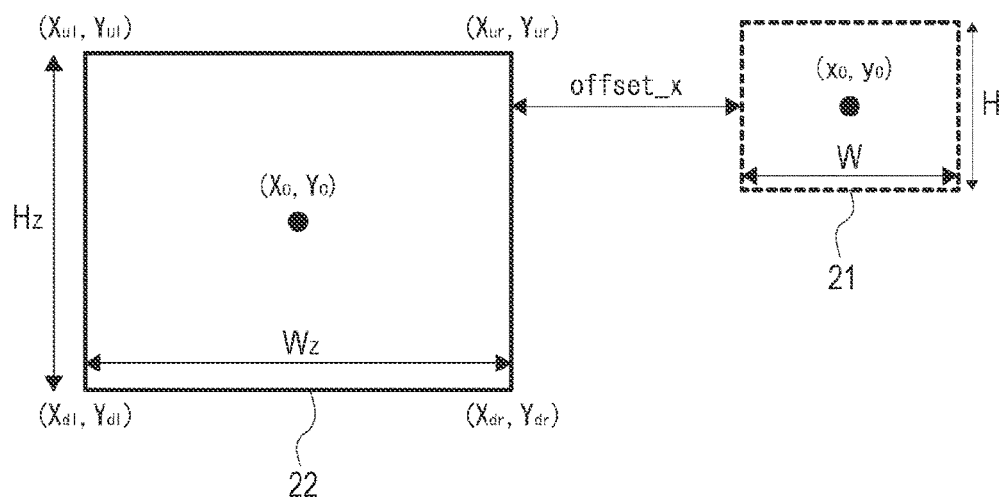

Further, in a case where the vertical position of the imaging angle-of-view frame 21 shifts downward from the y-coordinate value=0, the layout position of the enlarged image 22 shifts upward by the equivalent amount as shown in FIG. 28B. In this case, the horizontal offset amount offset_x is also maintained, as shown in FIG. 29B.

In such cases, the processes to be performed are similar to those in FIG. 24. However, in the process of the enlarged image layout coordinate calculation in step S105A, the calculations shown below are performed, for example.

In a case where the enlarged image 22 is located on the right side of the imaging angle-of-view frame 21 in the previous frame at the time of the enlarged image layout coordinate calculation in step S105A, the calculation is also performed for a right-side position in the current frame. That is, the central coordinates (X0, Y0) of the enlarged image 22 are calculated according to the following equation:

$$(X0,Y0)=(x0+W/2+\text{offset}\_x+Wz/2,0-y0)$$

That is, the calculation of the Y-coordinate value Y0 at the central coordinates (X0, Y0) differs from that of the sixth embodiment.

The coordinate values of the four corners of the enlarged image 22 are then calculated as follows.

$$(Xul,Yul)=(X0-Wz/2,Y0+Hz/2)$$

$$(Xur,Yur)=(X0+Wz/2,Y0+Hz/2)$$

$$(Xdl,Ydl)=(X0-Wz/2,Y0-Hz/2)$$

$$(Xdr,Ydr)=(X0+Wz/2,Y0-Hz/2)$$

Further, in a case where the enlarged image 22 is located on the left side of the imaging angle-of-view frame 21 in the previous frame at the time of step S105A, the calculation is also performed for a left-side position in the current frame. That is, the central coordinates (X0, Y0) of the enlarged image 22 are calculated according to the following equation:

$$(X0,Y0)=(x0-W/2-\text{offset}\_x-Wz/2,0-y0)$$

The coordinate values (Xul, Yul), (Xur, Yur), (Xdl, Ydl), and (Xdr, Ydr) of the four corners of the enlarged image 22 are then calculated in a manner similar to the above.

With this arrangement, the layout position of the enlarged image 22 is set so as to follow in a horizontal direction or inversely follow in a vertical direction, as shown in FIGS. 28A and 28B.

Figure 30:
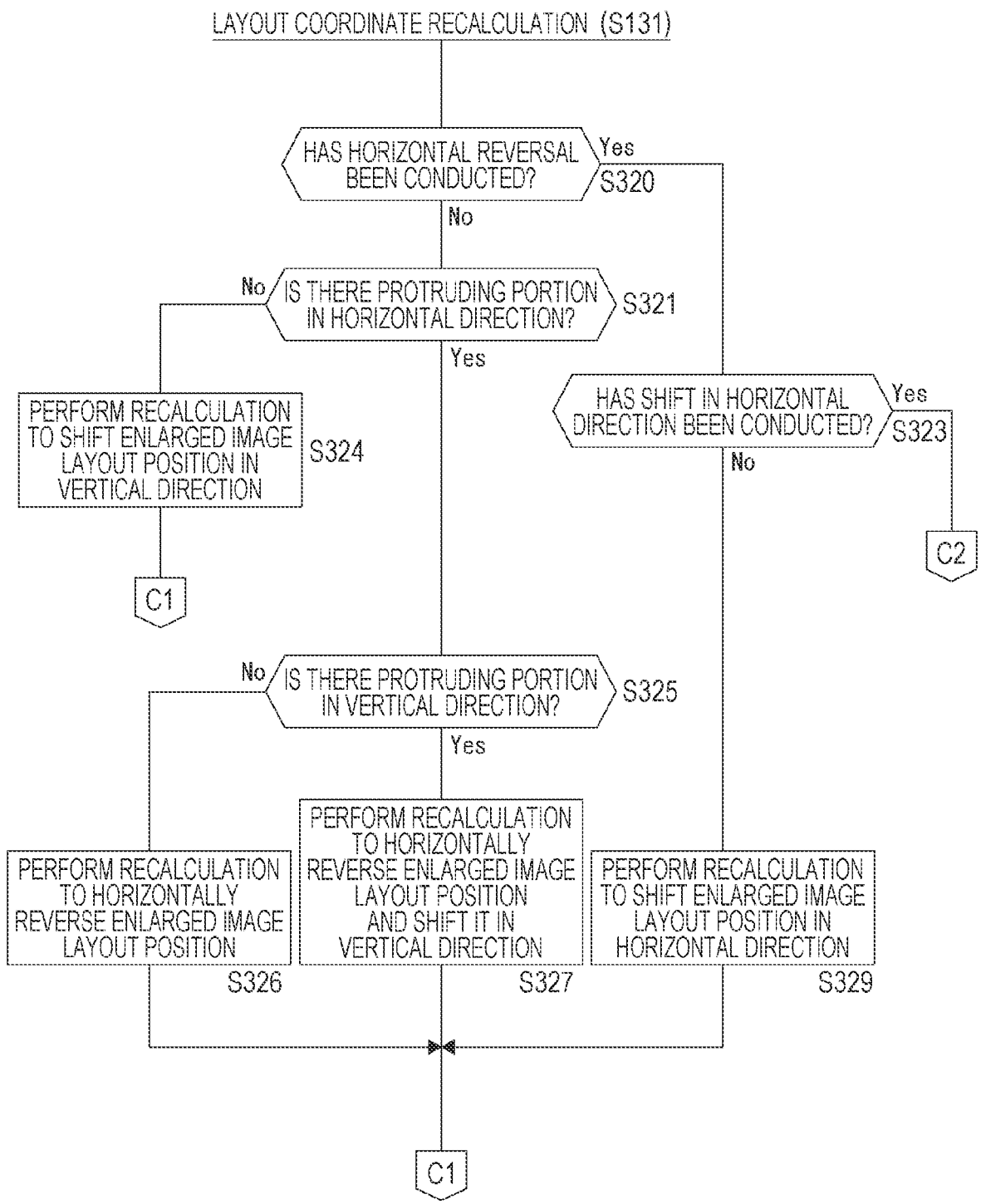
FIG. 30 is a flowchart of a layout coordinate recalculation process according to the seventh embodiment.

In a case where the enlarged image 22 has a portion outside the peripheral field image 20, the image processing device 3 performs the layout coordinate recalculation process in step S131 as shown in FIG. 30, instead of FIG. 25.

In a case where the layout coordinate recalculation process is first performed in the current frame, the image processing device 3 carries out step S321 after step S320, and checks whether or not there is an outside portion in a horizontal direction at the layout position of the enlarged image 22 previously calculated in step S105A.

There is a possibility that an outside portion may occur in a horizontal direction or a vertical direction.

In a case where an outside portion appears only in a vertical direction, the image processing device 3 moves on to step S324, and performs layout position recalculation so that the layout position of the enlarged image 22 shifts in a vertical direction.

Figure 31A:
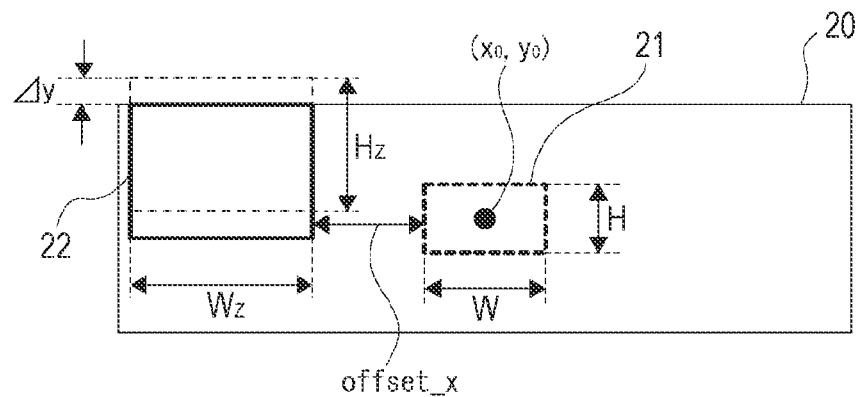
FIGS. 31A and 31B are explanatory diagrams of vertical shifts to be performed when an enlarged image has an outside portion according to the seventh embodiment.

For example, in a case where there is an outside portion on the upper side as shown in FIG. 31A, the following calculation is performed:

$$(X0,Y0)=(x0-W/2-\text{offset}\_x-Wz/2,0-y0-\Delta y)$$

Figure 31B:
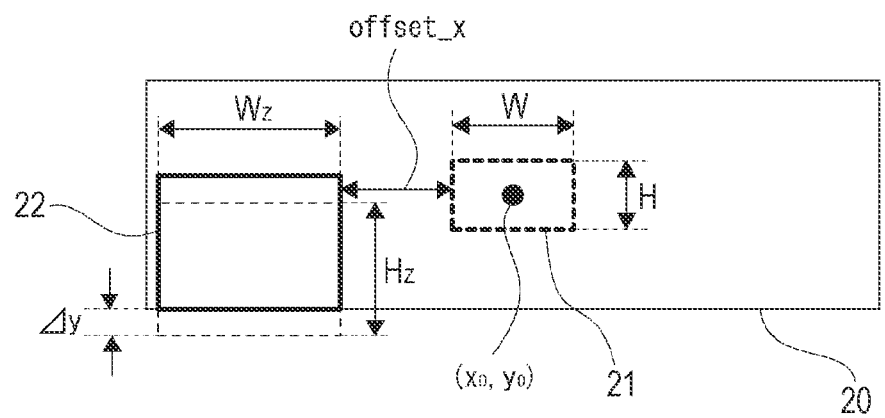

On the other hand, in a case where there is an outside portion on the lower side as shown in FIG. 31B, the following calculation is performed:

$$(X0,Y0)=(x0-W/2-\text{offset}\_x-Wz/2,0-y0+\Delta y)$$

The value of Δy may be a fixed value, or may represent the amount of the outside portion in the y-axis direction shown in FIGS. 31A and 31B.

The process then returns to step S130 in FIG. 24, as indicated by "c1".

In a case where there is an outside portion in a horizontal direction, on the other hand, the image processing device 3 proceeds from step S321 to step S325 in FIG. 30, and checks whether or not there is an outside portion in a vertical direction at the layout position of the enlarged image 22 previously calculated in step S105A.

If there is not an outside portion in a vertical direction, the image processing device 3 moves on to step S326, and horizontally inverts the layout position of the enlarged image 22 and recalculates the layout position. For example, in a case where an outside portion has appeared at the time of the calculation for a right-side position as above, recalculation is performed for a left-side position as above.

The process then returns to step S130 in FIG. 24, as indicated by "c1".

In a case where there is an outside portion in a vertical direction in step S325 in FIG. 30, which is a case where an outside portion appears in both a horizontal direction and a vertical direction, the image processing device 3 moves on to step S327, and performs recalculation so that the layout position of the enlarged image 22 is horizontally inverted and shifts in a vertical direction.

The process then returns to step S130 in FIG. 24, as indicated by "c1".

If the enlarged image 22 no longer has a portion outside the peripheral field image 20 as a result of the horizontal inversion and/or the vertical shift performed as above, the enlarged image layout position is determined to be "OK", and the process moves on to step S107 in FIG. 24.

However, even if the horizontal inversion and/or the vertical shift is performed, the layout position of the enlarged image 22 might still be inappropriate.

In that case, the image processing device 3 again proceeds from step S130 to step S131 in FIG. 24, and performs the processes shown in FIG. 30.

In this case, the horizontal inversion has already been performed, and therefore, the image processing device 3 proceeds from step S320 to step S323. Since any horizontal shift has not been performed yet, the layout position is then recalculated in step S329 so that the layout position of the enlarged image 22 shifts in a horizontal direction.

For example, after the value of the horizontal offset amount offset_x is reduced (offset_x=offset_x-Ox, for example), recalculation is performed according to the above equation for a right-side position or the above equation for a left-side position.

The process then returns to step S130 in FIG. 24, as indicated by "c1". If the enlarged image 22 no longer has a portion outside the peripheral field image 20 as a result of the horizontal shift performed in such a manner, the enlarged image layout position is determined to be "OK", and the process moves on to step S107.

However, even if the horizontal inversion, the vertical shift, and the horizontal shift are performed as described above, the layout position of the enlarged image 22 might still be inappropriate. In that case, the process moves on to step S131 for the third time, but this time, the process proceeds from step S323 in FIG. 30 to step S110 in FIG. 24 as indicated by "c2". In this case, display control is performed on the peripheral field image 20 and the imaging angle-of-view frame 21 while the enlarged image 22 is hidden.

As described above, in the seventh embodiment, the layout position of the enlarged image 22 follows the imaging angle-of-view frame 21 in a horizontal direction or inversely follows the imaging angle-of-view frame 21 in a vertical direction. In a case where the enlarged image 22 has a portion outside the peripheral field image 20, the enlarged image 22 shifts in a vertical direction, inverts in a horizontal direction, or shifts in a horizontal direction.

Note that the layout coordinate recalculation process taking into consideration an outside portion in vertical and horizontal directions as shown in FIG. 30 can also be adopted in the case of the sixth embodiment.

9. Display of an Imaging Angle-of-View Frame

Figure 32A:
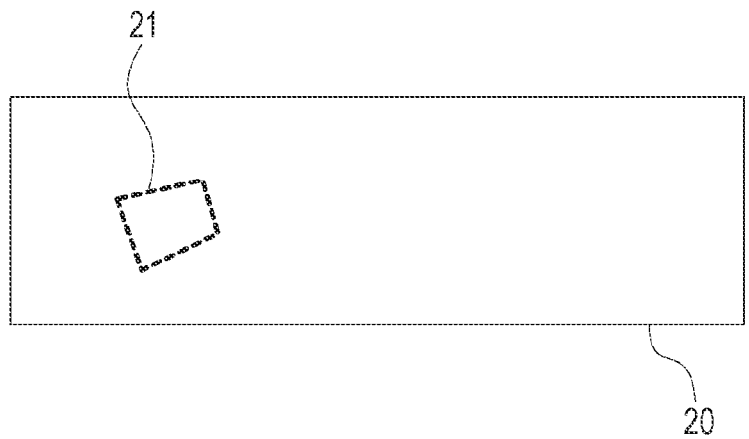
FIGS. 32A, 32B, and 32C are explanatory views of a display mode of an imaging angle-of-view frame according to an embodiment.

In each of the above embodiments, the imaging angle-of-view frame 21 has been indicated by a rectangle, but is not necessarily a rectangle. For example, FIG. 32A shows a non-rectangular imaging angle-of-view frame 21.

Particularly, in a case where the imaging directions of the imaging device 1A and the imaging device 1B are different, the imaging angle-of-view frame may be shaped in accordance with the difference in the field-of-view direction, so that the imaging direction of the imaging device 1B can be stereoscopically viewed.

Figure 32B:
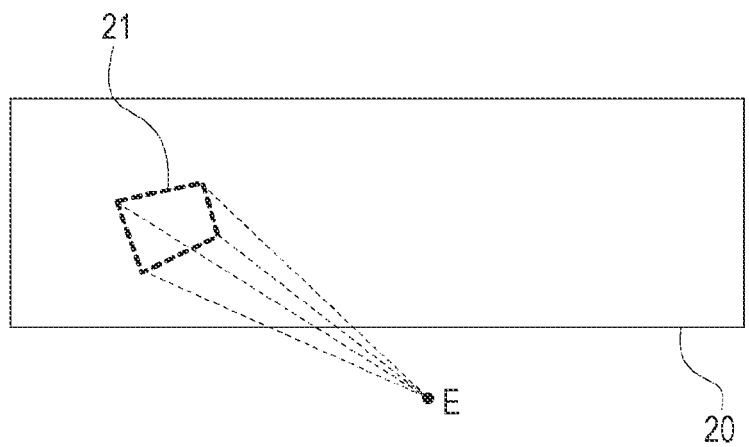

For example, as shown in FIG. 32B, when a viewpoint E is set as the position of the imaging device 1B, the imaging angle-of-view frame 21 may have a shape obtained by projecting the angle of view of the imaging device 1B from the viewpoint E.

Note that, even in a case where the imaging angle-of-view frame 21 is not rectangular as described above, if the imaging angle-of-view frame 21 is regarded as a pseudo rectangle as in FIG. 32B, and the size H in a vertical direction, the size W in a horizontal direction, and the central coordinates (x0, y0) are defined, the layout position of the enlarged image 22 can be calculated by the method of each of the above embodiments.

10. Summary and Modifications

In the above embodiments, the effects described below are achieved.

The image processing device 3 according to the first to seventh embodiments includes the image combining unit 12 that performs a combining process of disposing the enlarged image 22 (second image) in the peripheral field image 20 (first image) captured by the imaging device 1A, the enlarged image 22 being an image of the imaging field of view of the imaging device 1B capable of imaging a partial field of view in the imaging field of view of the imaging device 1A.

As the enlarged image 22, which is an image of a relatively narrow imaging field of view captured by the imaging device 1B, is displayed on the peripheral field image 20 of a relatively wide field of view captured by the imaging device 1A, it is possible to check the imaging target of the imaging device 1B, with part of the image being enlarged in the peripheral field of view. Thus, the user can easily follow the object with the imaging device 1B while checking the peripheral field of view.

For example, in a case where imaging is performed by following part of an object such as a person or an animal in a wide scene, or in a case of an object moving very fast in a motor sport or the like, it is difficult to follow the object only by checking a zoomed-in image of the object. As the enlarged image 22 indicating the imaging field of view of the imaging device 1B is displayed in the peripheral field image 20 captured by the imaging device 1A as in the embodiments, the user can follow the target object by zooming while checking a wide field of view. This is suitable in the imaging situation as described above.

Meanwhile, the object that is the target of the imaging device 1B is displayed as the enlarged image 22 more finely than other objects in the periphery. Accordingly, this is also suitable for checking the state of the target object.

Also, as the enlarged image 22 is displayed in the peripheral field image 20 having a wider angle, the user who wishes to check the surrounding situation and the target object at the same time moves less frequently his/her line of sight relative to the display, and thus, can easily view the display.

Further, the peripheral field image 20 is not displayed in the enlarged image 22, but the enlarged image 22 is displayed in the peripheral field image 20. This is suitable for checking the surrounding situation, without an unnecessary reduction in size of the peripheral field image 20.

Note that the enlarged image 22 is combined with the image data of the peripheral image captured by the imaging device 1A using the image data captured by the imaging device 1B. However, the image data captured by the imaging device 1B is not necessarily used. For example, the image data in the range of the imaging angle-of-view frame 21 in the image data of the peripheral image may be extracted, an interpolation process may be performed to generate enlarged image data, and a combining process may be performed so that the enlarged image data is superimposed and displayed on the image data of the peripheral image. That is, the enlarged image 22 (second image) may be an image of the imaging field of view of the imaging device 1B, or is only required to be an image indicating the field-of-view range being imaged by the imaging device 1B.

In the first, third, fourth, fifth, sixth, and seventh embodiments, the image processing device 3 includes: the range detection unit 10 that detects the range of the imaging field of view of the imaging device 1B in the peripheral field image 20; and the imaging angle-of-view frame combining unit 11 that combines the peripheral field image 20 with the imaging angle-of-view frame 21 indicating the range of the imaging field of view detected by the range detection unit 10.

As the imaging angle-of-view frame 21 is displayed in the peripheral field image 20, it is possible to check which range the imaging device 1B is imaging in the peripheral field image 20, and the user can more easily follow the target object.

Further, as the imaging angle-of-view frame 21 and the enlarged image 22 are displayed, it is possible to check the image of the target object (the detailed situation of the target object) being captured by the imaging device 1B, while checking the position of the target object in the peripheral field image 20.

Particularly, as the imaging angle-of-view frame 21 and the enlarged image 22 are displayed in the peripheral field image 20, movement of the user's line of sight becomes smaller, and it becomes easier to check the periphery and the target object at the same time.

In the first, third, fourth, fifth, sixth, and seventh embodiments, the image combining unit 12 sets the layout position of the enlarged image 22 in the peripheral field image 20 in accordance with the position of the imaging angle-of-view frame 21.

As the imaging angle-of-view frame 21 and the enlarged image 22 are displayed in the peripheral field image 20, the user can check the imaging situation of the target object while checking which range the imaging device 1B is imaging in the peripheral field image 20. However, it is important that these images are appropriately disposed and displayed.

Specifically, the position of the imaging angle-of-view frame 21 in the peripheral field image 20 changes depending on the respective viewing directions of the imaging device 1A and the imaging device 1B, and the size of the imaging angle-of-view frame 21 changes with the zooming state (the angle of view) of the imaging device 1B. Therefore, if the display position of the enlarged image 22 is fixed, the imaging angle-of-view frame 21 and the enlarged image 22 might overlap each other.

To counter this, the position of the enlarged image 22 in the peripheral field image 20 is made variable with the position of the imaging angle-of-view frame 21, as described above in each of the embodiments. As a result, the imaging angle-of-view frame 21 and the enlarged image 22 are disposed and displayed in an easily viewable state without overlapping each other, regardless of changes in the viewing directions of the imaging devices 1A and 1B. Thus, the two images can be visually recognized at the same time.

In the examples described in the first, third, fourth, fifth, sixth, and seventh embodiments, the image combining unit 12 sets the layout position of the enlarged image 22 in the peripheral field image 20 so as to follow the position of the imaging angle-of-view frame 21 while maintaining a predetermined distance relationship.

In the peripheral field image 20, the enlarged image 22 follows the imaging angle-of-view frame 21 while maintaining a predetermined distance relationship, so that the enlarged image 22 and the imaging angle-of-view frame 21 do not overlap each other, and are disposed on the display while maintaining a certain distance relationship. Thus, the user can easily view both the enlarged image 22 and the imaging angle-of-view frame 21.

In the examples described in the first, third, fourth, fifth, sixth, and seventh embodiments, the image combining unit 12 sets the layout position of the enlarged image 22 in the peripheral field image 20 so as to follow changes in the position of the imaging angle-of-view frame 21 in a horizontal direction while maintaining a predetermined horizontal distance.

In the peripheral field image 20, the enlarged image 22 follows the imaging angle-of-view frame 21 while maintaining a predetermined distance relationship in a horizontal direction. Thus, the user can visually recognize both the enlarged image 22 and the imaging angle-of-view frame 21, with a constant distance being kept in between in a horizontal direction.

In the example described in the fifth embodiment, the image combining unit 12 sets the layout position of the enlarged image 22 in the peripheral field image 20 so as to follow changes in the position of the imaging angle-of-view frame in a vertical direction while maintaining a predetermined vertical distance.

In the peripheral field image 20, the enlarged image 22 follows the imaging angle-of-view frame 21 while maintaining a predetermined distance relationship in a vertical direction. Thus, the user can visually recognize both the enlarged image 22 and the imaging angle-of-view frame 21, with a constant distance being kept in between in a vertical direction.

In the examples described above in the first, third, fourth, fifth, sixth, and seventh embodiments, the image combining unit 12 calculates the coordinate values of the layout position of the enlarged image 22 in the coordinate space of the peripheral field image 20 by an arithmetic operation using the coordinate values of the imaging angle-of-view frame 21.

For example, the coordinates of the layout position of the enlarged image 22 that maintains a predetermined distance from the imaging angle-of-view frame 21 are calculated using the coordinate values of the center and four corners of the imaging angle-of-view frame.

Thus, the layout position coordinate values of the enlarged image 22 can be obtained by a simple arithmetic operation.

In the examples described above in the first, third, fourth, and fifth embodiments, the image combining unit 12 divides the inside of the peripheral field image 20 into a plurality of areas, and sets the layout position of the enlarged image 22 by a calculation formula selected in accordance with the area in which the imaging angle-of-view frame 21 is located.

In the peripheral field image 20, both the enlarged image 22 and the imaging angle-of-view frame 21 are preferably displayed at appropriate positions. However, if the enlarged image 22 simply follows the imaging angle-of-view frame 21, both images are too close to the right or the left, or the enlarged image 22 cannot be displayed, for example. Therefore, the peripheral field image 20 is divided into areas in a horizontal direction and an upper limit direction, and the layout position of the enlarged image 22 is set using different calculation formulas for the respective areas so that the layout position is appropriately set for each area. With this arrangement, regardless of the position of the imaging angle-of-view frame 21, the user can visually recognize the enlarged image 22 and the imaging angle-of-view frame 21 at appropriate positions in the peripheral field image 20.

Note that FIGS. 10A, 10B, 10C, and 10D illustrate a case where the peripheral field image is horizontally divided, and FIGS. 19A, 19B, 19C, and 19D illustrate a case where the peripheral field image is vertically and horizontally divided. However, there may be a case where the peripheral field image is vertically divided. The number of divided areas, the size of each area, and the like may also have various values.

In the examples described above in the third and fifth embodiments, the plurality of areas obtained by dividing the peripheral field image 20 includes a buffer area for maintaining a calculation formula selected state.

For example, the area AR2 in the third embodiment, and the areas AR2, AR5, and AR8 in the fifth embodiment correspond to the buffer area. These areas maintain the previous calculation formulas (see step S172 in FIG. 17, and steps S212, S222, and S232 in FIG. 20).

Such a buffer area that maintains the calculation formula selected state prevents frequent switching of calculation formulas to be used in each frame, for example. Thus, a chattering phenomenon in which the display position of the enlarged image 22 is frequently switched in a horizontal direction is prevented, and a preferable viewing state for the user can be provided.

In the examples described above in the sixth and seventh embodiments, the image combining unit 12 sets the layout position of the enlarged image 22 in the peripheral field image 20 in accordance with the position of the imaging angle-of-view frame 21. Also, in a case where the set layout position is such that all or part of the enlarged image 22 is located outside the range of the peripheral field image 20, the image combining unit 12 again sets the layout position of the enlarged image 22 so that the imaging direction of the enlarged image 22 relative to the imaging angle-of-view frame 21 is changed.

In the peripheral field image 20, when the layout position of the enlarged image 22 is set in accordance with the imaging angle-of-view frame 21, the enlarged image 22 might have a portion outside the display range of the peripheral field image 20. In that case, the layout position of the enlarged image 22 is horizontally inverted relative to the imaging angle-of-view frame 21. That is, the calculation formulas are changed, and recalculation is performed (see step S131 in FIG. 24, step S302 in FIG. 25, and FIGS. 26A, 26B, 27A, 27B, 28A, 28B, 29A, 29B, and 30). Thus, regardless of the position of the imaging angle-of-view frame 21, the user can visually recognize the enlarged image 22 in the peripheral field image 20 without any undisplayed portion, the enlarged image 22 being located at an appropriate distance from the imaging angle-of-view frame 21.

Note that, as well as or instead of the horizontal inversion, vertical inversion or position change may be caused.

In the examples described above in the sixth and seventh embodiments, the image combining unit 12 sets the layout position of the enlarged image 22 in the peripheral field image 20 in accordance with the position of the imaging angle-of-view frame 21. Also, in a case where the layout position is such that all or part of the enlarged image 22 is located outside the range of the peripheral field image 20, the image combining unit 12 again sets the layout position of the enlarged image 22 so that the layout position of the enlarged image 22 shifts toward the range of the peripheral field image 20.

In the peripheral field image 20, when the layout position of the enlarged image 22 is made to follow the imaging angle-of-view frame 21, the enlarged image 22 might have a portion outside the display range of the peripheral field image 20. In that case, it might be possible to eliminate the outside portion by causing the layout position of the enlarged image 22 to shift toward the region in which outside portions are prevented from appearing (see step S131 in FIG. 24, and step S304 in FIG. 25). With this arrangement, regardless of the position of the imaging angle-of-view frame 21, the user can visually recognize the enlarged image 22 in the peripheral field image 20 without any undisplayed portion.

Although the cases where a horizontal shift, or horizontal and vertical shifts are performed have been described, there may of course be examples in which only a vertical shift is performed.

In the examples described above in the first, third, fourth, fifth, sixth, and seventh embodiments, the image combining unit 12 sets the layout position of the enlarged image 22 in the peripheral field image 20 in accordance with the position of the imaging angle-of-view frame 21. Also, in a case where the set layout position is such that all or part of the enlarged image 22 is located outside the range of the peripheral field image 20, a combining process is not performed on the enlarged image 22.

In the peripheral field image 20, when the layout position of the enlarged image 22 is made to follow the imaging angle-of-view frame 21, the enlarged image 22 might have a portion outside the display range of the peripheral field image 20, and there are even cases where the outside portion cannot be corrected. In such a case, the enlarged image 22 is not combined, and the enlarged image 22 is not displayed (see steps S106 and S110 in FIG. 6, and step S303 in FIG. 25 or step S323 in FIG. 30 to step S110 in FIG. 24).

As a result, when the enlarged image 22 cannot be appropriately displayed, the enlarged image 22 is not displayed, and thus, it is possible to prevent the user from visually recognizing the enlarged image in an inappropriate state.

In the examples described above in the first to seventh embodiments, in a case where the range detection unit 10 detects the imaging device 1B in the peripheral field image 20, such as a case where a state in which the imaging device 1B is captured in the image is detected, for example, control is performed to output the enlarged image 22 as a display image.

In a case where the back surface of the imaging device 1B is captured in the peripheral field image 20, there is a high possibility that the entire image of the field range of the imaging device 1B is not captured in the peripheral field image 20. That is, the imaging device 1B becomes an obstacle, and the scene being imaged by the imaging device 1B does not appear in the peripheral field image 20. In such a case, the image being captured by imaging device 1B is directly displayed as the enlarged image 22 (see steps S120, S121, and S122 in FIGS. 6 and 24).

The user does not visually recognize an image blocked by the imaging device 1B in the peripheral field image 20.

Further, if the user wears the imaging device 1A as a goggle camera as shown in FIGS. 2A, 2B, and 2C, for example, the state shown in FIG. 2B is like a behavior of the user holding the imaging device 1B in front of the eyes and looking into the viewfinder in a normal manner. Therefore, when the image being captured by the imaging device 1B in that state is displayed, not only any feeling of strangeness is caused, but also a state in which the user is looking into the viewfinder is reproduced. Thus, this is also suitable for the user's imaging operation.

Note that, in some configuration, the control for outputting the enlarged image may be performed by the image combining unit 12, or the image captured by the imaging device 1B may be output to the display device 2 without passing through the image combining unit 12. Accordingly, the functions as an output control unit that outputs the enlarged image 22 may be formed by the image combining unit 12 or some other functional module in the image processing device 3.

In the examples described above in the first to seventh embodiments, in a case where the range detection unit 10 cannot detect the range of the imaging field of view of the imaging device 1B in the peripheral field image 20, the image combining unit 12 sets the layout position of the enlarged image 22 at a preset fixed position in the peripheral field image 20.

In a case where the display position of the imaging angle-of-view frame 21 cannot be detected because the range of the imaging field of view of the imaging device 1B does not exist in the peripheral field image 20, the enlarged image 22 is combined and displayed at a specific position in the peripheral field image 20 (see step S123 in FIGS. 6 and 24). For example, such a state occurs in the situation illustrated in FIG. 2C.

In this case, the enlarged image 22 is displayed at a specific position in the peripheral field image 20, so that the user can check the image of the imaging field of view of the imaging device 1B outside the peripheral field image 20. Particularly, as the imaging angle-of-view frame 21 cannot be displayed in this case, the imaging angle-of-view frame 21 and the enlarged image 22 do not overlap each other, and visibility is not degraded.

Note that the specific position at which the enlarged image 22 is displayed may be a fixed position at all times, but the user may be allowed to designate any desired position.

In the examples described above in the first to seventh embodiments, in a case where the range detection unit 10 cannot detect the range of the imaging field of view of the imaging device 1B in the peripheral field image 20, control is performed to output the peripheral field image 20 as a display image.

In a case where the display position of the imaging angle-of-view frame 21 cannot be detected because the range of the imaging field of view of the imaging device 1B does not exist in the peripheral field image 20, the peripheral field image 20 with which the enlarged image 22 is not combined may be displayed (see step S123 in FIGS. 6 and 24). That is, the enlarged image 22 is hidden.

For example, if the imaging device 1A as a goggle camera is worn as shown in FIGS. 2A, 2B, and 2C, it is most often the case that the user is not aware of the image of the imaging device 1B while the imaging field-of-view directions of the imaging devices 1A and 1B are completely different as shown in FIG. 2B. Therefore, it is also preferable to make the entire peripheral field image 20 easy to view, by not displaying the enlarged image 22.

Note that, in the process in step S123, the user's selection operation may switch between performing a process of combining and displaying the enlarged image 22 at the specific position, and not displaying the enlarged image 22.

Further, in some configuration, the control for outputting the enlarged image may be performed by the image combining unit 12, or the image captured by the imaging device 1A may be output to the display device 2 without passing through the image combining unit 12. Accordingly, the functions as an output control unit that outputs the peripheral field image 20 may be formed by the image combining unit 12 or some other functional module in the image processing device 3.

In the examples described above in the first, third, fourth, fifth, sixth, and seventh embodiments, the image combining unit 12 determines whether or not to combine the enlarged image 22 with the peripheral field image 20, in accordance with the size of the imaging angle-of-view frame 21.

In a case where the imaging device 1B performs imaging at a wide angle and the imaging angle-of-view frame 21 is larger than the enlarged image 22, or in a case where the imaging angle-of-view frame 21 is large to some extent not in comparison with the enlarged image 22, there is almost no point displaying the enlarged image 22. This is because the user can check the imaging field of view of imaging device 1B in detail as the range surrounded by the imaging angle-of-view frame 21. Further, when the imaging angle-of-view frame 21 becomes larger, it becomes difficult to appropriately dispose and display the enlarged image 22 together with the imaging angle-of-view frame 21, and the enlarged image 22 might become an obstacle instead.

Therefore, in a case where the size of the imaging angle-of-view frame 21 is larger than the size of the enlarged image 22, for example, the enlarged image 22 is not displayed (see steps S104 and S110 in FIGS. 6 and 24). Alternatively, in a case where the size of the imaging angle-of-view frame 21 is equal to or larger than a predetermined size, the enlarged image 22 may not be displayed.

As a result, while the user can check the imaging field of view of the imaging device 1B with the imaging angle-of-view frame 21, it is possible to prevent the visibility from deteriorating due to the display of the enlarged image 22, and to make the peripheral field of view easier to view.

Figure 32C:
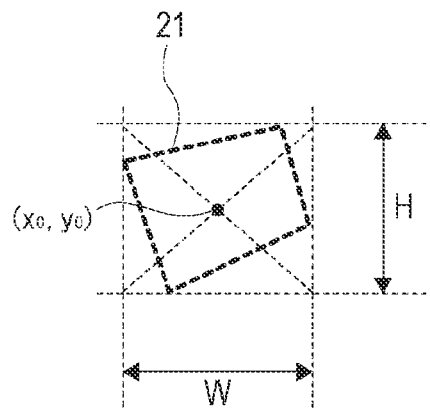

In the examples described above in the first, third, fourth, fifth, sixth, and seventh embodiments, the imaging angle-of-view frame combining unit 11 combines the non-rectangular imaging angle-of-view frames 21 with the peripheral field image 20 (see FIGS. 32A, 32B, and 32C).

For example, by displaying the imaging angle-of-view frame 21 as a projection range or the like from the viewpoint E of the imaging device 1B, the field of view of the imaging device 1B can be stereoscopically checked in the peripheral field image 20.

The example described above in the second embodiment includes the range detection unit 10 that detects the range of the focus frame of the imaging device 1B in the peripheral field image 20, and the focus frame combining unit 11A that combines the peripheral field image 20 with the focus frame indicating the focusing region detected by the range detection unit 10. The image combining unit 12 sets the layout position of the enlarged image 22 in the peripheral field image 20 in accordance with the position of the focus frame 23.

As the focus frame 23 is displayed in the peripheral field image 20, it is possible to check on which range the imaging device 1B is focusing while imaging in the peripheral field image 20, and the user can more easily follow the target object.

Further, as the imaging angle-of-view frame 21 and the enlarged image 22 are displayed, it is possible to check the image of the target object (the detailed situation of the target object) being captured by the imaging device 1B, while checking the position of the target object in the peripheral field image 20.

Further, in this case, it is possible to perform position setting such that the focus frame 23 and the enlarged image 22 do not overlap each other, and the visibility is improved.

Note that, in the example in which the focus frame 23 is displayed, the processes related to the imaging angle-of-view frame 21 in the first, third, fourth, fifth, sixth, and seventh embodiments can be directly applied to the focus frame 23 and performed. That is, in a case where the focus frame 23 is displayed, the processes related to the position of the enlarged image 22 according to each embodiment can be applied.

Note that, although the imaging devices 1A and 1B have been described as separate imaging devices in the above embodiments, a first imaging system and a second imaging system may be provided as one imaging device. For example, the processes according to an embodiment can be adopted in an imaging device in which the first imaging system includes a wide-angle lens and captures the peripheral field image 20, and the second imaging system captures the target object with a narrower angle of view.

The program according to an embodiment is a program for causing a CPU, a DSP, a device including these components, or the like to perform any one or a plurality of processes illustrated in FIGS. 6, 7, 16, 17, 20, 24, 25, and 30, for example.

That is, the program according to the embodiment is a program for causing the image processing device 3 to perform a combining process of disposing the enlarged image 22, which is an image of the imaging field of view of the imaging device 1B capable of imaging a partial field of view in the imaging field of view of the imaging device 1A, in the peripheral field image 20 captured by the imaging device 1A.

With such a program, the image processing device 3 described above can be formed.

Such a program can be recorded beforehand in an HDD as a recording medium in a device such as a computer device, a ROM in a microcomputer including a CPU, or the like.

Alternatively, the program can be temporarily or permanently stored (recorded) in a removable recording medium, such as a flexible disk, a compact disc read only memory (CD-ROM), a magnet-optical (MO) disk, a digital versatile disc (DVD), a Blu-ray Disc (registered trademark), a magnetic disk, a semiconductor memory, or a memory card. Such a removable recording medium can be provided as so-called packaged software.

Alternatively, such a program can be installed from a removable recording medium into a personal computer or the like, or can be downloaded from a download site via a network such as a local area network (LAN) or the Internet.

Also, such a program is suitable for providing image processing devices 3 according to the embodiments in a wide range. For example, by downloading the program into a personal computer, a portable information processing device, a mobile telephone, a game device, a video device, a personal digital assistant (PDA), or the like, the personal computer or the like can be made to function as an image processing device 3 of the present disclosure.

Note that the advantageous effects described in this specification are merely examples, and the advantageous effects of the present technology are not limited to them and may include some other effects.

Note that the present technology can also be embodied in the configurations described below.

(1)

An image processing device including
an image combining unit that performs a combining process of disposing a second image in a first image captured by a first imaging device, the second image being an image of an imaging field of view of a second imaging device capable of imaging a partial field of view in the imaging field of view of the first imaging device.

(2)

The image processing device according to (1), further including:
a range detection unit that detects a range of the imaging field of view of the second imaging device in the first image; and
an imaging angle-of-view frame combining unit that combines an imaging angle-of-view frame with the first image, the imaging angle-of-view frame indicating the range of the imaging field of view detected by the range detection unit.

(3)

The image processing device according to (2), in which
the image combining unit sets a layout position of the second image in the first image, in accordance with a position of the imaging angle-of-view frame.

(4)

The image processing device according to (2) or (3), in which
the image combining unit sets a layout position of the second image in the first image so as to follow the position of the imaging angle-of-view frame, with a predetermined distance relationship being maintained.

(5)

The image processing device according to (4), in which
the image combining unit sets the layout position of the second image in the first image so as to follow a horizontal change in the position of the imaging angle-of-view frame while maintaining a predetermined horizontal distance.

(6)

The image processing device according to (4) of (5), in which
the image combining unit sets the layout position of the second image in the first image so as to follow a horizontal change in the position of the imaging angle-of-view frame while maintaining a predetermined vertical distance.

(7)

The image processing device according to any one of (4) to (6), in which
the image combining unit calculates a coordinate value of the layout position of the second image in a coordinate space of the first image by an arithmetic operation using a coordinate value of the imaging angle-of-view frame.

(8)

The image processing device according to any one of (2) to (7), in which
the image combining unit performs segmentation setting to divide the first image into a plurality of areas, and sets a layout position of the second image by a calculation formula selected in accordance with an area in which the imaging angle-of-view frame is located.

(9)

The image processing device according to (8), in which the plurality of areas includes a buffer area that maintains a state in which the calculation formula is selected.

(10)

The image processing device according to any one of (2) to (9), in which
the image combining unit sets a layout position of the second image in the first image in accordance with a position of the imaging angle-of-view frame, and, when the set layout position is such that all or part of the second image is located outside a range of the first image, the image combining unit again sets the layout position of the second image to change a direction of disposing the second image relative to the imaging angle-of-view frame.

(11)

The image processing device according to any one of (2) to (10), in which
the image combining unit sets a layout position of the second image in the first image in accordance with a position of the imaging angle-of-view frame, and, when the set layout position is such that all or part of the second image is located outside a range of the first image, the image combining unit again sets the layout position of the second image to cause the layout position of the second image to shift toward the range of the first image.

(12)

The image processing device according to any one of (2) to (11), in which
the image combining unit sets a layout position of the second image in the first image in accordance with a position of the imaging angle-of-view frame, and, when the set layout position is such that all or part of the second image is located outside a range of the first image, the combining process is not performed on the second image.

(13)

The image processing device according to any one of (2) to (12), further including
an output control unit that performs control to output the second image as a display image,
when the range detection unit has detected the second imaging device in the first image.

(14)

The image processing device according to any one of (2) to (13), in which,
when the range detection unit fails to detect the range of the imaging field of view of the second imaging device in the first image,
the image combining unit sets a layout position of the second image at a preset fixed position in the first image.

(15)

The image processing device according to any one of (2) to (13), further including an output control unit that performs control to output the first image as a display image, when the range detection unit fails to detect the range of the imaging field of view of the second imaging device in the first image.

(16)

The image processing device according to any one of (2) to (15), in which the image combining unit determines whether or not to combine the second image with the first image, in accordance with a size of the imaging angle-of-view frame.

(17)

The image processing device according to any one of (2) to (16), in which the imaging angle-of-view frame combining unit combines the imaging angle-of-view frame that is non-rectangular in shape with the first image.

(18)

The image processing device according to (1), further including:

a range detection unit that detects a range of a focus frame of the second imaging device in the first image; and a focus frame combining unit that combines the focus frame with the first image, the focus frame indicating a focusing region detected by the range detection unit, in which the image combining unit sets a layout position of the second image in the first image in accordance with a position of the focus frame.

(19)

An image processing method implemented in an image processing device, the image processing method including performing a combining process of disposing a second image in a first image captured by a first imaging device, the second image being an image of an imaging field of view of a second imaging device capable of imaging a partial field of view in the imaging field of view of the first imaging device.

(20)

A program for causing an image processing device to perform a combining process of disposing a second image in a first image captured by a first imaging device, the second image being an image of an imaging field of view of a second imaging device capable of imaging a partial field of view in the imaging field of view of the first imaging device.

REFERENCE SIGNS LIST 1A, 1B Imaging device
2 Display device
3 Image processing device
4 Imaging unit
10 Range detection unit
11 Imaging angle-of-view frame combining unit
11A Focus frame combining unit
12 Image combining unit
13 Display control unit
20 Peripheral field image
21 Imaging angle-of-view frame
22 Enlarged image
23 Focus frame
32 Imaging unit
33 Image signal processing unit
34 Image analysis unit
35 Control unit
36 Operation unit
37 Sensor unit
38 Display control unit
39 Display unit
40 Storage unit
41 External input unit

The invention claimed is:

1. An image processing device, comprising:

a central processing unit (CPU) configured to:
detect, in a first image captured by a first imaging device, a range of an imaging field of view of a second imaging device,
wherein the second imaging device images a partial field of view in an imaging field of view of the first imaging device;
combine an imaging angle-of-view frame with the first image,
wherein the imaging angle-of-view frame indicates the detected range of the imaging field of view of the second imaging device;
set a layout position of a second image in the first image based on the combination of the imaging angle-of-view frame with the first image, wherein
the second image corresponds to the imaging field of view of the second imaging device, and
the set layout position of the second image follows a position of the imaging angle-of-view frame and maintains a specific distance from the position of the imaging angle-of-view frame; and
combine the second image with the first image based on the set layout position of the second image.

2. The image processing device according to claim 1, wherein the CPU is further configured to set the layout position of the second image in the first image based on the position of the imaging angle-of-view frame.

3. The image processing device according to claim 1, wherein the set layout position of the second image follows a horizontal change in the position of the imaging angle-of-view frame, and the specific distance corresponds to a horizontal distance from the position of the imaging angle-of-view frame.

4. The image processing device according to claim 1, wherein the set layout position of the second image follows a vertical change in the position of the imaging angle-of-view frame, and the specific distance corresponds to a vertical distance from the position of the imaging angle-of-view frame.

5. The image processing device according to claim 1, wherein the CPU is further configured to:

acquire a coordinate value of the imaging angle-of-view frame; and calculate, based on the acquired coordinate value of the imaging angle-of-view frame, a coordinate value of the layout position of the second image in a coordinate space of the first image by an arithmetic operation.

6. The image processing device according to claim 1, wherein the CPU is further configured to:

divide the first image into a plurality of areas;

select a calculation formula based on an area of the plurality of areas in which the imaging angle-of-view frame is located; and set the layout position of the second image based on the selected calculation formula.

7. The image processing device according to claim 6, wherein the plurality of areas includes a buffer area that maintains a state in which the calculation formula is selected.

8. The image processing device according to claim 1, wherein the CPU is further configured to:
the layout position of the second image in the first image based on the position of the imaging angle-of-view frame;
determine, based on the set layout position, all or part of the second image is located outside a range of the first image; and
change, based on the determination that the all or the part of the second image is located outside the range of the first image, the layout position of the second image relative to the imaging angle-of-view frame.

9. The image processing device according to claim 1, wherein the CPU is further configured to:
set the layout position of the second image in the first image based on the position of the imaging angle-of-view frame;
determine, based on the set layout position, all or a part of the second image is located outside a range of the first image; and
shift, based on the determination that the all or the part of the second image is located outside the range of the first image, the layout position of the second image toward the range of the first image.

10. The image processing device according to claim 1, wherein the CPU is further configured to:
set the layout position of the second image in the first image based on the position of the imaging angle-of-view frame;
determine, based on the set layout position, all or a part of the second image is located outside a range of the first image; and
does not combine the second image with the first image based on the determination that the all or the part of the second image is located outside the range of the first image.

11. The image processing device according to claim 1, wherein the CPU is further configured to control, based on the detected range of the imaging field of view of the second imaging device, a display device to display the second image.

12. The image processing device according to claim 1, wherein in a case where the range of the imaging field of view of the second imaging device is not detected in the first image, the CPU is further configured to set the layout position of the second image at a preset fixed position in the first image.

13. The image processing device according to claim 1, wherein in a case where the range of the imaging field of view of the second imaging device is not detected in the first image, the CPU is further configured to control a display device to display the first image.

14. The image processing device according to claim 1, wherein the CPU is further configured to:
determine a size of the imaging angle-of-view frame in the first image; and
determine whether to combine the second image with the first image based on the size of the imaging angle-of-view frame.

15. The image processing device according to claim 1, wherein the imaging angle-of-view frame has a non-rectangular shape.

16. The image processing device according to claim 1, wherein the CPU is further configured to:
detect a range of a focus frame of the second imaging device in the first image;
combine the focus frame with the first image;
acquire position information of the focus frame in the first image based on the combination of the focus frame with the first image; and
set the layout position of the second image in the first image based on the acquired position of the focus frame.

17. An image processing method, comprising:
in an image processing device:
detecting, in a first image captured by a first imaging device, a range of an imaging field of view of a second imaging device,
wherein the second imaging device images a partial field of view in an imaging field of view of the first imaging device;
combining an imaging angle-of-view frame with the first image,
wherein the imaging angle-of-view frame indicates the detected range of the imaging field of view of the second imaging device;
setting a layout position of a second image in the first image based on the combination of the imaging angle-of-view frame with the first image, wherein
the second image corresponds to the imaging field of view of the second imaging device, and
the layout position of the second image follows a position of the imaging angle-of-view frame and maintains a specific distance from the position of the imaging angle-of-view frame; and
combining the second image with the first image based on the set layout position of the second image.

18. A non-transitory computer-readable medium having stored thereon, computer-executable instructions which, when executed by a processor, cause the processor to execute operations, the operations comprising:
detecting, in a first image captured by a first imaging device, a range of an imaging field of view of a second imaging device,
wherein the second imaging device images a partial field of view in an imaging field of view of the first imaging device;
combining an imaging angle-of-view frame with the first image,
wherein the imaging angle-of-view frame indicates the detected range of the imaging field of view of the second imaging device;
setting a layout position of a second image in the first image based on the combination of the imaging angle-of-view frame with the first image, wherein
the second image corresponds to the imaging field of view of the second imaging device, and
the layout position of the second image follows a position of the imaging angle-of-view frame and maintains a specific distance from the position of the imaging angle-of-view frame; and
combining the second image with the first image based on the set layout position of the second image.

19. An image processing device, comprising:
a central processing unit (CPU) configured to:

detect, in a first image captured by a first imaging device, a range of an imaging field of view of a second imaging device,
  wherein the second imaging device images a partial field of view in an imaging field of view of the first imaging device;
combine an imaging angle-of-view frame with the first image,
  wherein the imaging angle-of-view frame indicates the detected range of the imaging field of view of the second imaging device; and
set a layout position of a second image in the first image based on a position of imaging angle-of-view frame in the first image,
  wherein the second image corresponds to the imaging field of view of the second imaging device; and
combine the second image with the first image based on the set layout position of the second image.

* * * * *